United States Patent
Kimura

(10) Patent No.: US 10,679,076 B2
(45) Date of Patent: Jun. 9, 2020

(54) ADJUSTING THE PROJECTION SYSTEM OF A DISTANCE SENSOR TO OPTIMIZE A BEAM LAYOUT

(71) Applicant: Magik Eye Inc., New York, NY (US)

(72) Inventor: Akiteru Kimura, Hachioji (JP)

(73) Assignee: Magik Eye Inc., New York, NY (US)

( * ) Notice: Subject to any disclaimer, the term of this patent is extended or adjusted under 35 U.S.C. 154(b) by 0 days.

(21) Appl. No.: 16/164,113

(22) Filed: Oct. 18, 2018

(65) Prior Publication Data
US 2019/0122057 A1    Apr. 25, 2019

Related U.S. Application Data

(63) Continuation-in-part of application No. 16/150,918, filed on Oct. 3, 2018.
(Continued)

(51) Int. Cl.
*G01B 11/26* (2006.01)
*G06K 9/00* (2006.01)
(Continued)

(52) U.S. Cl.
CPC ........ *G06K 9/00805* (2013.01); *G01B 11/026* (2013.01); *G01B 11/2513* (2013.01); *H04N 5/2354* (2013.01); *H04N 9/3161* (2013.01)

(58) Field of Classification Search
CPC ... G01B 11/25; G01B 11/026; G01B 11/2513; G01B 11/24; G01B 11/2518;
(Continued)

(56) References Cited

U.S. PATENT DOCUMENTS

| 4,914,460 A | 4/1990 | Caimi et al. |
| 5,730,702 A | 3/1998 | Tanaka et al. |
(Continued)

FOREIGN PATENT DOCUMENTS

| CN | 101794065 A | 8/2010 |
| CN | 103559735 A | 2/2014 |
(Continued)

OTHER PUBLICATIONS

International Search Report and Written Opinion dated Feb. 28, 2019 in corresponding PCT/US2018/056477, 10 pages.

*Primary Examiner* — Michael P Stafira
(74) *Attorney, Agent, or Firm* — Tong, Rea, Bentley & Kim LLC

(57) ABSTRACT

A projection pattern is projected onto an object from a projection point of a distance sensor. The projection pattern is created by a plurality of beams of light projected from the projection point. The plurality of beams creates a plurality of projection artifacts that is arranged on the surface of the object. A layout of the plurality of projection artifacts depends on a positional relationship between the projection point and an image capturing device of the distance sensor. At least one parameter that defines the positional relationship between the projection point and an image capturing device of the distance sensor is optimized, prior to projecting the pattern, to minimize overlap of trajectories associated with the projection artifacts. An image of the object, including at least a portion of the adjusted projection pattern, is captured. A distance from the distance sensor to the object is calculated using information from the image.

19 Claims, 35 Drawing Sheets

Related U.S. Application Data

(60) Provisional application No. 62/575,505, filed on Oct. 22, 2017.

(51) Int. Cl.
    *H04N 9/31* (2006.01)
    *H04N 5/235* (2006.01)
    *G01B 11/02* (2006.01)
    *G01B 11/25* (2006.01)

(58) Field of Classification Search
    CPC ..... G01B 11/254; G01B 11/00; G01B 11/002; G01B 11/2545; G01B 11/2441; G01B 11/245; G01B 11/2509; G01B 11/272; G01N 33/0098; G01N 21/55; G01N 2021/8557; G01N 2203/0282; G01N 2800/207; G01N 2800/304; G01N 2800/52; G01N 33/346; G01N 3/08; G01J 1/0411; G01J 1/044; G01J 1/0448; G02B 2027/0138; G02B 2027/014; G02B 2027/0178; G02B 27/017; G02B 27/4205; G02B 27/58; G02B 3/10; G02B 5/1876; G02B 5/3025; G02B 7/021; G02B 2027/0141; G02B 2027/0187; G02B 2027/0198; G02B 23/2415; G02B 27/0093; G02B 27/0172; G02B 27/0916; G02B 27/425; G02B 6/0005; G02B 6/34
    See application file for complete search history.

(56) References Cited

U.S. PATENT DOCUMENTS

| | | |
|---|---|---|
| 5,980,454 A | 11/1999 | Broome |
| 6,937,350 B2 | 8/2005 | Shirley |
| 9,686,539 B1 | 6/2017 | Zuliani et al. |
| 2003/0071891 A1 | 4/2003 | Geng |
| 2006/0055942 A1 | 3/2006 | Krattiger |
| 2006/0290781 A1 | 12/2006 | Hama |
| 2007/0165243 A1 | 7/2007 | Kang et al. |
| 2007/0206099 A1 | 9/2007 | Matsuo |
| 2010/0149315 A1 | 6/2010 | Qu et al. |
| 2010/0238416 A1 | 9/2010 | Kuwata |
| 2011/0188054 A1 | 8/2011 | Petronius et al. |
| 2012/0051588 A1 | 3/2012 | Mceldowney |
| 2012/0056982 A1 | 3/2012 | Katz et al. |
| 2012/0113252 A1 | 5/2012 | Yang et al. |
| 2012/0219699 A1* | 8/2012 | Pettersson ............. B05B 12/122 427/8 |
| 2012/0225718 A1 | 9/2012 | Zhang |
| 2012/0236288 A1* | 9/2012 | Stanley ............. G01B 11/2513 356/4.01 |
| 2012/0236317 A1 | 9/2012 | Nomura |
| 2013/0088575 A1 | 4/2013 | Park et al. |
| 2013/0155417 A1 | 6/2013 | Ohsawa |
| 2013/0242090 A1* | 9/2013 | Yoshikawa .......... G01B 11/026 348/136 |
| 2014/0000520 A1 | 1/2014 | Bareket |
| 2014/0009571 A1 | 1/2014 | Geng |
| 2014/0016113 A1 | 1/2014 | Holt et al. |
| 2014/0036096 A1 | 2/2014 | Sterngren |
| 2014/0071239 A1 | 3/2014 | Yokota |
| 2014/0085429 A1 | 3/2014 | Hérbert |
| 2014/0125813 A1 | 5/2014 | Holz |
| 2014/0207326 A1 | 7/2014 | Murphy |
| 2014/0241614 A1 | 8/2014 | Lee |
| 2014/0275986 A1 | 9/2014 | Vertikov |
| 2014/0320605 A1 | 10/2014 | Johnson |
| 2015/0009301 A1 | 1/2015 | Ribnick et al. |
| 2015/0077764 A1 | 3/2015 | Braker et al. |
| 2015/0160003 A1 | 6/2015 | Terry et al. |
| 2015/0171236 A1 | 6/2015 | Murray |
| 2015/0248796 A1 | 9/2015 | Iyer et al. |
| 2015/0268399 A1 | 9/2015 | Futterer |
| 2015/0288956 A1 | 10/2015 | Mallet et al. |
| 2015/0323321 A1* | 11/2015 | Oumi ................... H04N 5/2256 348/136 |
| 2016/0022374 A1 | 1/2016 | Haider |
| 2016/0117561 A1* | 4/2016 | Miyazawa ......... G06K 9/00805 348/169 |
| 2016/0128553 A1 | 5/2016 | Geng |
| 2016/0178915 A1 | 6/2016 | Mor et al. |
| 2016/0267682 A1 | 9/2016 | Yamashita |
| 2016/0327385 A1 | 11/2016 | Kimura |
| 2016/0328854 A1 | 11/2016 | Kimura |
| 2016/0334939 A1 | 11/2016 | Dawson et al. |
| 2016/0350594 A1 | 12/2016 | McDonald |
| 2017/0098305 A1 | 4/2017 | Gossow |
| 2017/0221226 A1 | 8/2017 | Shen et al. |
| 2017/0284799 A1 | 10/2017 | Wexler et al. |
| 2017/0307544 A1 | 10/2017 | Nagata |
| 2018/0010903 A1 | 1/2018 | Takao et al. |
| 2018/0011194 A1 | 1/2018 | Masuda et al. |
| 2018/0143018 A1* | 5/2018 | Kimura ................ G01B 11/026 |

FOREIGN PATENT DOCUMENTS

| | | |
|---|---|---|
| JP | 2006-313116 A | 11/2006 |
| JP | 2007-315864 A | 12/2007 |
| JP | 2010-101683 A | 5/2010 |
| JP | 4485365 B2 | 6/2010 |
| JP | 2012-047500 A | 3/2012 |
| JP | 2014-511590 A | 5/2014 |
| JP | 2014-122789 A | 7/2014 |
| JP | 6038415 B1 | 12/2016 |
| KR | 10-2015-0101749 A | 9/2015 |
| WO | WO 2014/0106843 A2 | 7/2014 |
| WO | WO 2014/131064 | 8/2014 |

* cited by examiner

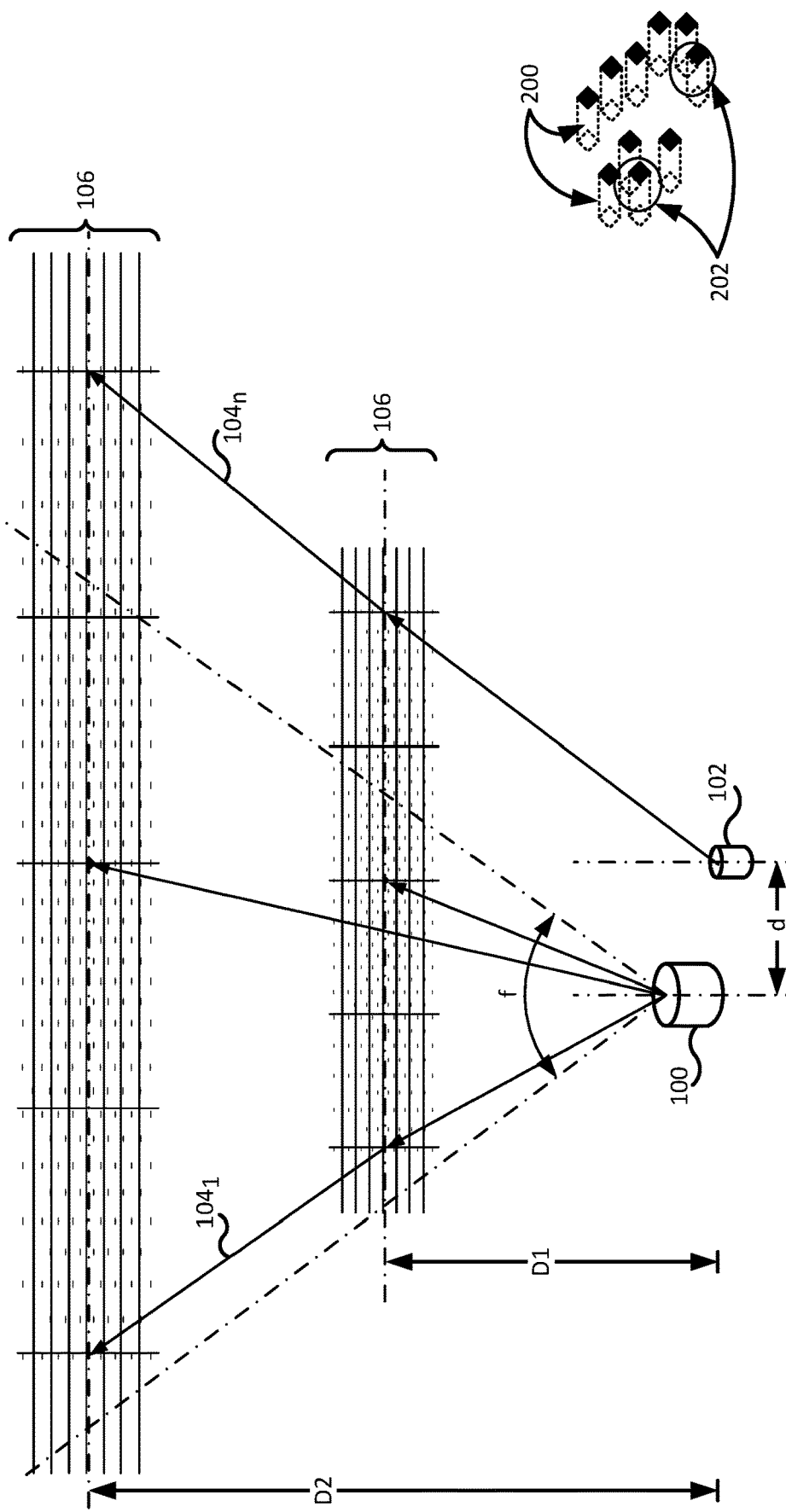

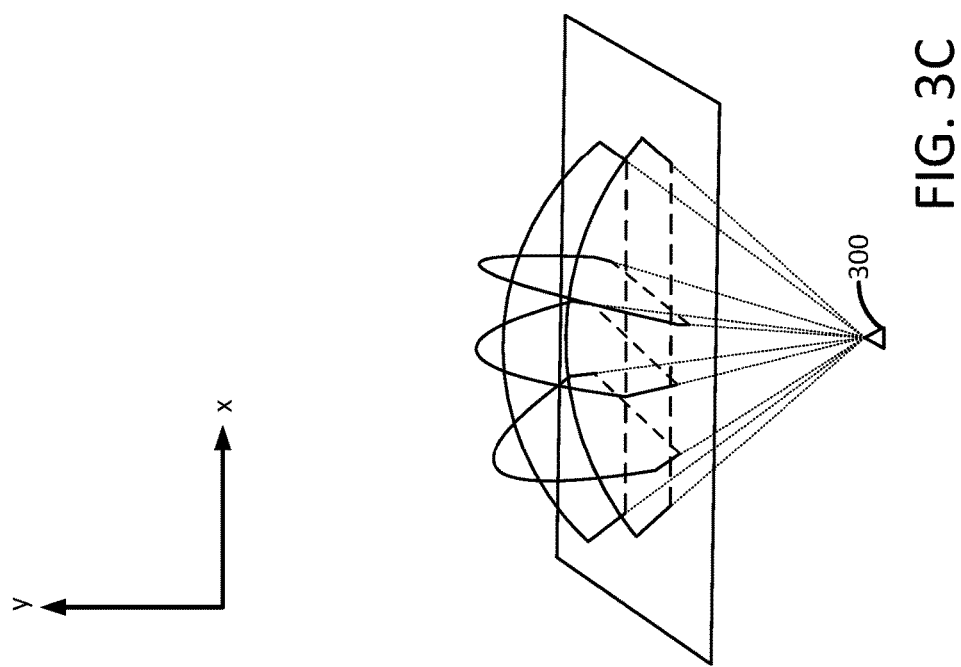
FIG. 3C
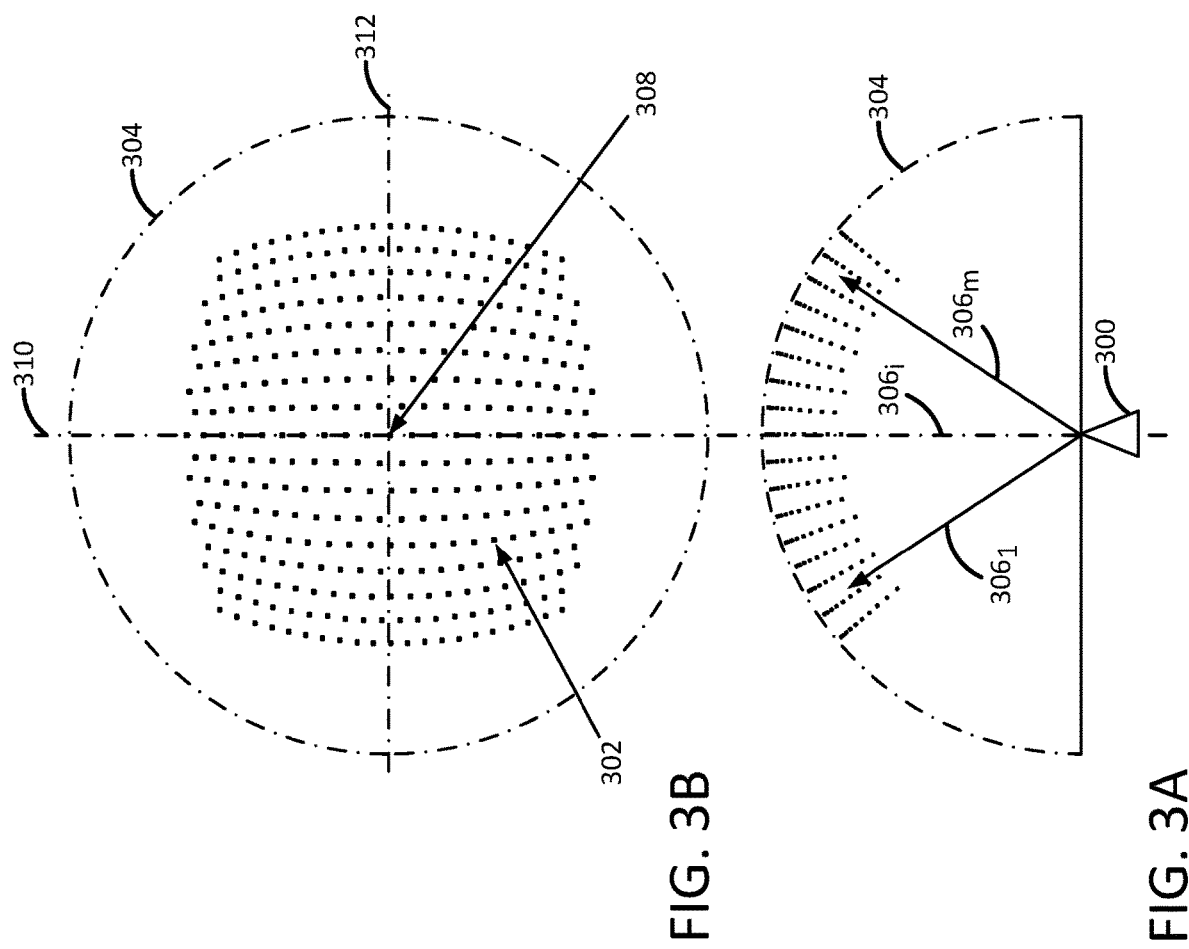
FIG. 3B
FIG. 3A

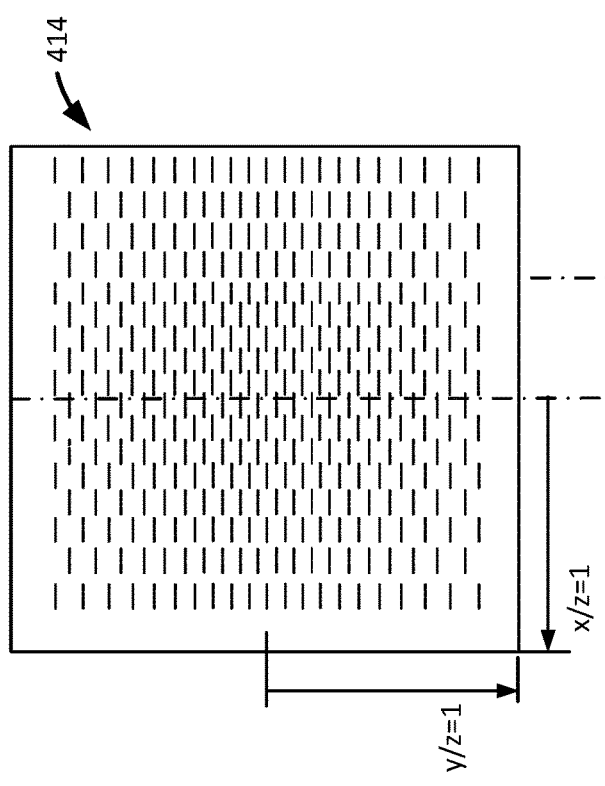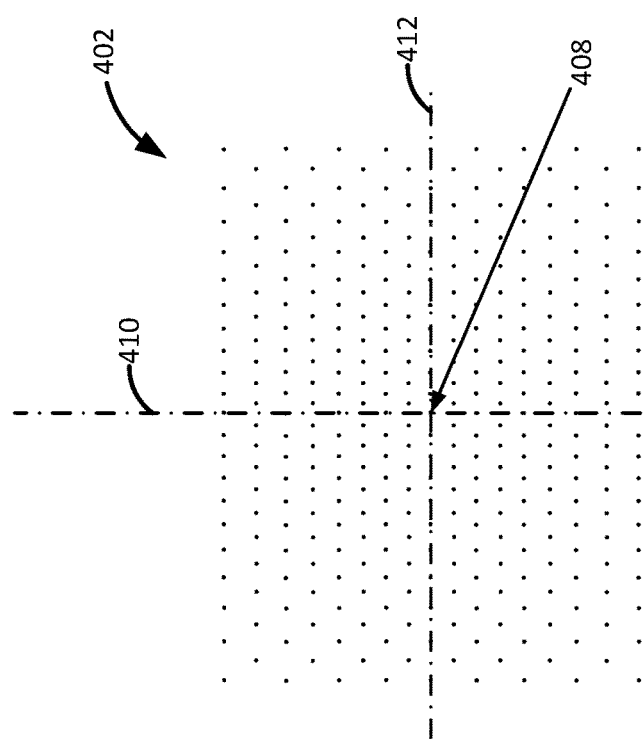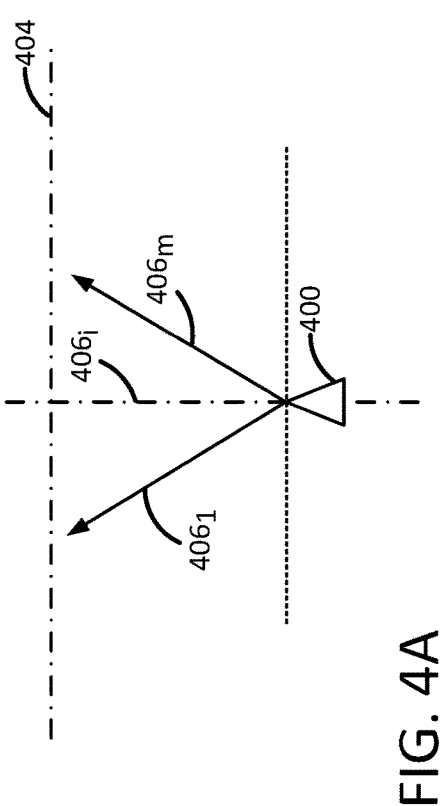
FIG. 4B
FIG. 4A
FIG. 4C

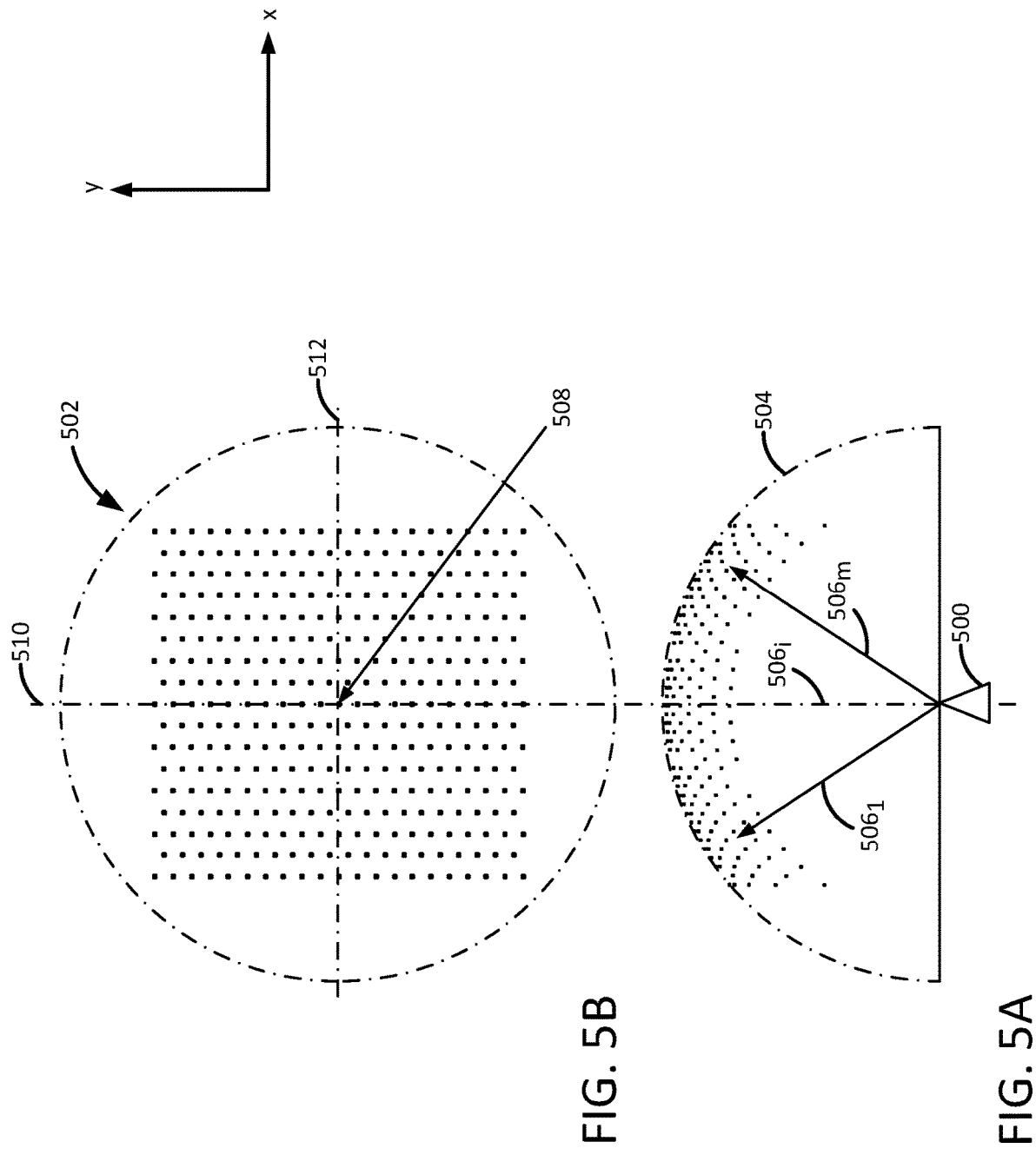

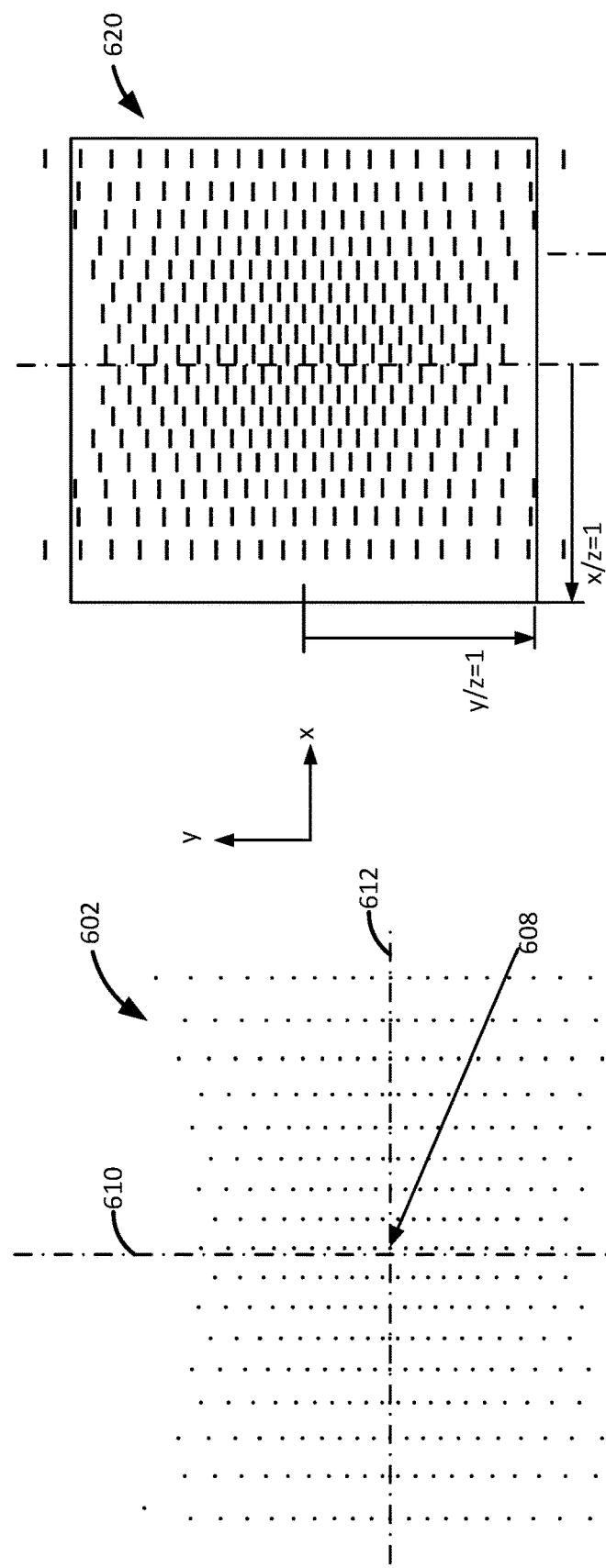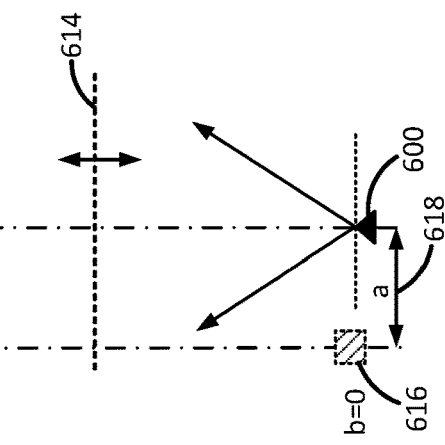
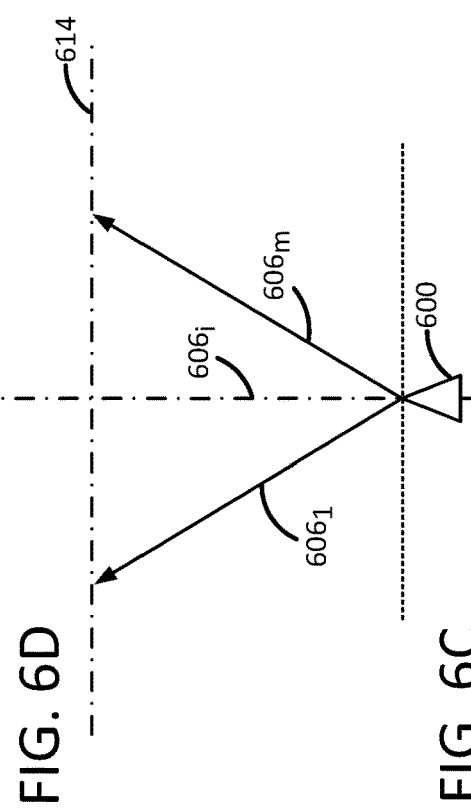
FIG. 6E
FIG. 6D
FIG. 6C

800

900

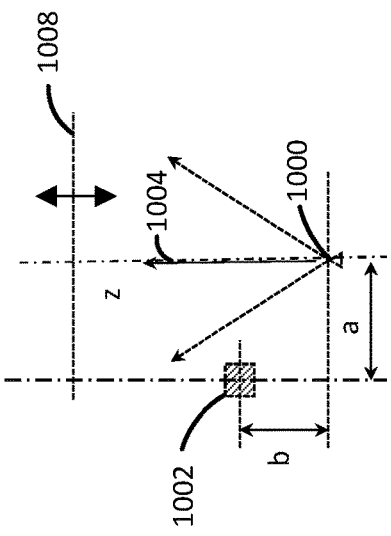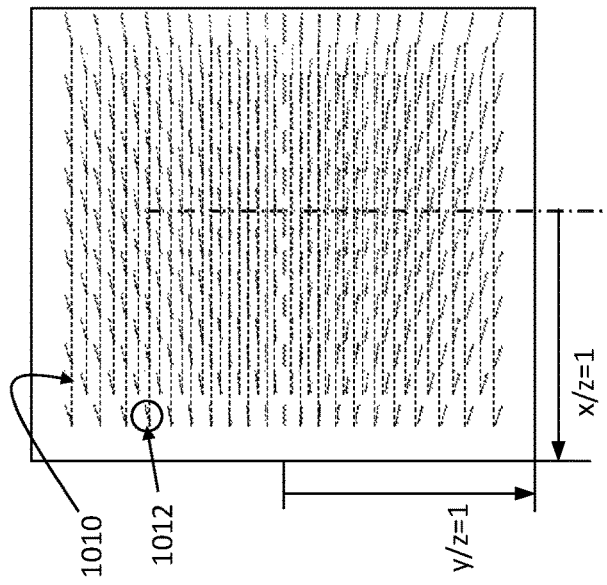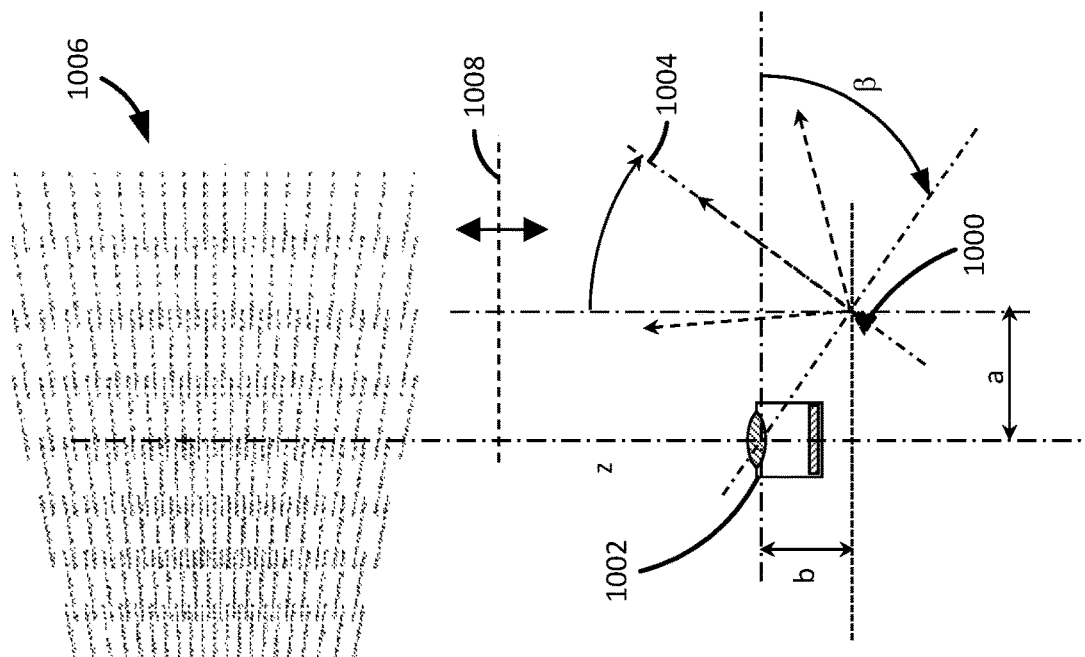
FIG. 10B
FIG. 10A

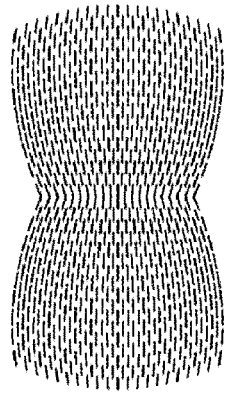

FIG. 11C
$\alpha=0, \theta_0=40, \beta(\text{optimal})=-40, \beta(\text{actual})=-40$
$\Delta\beta=0$

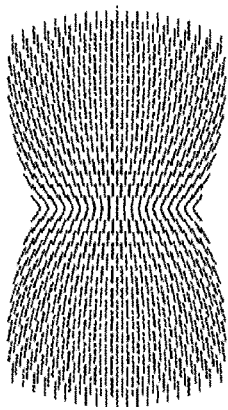

FIG. 11D
$\alpha=0, \theta_0=40, \beta(\text{optimal})=-40, \beta(\text{actual})=-46.7$
$\Delta\beta=-6.7$ FIG. 11E
$\alpha=0, \theta_0=40, \beta(\text{optimal})=-40, \beta(\text{actual})=-53.7$
$\Delta\beta=-13.7$

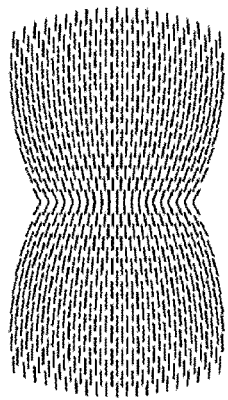

FIG. 11F
$\alpha=0, \theta_0=40, \beta(\text{optimal})=-40, \beta(\text{actual})=-31.2$
$\Delta\beta=+7.8$

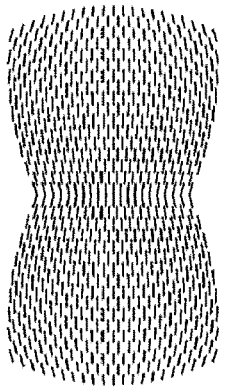

FIG. 11G
$\alpha=0, \theta_0=40, \beta(\text{optimal})=-40, \beta(\text{actual})=+15.6$
$\Delta\beta=+13.1$ α=30, θ₀=40, β(optimal)=−36, β(actual)=−36
Δβ=0

α=30, θ₀=40, β(optimal)=−36, β(actual)=−42.3
Δβ=−6.3

α=30, θ₀=40, β(optimal)=−36, β(actual)=−46.7
Δβ=−10.7

α=30, θ₀=40, β(optimal)=−36, β(actual)=−24.4
Δβ=+11.6

α=30, θ₀=40, β(optimal)=−36, β(actual)=−16.9
Δβ=+19.1

α=90, θ₀=40, β(optimal)=0, β(actual)=0
Δβ= 0

α=90, θ₀=40, β(optimal)=0, β(actual)= −16.9
Δβ= −16.9

α=90, θ₀=0, β(optimal)=0, β(actual)= +16.9
Δβ= +16.9

α=90, θ₀=40, β(optimal)=0, β(actual)= −8.6
Δβ= −8.6

α=90, θ₀=40, β(optimal)=0, β(actual)= +8.6
Δβ= +8.6

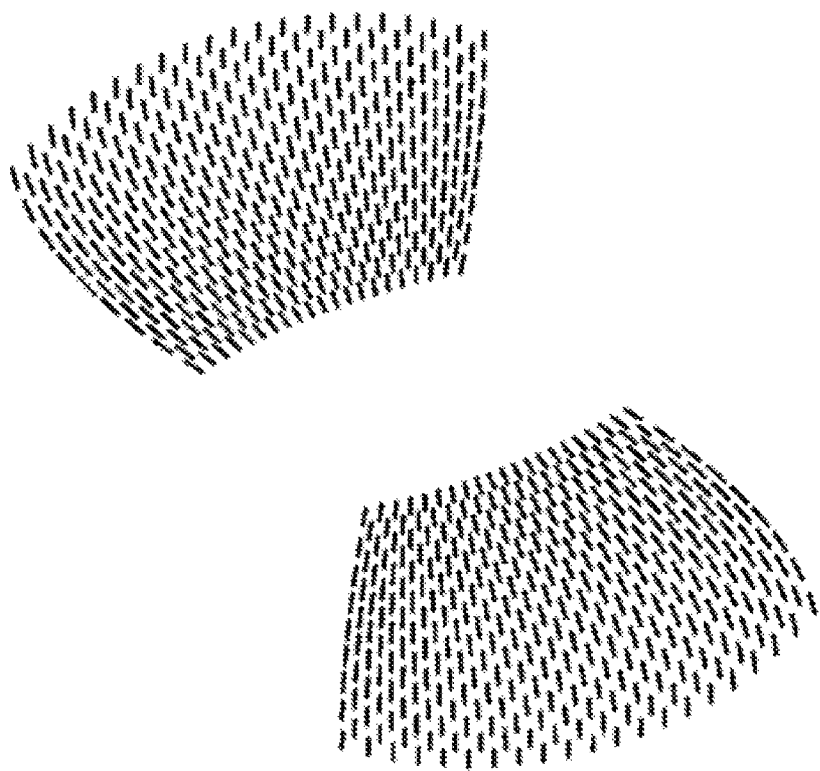

2100

US 10,679,076 B2

ADJUSTING THE PROJECTION SYSTEM OF A DISTANCE SENSOR TO OPTIMIZE A BEAM LAYOUT

CROSS REFERENCE TO RELATED APPLICATIONS

This application claims the priority of U.S. Provisional Patent Application Ser. No. 62/575,505, filed Oct. 22, 2017, which is herein incorporated by reference in its entirety. This application is also a continuation-in-part (CIP) of U.S. patent application Ser. No. 16/150,918, filed Oct. 3, 2018, which is also incorporated by reference in its entirety.

BACKGROUND

U.S. patent application Ser. Nos. 14/920,246, 15/149,323, and 15/149,429 describe various configurations of distance sensors. Such distance sensors may be useful in a variety of applications, including security, gaming, control of unmanned vehicles, and other applications.

The distance sensors described in these applications include projection systems (e.g., comprising lasers, diffractive optical elements, and/or other cooperating components) which project beams of light into a field of view. The beams of light spread out to create a pattern (of dots, dashes, or other artifacts). When the pattern is incident upon an object in the field of view, the distance from the sensor to the object can be calculated based on the appearance of the pattern (e.g., the positional relationships of the dots, dashes, or other artifacts) in one or more images of the field of view, which may be captured by the sensor's light receiving system (e.g., lens, image capturing device, and/or other components). The shape and dimensions of the object can also be determined.

SUMMARY

In an example, a method includes projecting a projection pattern onto a surface of an object from a projection point of a distance sensor, wherein the projection pattern is created by a plurality of beams of light projected from the projection point, wherein the plurality of beams of light creates a plurality of projection artifacts that is arranged on the surface of the object, wherein a layout of the plurality of projection artifacts depends on a positional relationship between the projection point and an image capturing device of the distance sensor, and wherein at least one parameter that defines the positional relationship between the projection point and an image capturing device of the distance sensor has been optimized, prior to the projecting, to minimize overlap of a plurality of trajectories associated with the plurality of projection artifacts, capturing an image of the object, including at least a portion of the adjusted projection pattern, and calculating a distance from the distance sensor to the object using information from the image.

In another example, a non-transitory machine-readable storage medium is encoded with instructions executable by a processor. When executed, the instructions cause the processor to perform operations including projecting a projection pattern onto a surface of an object from a projection point of a distance sensor, wherein the projection pattern is created by a plurality of beams of light projected from the projection point, wherein the plurality of beams of light creates a plurality of projection artifacts that is arranged on the surface of the object, wherein a layout of the plurality of projection artifacts depends on a positional relationship between the projection point and an image capturing device of the distance sensor, and wherein at least one parameter that defines the positional relationship between the projection point and an image capturing device of the distance sensor has been optimized, prior to the projecting, to minimize overlap of a plurality of trajectories associated with the plurality of projection artifacts, capturing an image of the object, including at least a portion of the adjusted projection pattern, and calculating a distance from the distance sensor to the object using information from the image.

In another example, an apparatus includes an image capturing device positioned to capture an image of a field of view and a projection point positioned outside a periphery of a lens of the image capturing device, the projection point being configured to project a plurality of projection beams into the field of view, wherein at least one parameter that defines a positional relationship between the image capturing device and the projection point is adjusted to minimize overlap of a plurality of trajectories associated with a plurality of projection artifacts created by the plurality of projection beams.

BRIEF DESCRIPTION OF THE DRAWINGS

FIG. 1 is a schematic diagram illustrating elements of a distance sensor;

FIG. 2 illustrates the trajectories for a plurality of dots that are part of an example pattern projected by a projection point of a distance sensor;

FIG. 3A illustrates a side view of one example of an arrangement of beams projected from a projection point;

FIG. 3B illustrates a head-on view of the projection pattern created by the arrangement of beams of FIG. 3A;

FIG. 3C illustrates a simplified isometric view of the projection pattern illustrated in FIGS. 3A and 3B;

FIG. 4A illustrates a side view of one example of an arrangement of beams projected from a projection point;

FIG. 4B illustrates a head-on view of the projection pattern 402 created by the arrangement of beams of FIG. 4A;

FIG. 4C illustrates a head-on view of the trajectories of the projection artifacts of FIGS. 4A and 4B when the pattern of FIGS. 4A and 4B is projected onto the flat surface;

FIG. 5A illustrates a side view of one example of an arrangement of beams projected from a projection point;

FIG. 5B illustrates a head-on view of the projection pattern created by the arrangement of beams of FIG. 5A;

FIG. 6C illustrates a side view of the projection pattern of FIGS. 6A and 6B projected onto a flat surface;

FIG. 6D illustrates a head-on view of the projection pattern of FIGS. 6A and 6B projected onto a flat surface;

FIG. 6E illustrates a head-on view of the trajectories of the projection artifacts of FIGS. 6A-6D when the pattern of FIGS. 6A-6D is projected onto the flat surface;

FIG. 10A illustrates a side view of the positional relationship between an example projection point and an example image capturing device of a distance sensor;

FIG. 10B further illustrates elements of the distance sensor of FIG. 10A;

FIGS. 11C-11G are charts plotting the trajectories of projection points emitted by the distance sensor of FIGS. 11A and 11B;

FIG. 17C is a chart plotting the trajectories of projection points emitted by the distance sensor of FIGS. 17A and 17B;

DETAILED DESCRIPTION

Figure 3D:
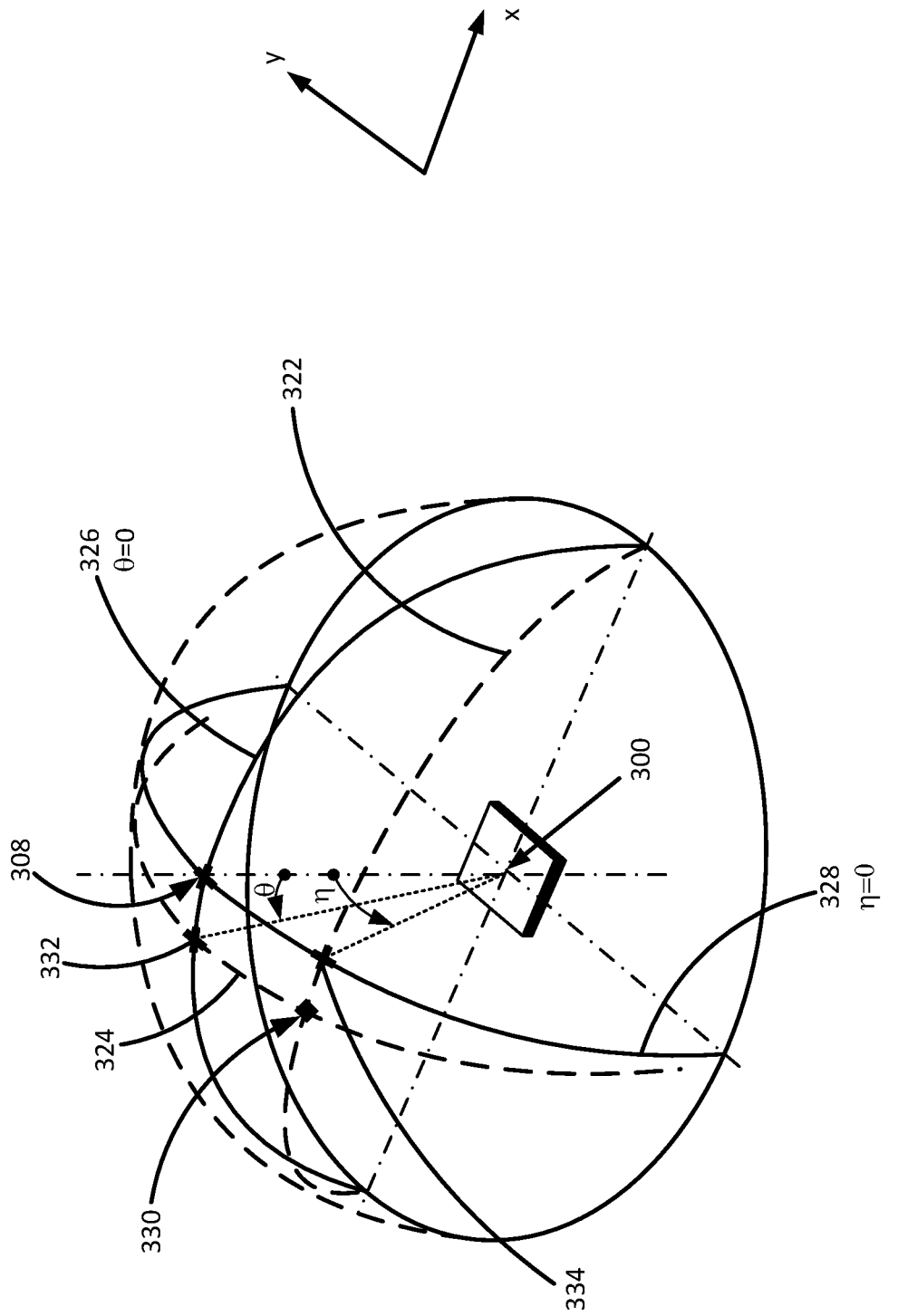
FIG. 3D illustrates the general shape of the projection pattern of FIGS. 3A-3C in a hemispherical field of view.

The present disclosure broadly describes an apparatus, method, and non-transitory computer-readable medium for adjusting the projection system of a distance sensor to optimize a beam layout for spherical triangulation calculations. As discussed above, distance sensors such as those described in U.S. patent application Ser. Nos. 14/920,246, 15/149,323, and 15/149,429 determine the distance to an object (and, potentially, the shape and dimensions of the object) by projecting beams of light that spread out to create a pattern (e.g., of dots, dashes, or other artifacts) in a field of view that includes the object. In some examples, the sensors include multiple "projection points," where a plurality of beams may be projected from each projection point. The plurality of beams may fan out to form a portion of the pattern. The appearance of the pattern may change with the distance to an object. For instance, if the pattern comprises a pattern of dots, the dots may appear closer to each other when the object is closer to the sensor, and may appear further away from each other when the object is further away from the sensor.

FIG. 1, for example, is a schematic diagram illustrating elements of a distance sensor similar to the sensors described in U.S. patent application Ser. Nos. 14/920,246, 15/149,323, and 15/149,429. As illustrated, a sensor may include a lens 100 of an image capturing device. The field of view of the lens 100 may be denoted by f. The sensor may also include a plurality of projection points (e.g., formed by a combination of light sources, diffractive optical elements, and/or other components) arranged around the perimeter of the lens 100; FIG. 1 illustrates one such projection point 102, where other projection points may be similarly configured and placed at different positions around the lens 100. The distance d from the central axis of the lens 100 to the central axis of the projection point 102 may also be referred to as a "baseline" of the sensor.

The projection point 102 projects a plurality of beams $104_1$-$104_n$ (hereinafter individually referred to as a "beam 104" or collectively referred to as "beams 104") of light, which fan out and form a pattern 106 of projection artifacts (e.g., dots, dashes, or the like) when the beams 104 are incident upon a surface. The plane of the pattern 106 may be parallel to the baseline d of the sensor. In the example illustrated in FIG. 1, the projection artifacts are dots. FIG. 1 illustrates the pattern 106 as it appears at a first distance D1 from the baseline d and also as it appears at a second distance D2 from the baseline d.

All beams 104 projected from the same projection point 102 will move in the same direction along the baseline d, according to object distance as described above. However, as the number of beams 104 projected from the same projection point 102 increases, the trajectories (i.e., moving ranges) of the artifacts (e.g., dots) produced by the beams 104 may appear closer together and may, in some cases, even overlap.

The trajectory of a projection artifact is determined by the positional relationship between the distance sensor's projection optical system (e.g., the set of optics, including light sources, diffractive optical elements, and other components that projects the beams of light) and the light receiving optical system (e.g., the lens, image capturing device, and other components that capture images of the projection artifacts) in the planar (e.g., lateral) direction and the height direction (e.g., the direction perpendicular to the lateral direction). The trajectory of a projection artifact may appear as a radial pattern or a line and describes the movement of the projection artifact as the distance between the sensor and an object into which the projection pattern is projected varies. More specifically, the trajectory of a projection artifact describes the projection artifact's movement relative to the distance sensor's image capturing device with variations in distance.

FIG. 2, for instance, illustrates the trajectories 200 for a plurality of dots that are part of an example pattern projected by a projection point of a distance sensor (e.g., such as projection point 102 of FIG. 1). The unshaded dots represent the locations of the dots at a first distance from the sensor baseline, while the shaded dots represent the locations of the dots at a second distance from the sensor baseline. A line or trajectory 200 connecting an unshaded dot to a shaded dot represents that the unshaded dot and the shaded dot are the same dot, depicted at different distances from the sensor baseline. As shown in FIG. 2, the trajectories 200 of some of the dots may overlap. Overlapping trajectories 200 are shown by the circles 202. When overlap of trajectories 200 occurs, it may be difficult to determine which beams projected from the projection points correspond to which dots in the projection pattern. This, in turn, may complicate the distance measurement calculations, as accurate calculations may rely on the ability to identify the beams that created the dots that are visible in an image.

Thus, an increase in the number of beams projected from a projection point of a distance sensor may increase the likelihood that there will be overlap in the trajectories of the projection artifacts created by the beams (and therefor increase the difficulty of the distance calculations). On the other hand, a large number of beams is generally considered advantageous because it provides better spatial coverage of the sensor's field of view for distance calculation purposes. As an additional consideration, it may be desirable to keep the number of projection points to a minimum in order to minimize manufacturing costs, sensor size, and sensor failure due to component damage. To maintain spatial coverage with fewer projection points, though, it may be necessary to project a greater number of beams from the projection points.

Examples of the present disclosure provide a beam arrangement for a distance sensor that minimizes the overlap of projection artifact trajectories as the number of beams projected from the sensor projection points increases. In particular, examples of the disclosure provide patterns having a distribution of projection artifacts that balances the need for spatial coverage with the need to minimize overlap of projection artifact trajectories. Examples of the disclosed patterns may be achieved by projecting, from each projection point, a plurality of beams that fans out symmetrically (in at least the x and y directions) from a center beam.

As discussed above, the trajectory of a projection artifact may appear as a radial pattern or a line. Examples of the present disclosure consider the fact that both the projection artifact trajectory and the lines of a projection pattern including a plurality of projection artifacts may appear to be linear. As such, the positional relationship between the projection artifact and the image capturing device of the distance sensor, the direction of the center projection artifact, or the rotational phase of the projection pattern created by a plurality of projection artifacts can be adjusted to minimize the overlaps in the trajectories of a plurality of projection artifacts forming a projection pattern. Further examples of the present disclosure account for the fact that when the plane that forms the projection pattern is curved, the angle formed by a projection artifact trajectory and the lines of the projection pattern may change gradually, which makes uniform elimination of trajectory overlap over the entire projection pattern more challenging.

Examples of the present disclosure provide a distance sensor in which the positional relationship between the distance sensor's projection optical system and light receiving optical system is adjusted in at least one of in the planar (e.g., lateral) direction and the height direction (e.g., the direction perpendicular to the lateral direction). For instance, each of the projection points may be adjusted to adjust a position of the projection point, and thereby also adjust the positional relationship of the projection point to the light receiving optical system. Adjustment of this positional relationship allows for optimization of the projection pattern in a manner the minimizes overlap of projection point trajectories.

Within the context of the present disclosure, "adjusting" a projection point refers to an adjustment of the positional relationship between the projection point and the image capturing device that is made in-factory. For instance, the adjustment may be made by calculating and selecting appropriate dimensions and positions for components of a distance sensor prior to assembly. The components may also be "pre-adjusted" during assembly of the distance sensor. However, any discussion of "adjusting" a projection point or its position is not meant to imply that the projection point is adjustable after assembly, e.g., in the field.

Further examples of the present disclosure describe a projection pattern (i.e., a pattern created by a plurality of projection artifacts) that has a generally rectangular shape, where the projection artifacts are arranged in a plurality of rows and columns. In this context, the projection artifact that lies in the center of the projection pattern may be considered the "origin" of the projection pattern. The row that intersects the origin may be referred to as the "latitude" line of the projection pattern, while the column that intersects the origin may be referred to as the "longitude" line of the projection pattern. In one example, the angle of projection of one or more beams from a projection point may be adjusted so that one or more of the latitude and longitude lines of a projection pattern is rotated by a predetermined angle to achieve an adjusted projection pattern that minimizes overlap of projection artifact trajectories.

FIG. 3A illustrates a side view of one example of an arrangement of beams projected from a projection point 300, while FIG. 3B illustrates a head-on view of the projection pattern 302 created by the arrangement of beams of FIG. 3A. In the example of FIGS. 3A and 3B, the arrangement of beams is projected onto a spherical surface 304, i.e., a surface having a rounded (non-flat) shape.

As illustrated, the projection point 300 projects a plurality of beams $306_1$-$306_m$ (hereinafter individually referred to as a "beam 306" or collectively referred to as "beams 306"). The plurality of beams 306 includes a center beam $306_i$. The remaining beams 306 fan out from the center beam $306_i$ in both directions along the x axis and in both direction along the y axis. In order to simplify the drawings, the beams 306 that may reside between the first beam $306_1$ and the center beam $306_i$, and between the center beam $306_i$ and the last beam $306_m$, are not illustrated in FIG. 3A.

The resultant pattern 302 created by the plurality of beams 306 comprises a plurality of projection artifacts (e.g., dots) arranged in a rectangular grid, as shown in FIG. 3B. Rows of the grid extend along the x axis of the illustrated coordinate system, while columns of the grid extend along the y axis. The rows and columns are arranged in an azimuth corresponding to the x axis and y axis from the center beam $306_i$ at intervals according to a predefined rule (e.g., equal angular intervals, equal sine value intervals, etc.).

The projection artifacts may be arranged in a staggered pattern (e.g., where each row or column is offset from the adjacent rows or columns, so that all projection artifacts along a row or along a column may not be collinear) or in a continuous pattern (e.g., where each row or column is aligned with the adjacent rows or columns, so that all projection artifacts along a row or along a column are collinear). Whether the pattern of projection artifacts is staggered or continuous, the pattern is regular (i.e., the placement of projection artifacts is regular rather than random) and may extend outward from a center projection artifact 308 created by the center beam $306_i$. The center projection artifact 308 lies at the intersection of a "longitude line" 310 (or central column) and a "latitude line" 312 (or center row) and may be considered the "origin" of the pattern 302.

In one example, when the pattern 302 is being projected onto a spherical surface 304, the longitude line 310 may be rotated by a first predetermined angle around the y axis. Alternatively or in addition, the latitude line 312 may be rotated by a second predetermined angle around the x axis.

This is shown in FIG. 3B, where the shape of the pattern 302 curves to confirm to the rounded shape of the spherical surface 304.

Since the spherical surface 304 onto which the central projection artifact 308, the rotated longitude line 310, and/or rotated latitude line 312 are projected is always a plane, each row or column of the pattern 302 will comprise a plane that passes through the central projection artifact 308. As shown in FIG. 3C, which illustrates a simplified, isometric view of the projection pattern 302 illustrated in FIGS. 3A and 3B, each line of projection artifacts that is projected onto the plane of the spherical surface 304 will become a straight line.

In the example illustrated in FIG. 3C, the surface formed by the projection point 300 and the latitude line of the pattern 302 is conical (with the projection point 300 as the summit or narrow end of the cone), while the surface formed by the projection point 300 and the longitude line of the pattern 302 is a flat or planar surface. This is why the grid lines formed by the projection points become curved lines. Grid lines arranged on the longitude line are straight lines, while rectangular shapes (angles formed by respective lines) are uniform with respect to the difference of a three-dimensional position. In one example, the distance from the distance sensor to an object, according to the example projection pattern 302, corresponds to the radius of the spherical surface 304 centered on the principal point of the lens of the distance sensor. The sensor may be positioned in the center of a plurality of projection points including the projection point 300, and the principal point may be the front nodal point of the sensor's lens.

FIG. 3D illustrates the general shape of the projection pattern 302 of FIGS. 3A-3C in a hemispherical field of view. More specifically, FIG. 3D illustrates the orientations of the projection pattern's grid lines relative to the projection point 300. As illustrated, the projection pattern 302 may be adjusted by rotating one or more of the latitude line 326 and the longitude line 328 by predetermined angles η and θ, respectively. η and θ may be equal or unequal, depending upon the application and the shape of the object onto which the projection pattern 302 is to be projected.

For instance, the latitude line 326 may be shifted in the y direction (i.e., in a direction along the y axis) to a new position 322. In one example, the shift of the latitude line 326 to the new position 322 is accomplished by rotating the latitude line 326 by an angle of n.

The longitude line 328 may be shifted in the x direction (i.e., in a direction along the x axis) to a new position 324. In one example, the shift of the longitude line 328 to the new position 324 is accomplished by rotating the longitude line 328 by an angle of θ.

FIG. 3D illustrates a few of the example projection artifacts that may be created by this beam layout. In addition to the center projection artifact 308, which lies at an intersection of the original positions of the latitude line 326 (for which η=0) and the longitude line 328 (for which θ=0), the following projection artifacts are also shown: projection artifact 330, which lies at coordinates of (θ, η) from the center projection artifact 308 (e.g., is shifted in both the x and y directions) and represents a new position of the center projection artifact 308 in the adjusted pattern; projection artifact 332, which lies at coordinates (8, 0); and projection artifact 334, which lies at coordinates (θ, η).

FIG. 4A illustrates a side view of one example of an arrangement of beams projected from a projection point 400, while FIG. 4B illustrates a head-on view of the projection pattern 402 created by the arrangement of beams of FIG. 4A.

In the example of FIGS. 4A and 4B, the arrangement of beams is projected onto a flat surface 404.

As illustrated, the projection point 400 projects a plurality of beams $406_1$-$406_m$ (hereinafter individually referred to as a "beam 406" or collectively referred to as "beams 406"). The plurality of beams 406 includes a center beam $406_i$. The remaining beams 406 fan out from the center beam $406_i$ in both directions along the x axis and in both direction along the y axis. In order to simplify the drawings, the beams 406 that may reside between the first beam $406_1$ and the center beam $406_i$, and between the center beam $406_i$ and the last beam $406_m$, are not illustrated in FIG. 4A.

The resultant pattern 402 created by the plurality of beams 406 comprises a plurality of projection artifacts (e.g., dots) arranged in a rectangular grid, as shown in FIG. 4B. Rows of the grid extend along the x axis of the illustrated coordinate system, while columns of the grid extend along the y axis. The rows and columns are arranged in an azimuth corresponding to the x axis and y axis from the center beam $406_i$ at intervals according to a predefined rule (e.g., equal angular intervals, equal sine value intervals, etc.).

The projection artifacts may be arranged in a staggered pattern (e.g., where each row or column is offset from the adjacent rows or columns, so that all projection artifacts along a row or along a column may not be collinear) or in a continuous pattern (e.g., where each row or column is aligned with the adjacent rows or columns, so that all projection artifacts along a row or along a column are collinear). Whether the pattern of projection artifacts is staggered or continuous, the pattern is regular (i.e., the placement of projection artifacts is regular rather than random) may extend outward from a center projection artifact 408 created by the center beam $406_i$. The center projection artifact 408 lies at the intersection of a longitude line 410 and a latitude line 412 and may be considered the "origin" of the pattern 402.

FIG. 4C illustrates a head-on view of the trajectories 414 of the projection artifacts of FIGS. 4A and 4B when the pattern 402 of FIGS. 4A and 4B is projected onto the flat surface 404. As illustrated, the trajectories 414 do not overlap.

FIG. 4C also shows a position of the lens 416 in relation to the projection point 400. As shown by the baseline 418, the projection point 400 is positioned some distance a in the radial or x direction from the lens 416. However, in the y direction, there is zero difference between the position of the projection point 416 and the lens. In other words, the lens 416 and the projection point 400 may be mounted in the same plane, e.g., such that the projection point 400 is level with the principal point (e.g., front nodal point) of the lens's image capturing device in the direction of the image capturing device's optical axis.

FIG. 5A illustrates a side view of one example of an arrangement of beams projected from a projection point 500, while FIG. 5B illustrates a head-on view of the projection pattern 502 created by the arrangement of beams of FIG. 5A. In the example of FIGS. 5A and 5B, the arrangement of beams is projected onto a spherical surface 504, i.e., a surface having a rounded (non-flat) shape.

As illustrated, the projection point 500 projects a plurality of beams $506_1$-$506_m$ (hereinafter individually referred to as a "beam 506" or collectively referred to as "beams 506"). The plurality of beams 506 includes a center beam $506_i$. The remaining beams 506 fan out from the center beam $506_i$ in both directions along the x axis and in both direction along the y axis. In order to simplify the drawings, the beams 506 that may reside between the first beam $506_1$ and the center beam $506_i$, and between the center beam $506_i$ and the last beam $506_m$, are not illustrated in FIG. 5A.

The resultant pattern 502 created by the plurality of beams 506 comprises a plurality of projection artifacts (e.g., dots) arranged in a rectangular grid, as shown in FIG. 5B. Rows of the grid extend along the x axis of the illustrated coordinate system, while columns of the grid extend along the y axis. The rows and columns are arranged in an azimuth corresponding to the x axis and y axis from the center beam $506_i$ at intervals according to a predefined rule (e.g., equal angular intervals, equal sine value intervals, etc.).

The projection artifacts may be arranged in a staggered pattern (e.g., where each row or column is offset from the adjacent rows or columns, so that all projection artifacts along a row or along a column may not be collinear) or in a continuous pattern (e.g., where each row or column is aligned with the adjacent rows or columns, so that all projection artifacts along a row or along a column are collinear). Whether the pattern of projection artifacts is staggered or continuous, the pattern is regular (i.e., the placement of projection artifacts is regular rather than random) may extend outward from a center projection artifact 508 created by the center beam $506_i$. The center projection artifact 508 lies at the intersection of a longitude line 510 and a latitude line 512 and may be considered the "origin" of the pattern 502.

Figure 5D:
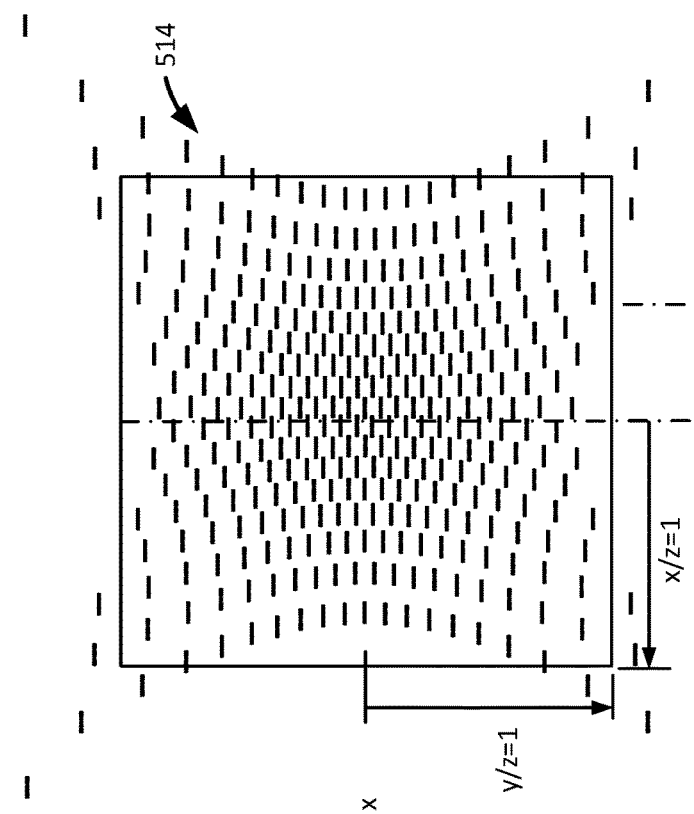
FIG. 5D illustrates a head-on view of the projection pattern of FIGS. 5A and 5B projected onto a flat surface.
Figure 5C:
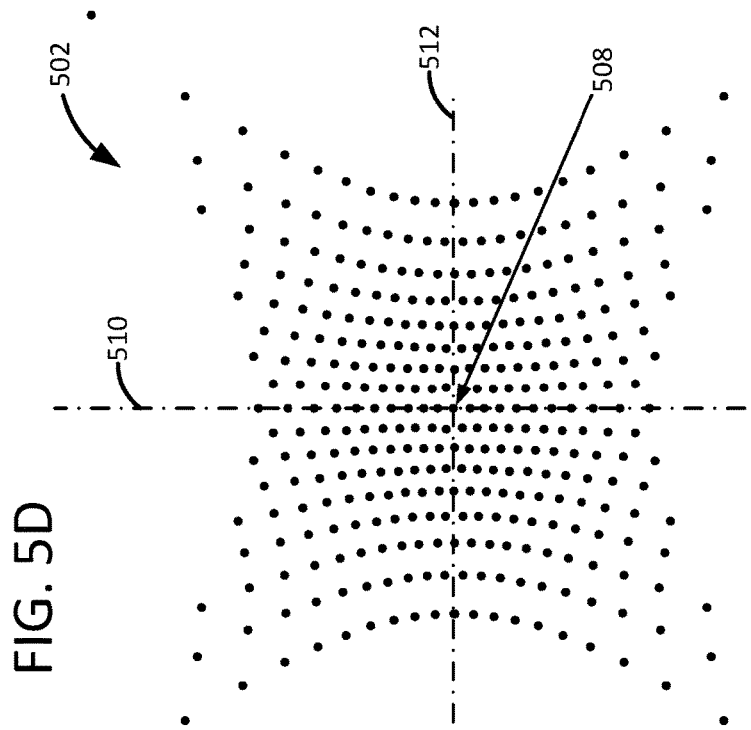
FIG. 5C illustrates a side view of the projection pattern of FIGS. 5A and 5B projected onto a flat surface.

FIG. 5C illustrates a side view of the projection pattern 502 of FIGS. 5A and 5B projected onto a flat surface 516, while FIG. 5D illustrates a head-on view of the projection pattern 502 of FIGS. 5A and 5B projected onto the flat surface 516. As illustrated in FIG. 5C, unlike when the pattern 502 is projected onto the flat surface 516, the pattern 502 bends. As discussed in connection with FIG. 5E, below, this may cause the trajectories of the projection artifacts to overlap. This stands in contrast to the example of FIGS. 5A and 5B, where the pattern 502 is projected onto the spherical surface 504 and maintains its generally rectangular grid shape.

Figure 5E:
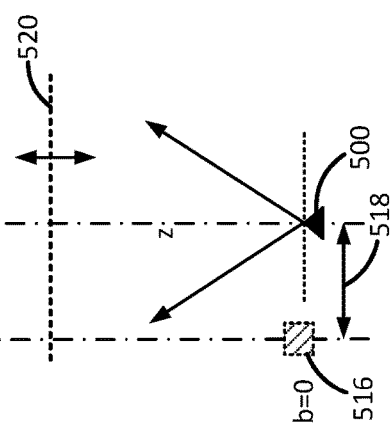
FIG. 5E illustrates a head-on view of the trajectories of the projection artifacts of FIGS. 5A-5D when the pattern of FIGS. 5A-5D is projected onto the flat surface.

FIG. 5E illustrates a head-on view of the trajectories 514 of the projection artifacts of FIGS. 5A-5D when the pattern 502 of FIGS. 5A-5D is projected onto the flat surface 520. As illustrated, the trajectories 514 overlap when projected onto the flat surface 520.

FIG. 5E also shows a position of the lens 516 in relation to the projection point 500. As shown by the baseline 518, the projection point 500 is positioned some distance a in the radial or x direction from the lens 516. However, in the y direction, there is zero difference between the position of the projection point 500 and the lens 516. In other words, the lens 516 and the projection point 500 may be mounted in the same plane, e.g., such that the projection point 500 is level with the principal point (e.g., front nodal point) of the lens's image capturing device in the direction of the image capturing device's optical axis.

Figure 5F:
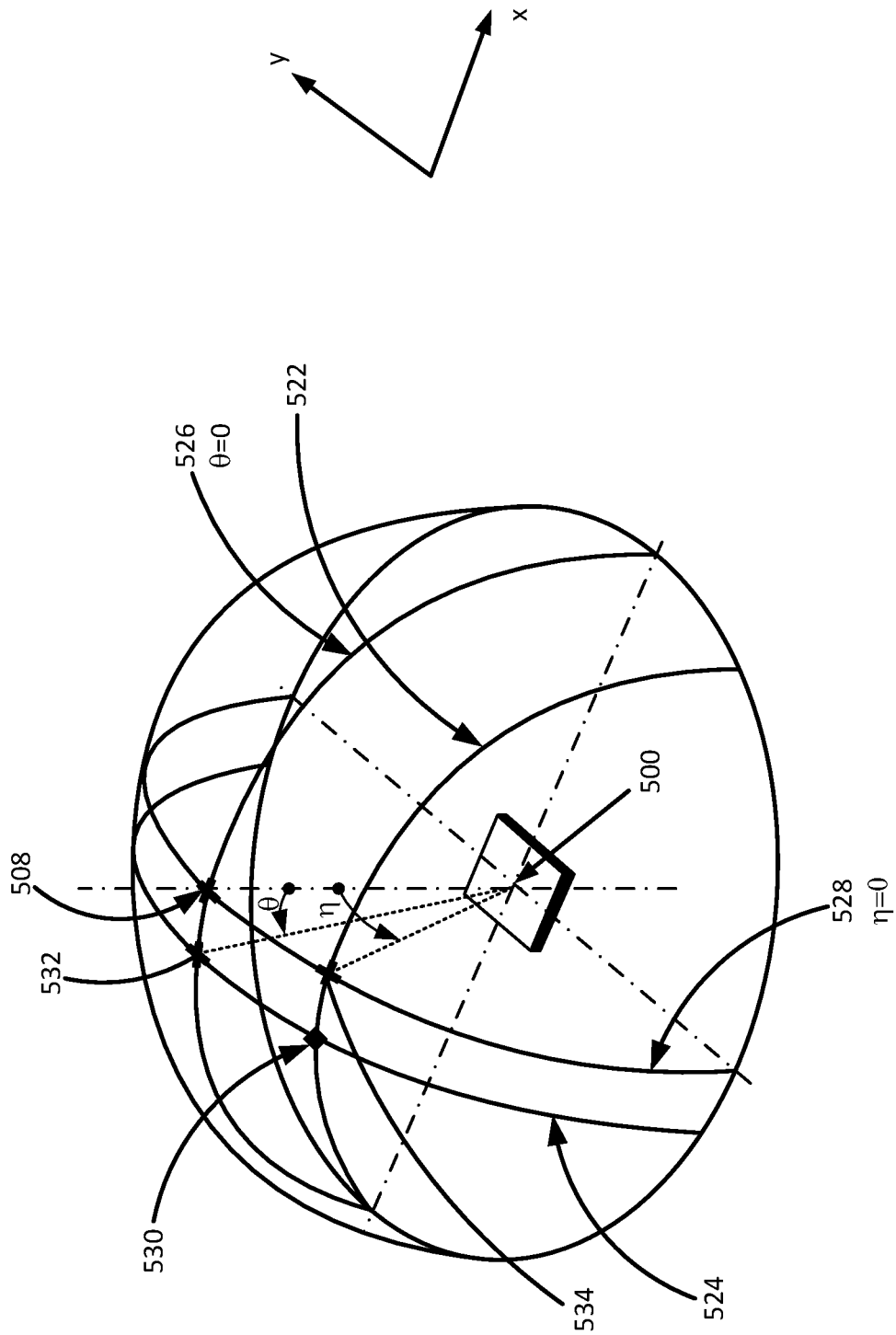
FIG. 5F illustrates the general shape of the projection pattern of FIGS. 5A-5E in a hemispherical field of view.

FIG. 5F illustrates the general shape of the projection pattern 502 of FIGS. 5A-5E in a hemispherical field of view. More specifically, FIG. 5F illustrates the orientations of the projection pattern's grid lines relative to the projection point 500. As illustrated, the projection pattern 502 may be adjusted by rotating one or more of the latitude line 526 and the longitude line 528 by predetermined angles η and θ, respectively. η and θ may be equal or unequal, depending upon the application and the shape of the object onto which the projection pattern 502 is to be projected.

For instance, the latitude line 526 may be shifted in the y direction (i.e., in a direction along the y axis) to a new position 522. In one example, the shift of the latitude line 526 to the new position 522 is accomplished by rotating the latitude line 526 by an angle of η.

The longitude line 528 may be shifted in the x direction (i.e., in a direction along the x axis) to a new position 524. In one example, the shift of the longitude line 528 to the new position 524 is accomplished by rotating the longitude line 528 by an angle of θ.

FIG. 5F illustrates a few of the example projection artifacts that may be created by this beam layout. In addition to the center projection artifact 508, which lies at an intersection of the original positions of the latitude line 526 (for which η=0) and the longitude line 528 (for which η=0), the following projection artifacts are also shown: projection artifact 530, which lies at coordinates of (θ, η) from the center projection artifact 508 (e.g., is shifted in both the x and y directions) and represents a new position of the center projection artifact 508 in the adjusted pattern; projection artifact 532, which lies at coordinates (θ, η), and projection artifact 534, which lies at coordinates (θ, 0).

Figures 6A, 6B:
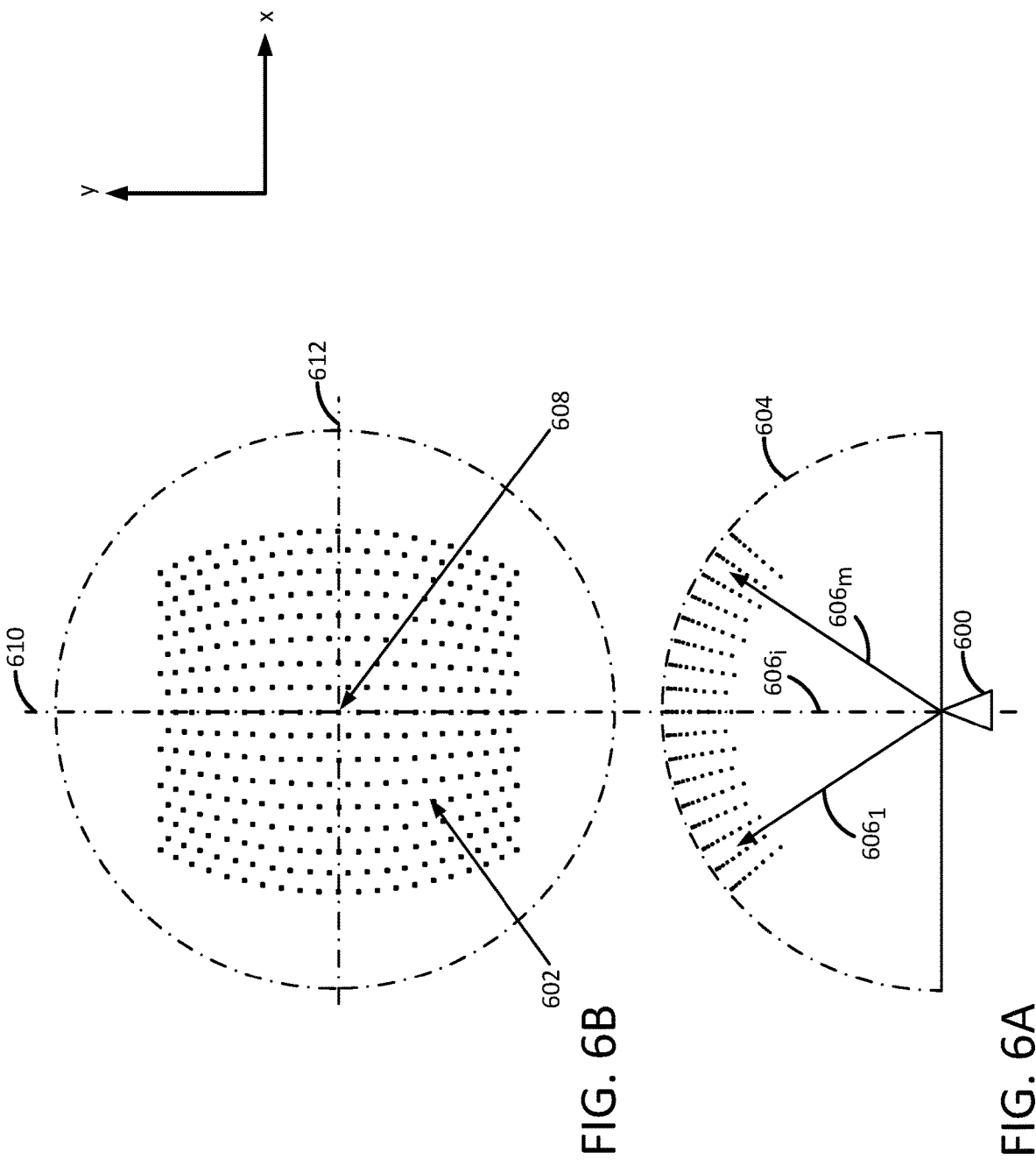
FIG. 6A illustrates a side view of one example of an arrangement of beams projected from a projection point.
FIG. 6B illustrates a head-on view of the projection pattern created by the arrangement of beams of FIG. 6A.

FIG. 6A illustrates a side view of one example of an arrangement of beams projected from a projection point 600, while FIG. 6B illustrates a head-on view of the projection pattern 602 created by the arrangement of beams of FIG. 6A. In the example of FIGS. 6A and 6B, the arrangement of beams is projected onto a spherical surface 604, i.e., a surface having a rounded (non-flat) shape.

As illustrated, the projection point 600 projects a plurality of beams $606_1$-$606_m$ (hereinafter individually referred to as a "beam 606" or collectively referred to as "beams 606"). The plurality of beams 606 includes a center beam $606_i$. The remaining beams 606 fan out from the center beam $606_i$ in both directions along the x axis and in both direction along the y axis. In order to simplify the drawings, the beams 606 that may reside between the first beam $606_1$ and the center beam $606_i$, and between the center beam $606_i$ and the last beam $606_m$, are not illustrated in FIG. 6A.

The resultant pattern 602 created by the plurality of beams 606 comprises a plurality of projection artifacts (e.g., dots) arranged in a rectangular grid, as shown in FIG. 6B. Rows of the grid extend along the x axis of the illustrated coordinate system, while columns of the grid extend along the y axis. The rows and columns are arranged in an azimuth corresponding to the x axis and y axis from the center beam $606_i$ at intervals according to a predefined rule (e.g., equal angular intervals, equal sine value intervals, etc.).

The projection artifacts may be arranged in a staggered pattern (e.g., where each row or column is offset from the adjacent rows or columns, so that all projection artifacts along a row or along a column may not be collinear) or in a continuous pattern (e.g., where each row or column is aligned with the adjacent rows or columns, so that all projection artifacts along a row or along a column are collinear).

Whether the pattern of projection artifacts is staggered or continuous, the pattern is regular (i.e., the placement of projection artifacts is regular rather than random) may extend outward from a center projection artifact 608 created by the center beam $606_i$. The center projection artifact 608 lies at the intersection of a longitude line 610 and a latitude line 612 and may be considered the "origin" of the pattern 602.

In one example, when the pattern 602 is being projected onto a spherical surface 604 centered on the center projection artifact 608, the pattern 602 may take a shape that resembles looking directly at the longitude (e.g., meridian) and latitude (e.g., equator) lines of the Earth from just above the Earth's equator, as shown in FIG. 6B.

FIG. 6C illustrates a side view of the projection pattern 602 of FIGS. 6A and 6B projected onto a flat surface, while FIG. 6D illustrates a head-on view of the projection pattern 602 of FIGS. 6A and 6B projected onto a flat surface.

FIG. 6E illustrates a head-on view of the trajectories 620 of the projection artifacts of FIGS. 6A-6D when the pattern 602 of FIGS. 6A-6D is projected onto the flat surface 614. As illustrated, the trajectories 620 do not overlap.

FIG. 6E also shows a position of the lens 616 in relation to the projection point 600. As shown by the baseline 618, the projection point 600 is positioned some distance a in the radial or x direction from the lens 616. However, in the y direction, there is zero difference between the position of the projection point 600 and the lens 616. In other words, the lens 616 and the projection point 600 may be mounted in the same plane, e.g., such that the projection point 600 is level with the principal point (e.g., front nodal point) of the lens's image capturing device in the direction of the image capturing device's optical axis.

Figure 7:
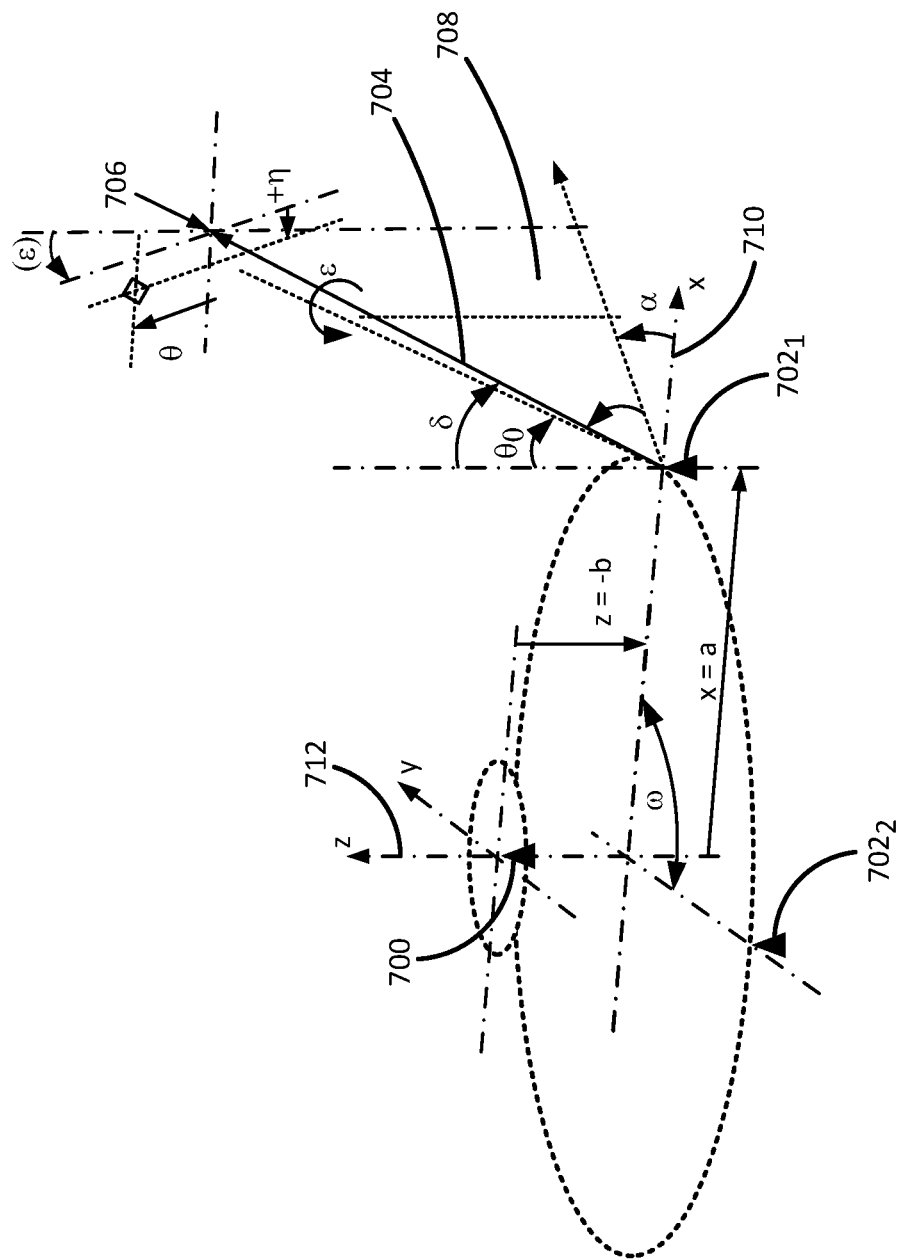
FIG. 7 illustrates an example projection beam alignment of the present disclosure.

FIG. 7 illustrates an example projection beam alignment of the present disclosure. In particular, FIG. 7 illustrates various components of a distance sensor, including the front nodal point 700 of the lens/image capturing device, a first projection point $702_1$, and a second projection point $702_2$.

As illustrated, the front nodal point 700 is positioned a lateral distance (e.g., along the x axis) a from each of the first projection point $702_1$ and the second projection point $702_2$. The first projection point $702_1$ and the second projection point $702_2$ are positioned a distance b behind (e.g., along the z axis) the front nodal point 700. Moreover, an angle of w is defined between the first projection point $702_1$ and the second projection point $702_2$ (and between any other projection points that may be part of the distance sensor).

Taking the first projection point $702_1$ as an example, the first projection point $702_1$ projects a plurality of beams of light, including a center beam 704. For the sake of simplicity, only the center beam 704 is illustrated in FIG. 7. The center beam 704 creates a center projection artifact 706 of a projection pattern that is created by the plurality of beams. For the sake of simplicity, only the center projection artifact 706 is illustrated in FIG. 7.

The orientation of the center beam 704 relative to the first projection point $702_1$ may be described by a plurality of angles. For instance, an angle of a may be defined between a plane 708 defined by the center beam 704 and a radial line 710 passing through the central axis 712 of the front nodal point 700 and the first projection point $702_1$.

A rolling axis ε shows how the center beam 706 may be rotated to adjust the position of the center projection artifact 706. The center beam may be rotated by an angle of θ along the y axis and/or by an angle of η along the x axis. Moreover, and angle of δ is defined between the center beam 706 and a line that passes through the first projection point $702_1$ at an angle that is parallel to the central axis 712 of the front nodal point 700.

Figure 8:
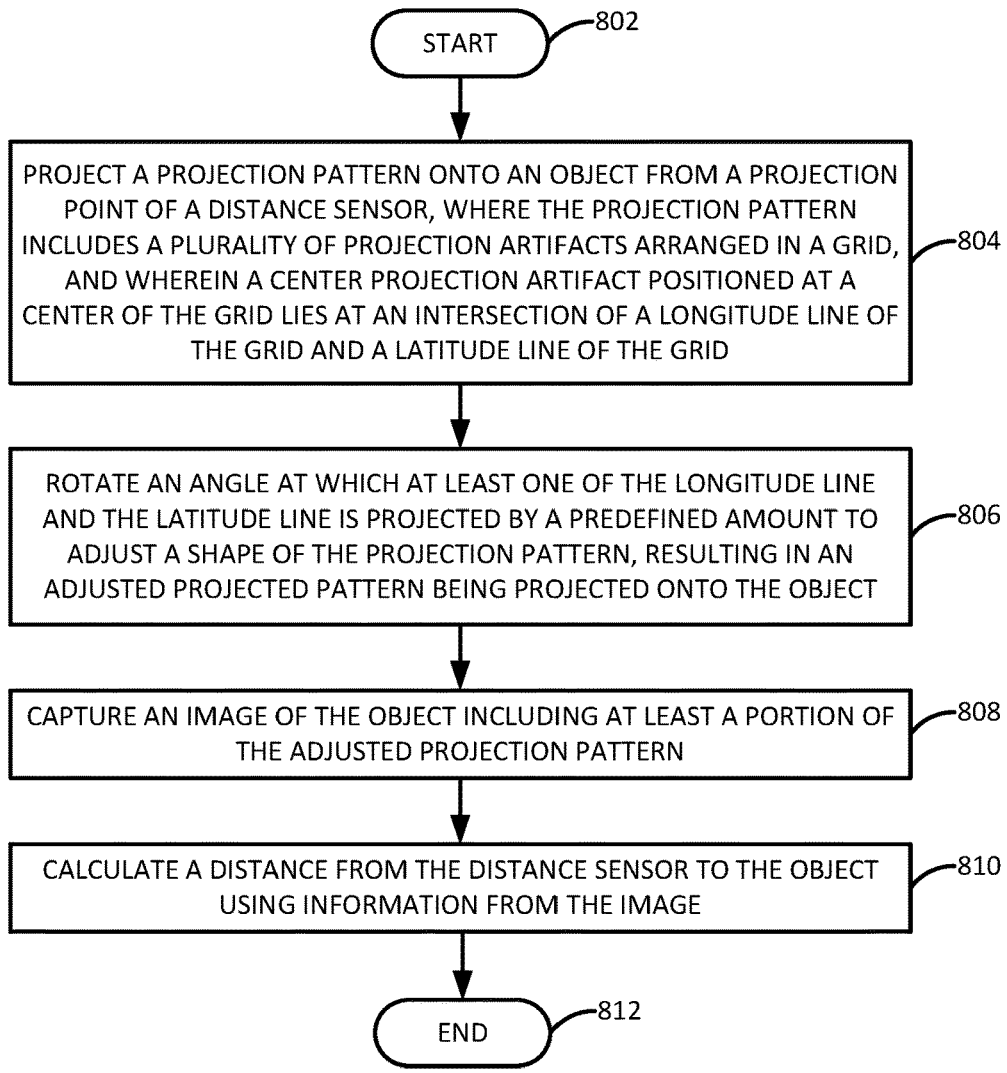
FIG. 8 illustrates a flow diagram of an example method for calculating the distance from a sensor to an object.

FIG. 8 illustrates a flow diagram of an example method 800 for calculating the distance from a sensor to an object. In one embodiment, the method 800 may be performed by a processor integrated in an imaging sensor (such as any an imaging sensor of a distance sensor) or a general purpose computing device as illustrated in FIG. 9 and discussed below.

The method 800 begins in step 802. In step 804, a projection pattern may be projected onto an object from a projection point of a distance sensor. As discussed above, the projection pattern may be created by projecting a plurality of beams from the projection point such that, when the plurality of beams is incident upon the object, a pattern of projection artifacts (e.g., dots, dashes, x's or the like) is visible at least by an imaging sensor. The pattern may comprise a rectangular grid into which the projection artifacts are arranged (e.g., as a plurality of rows and a plurality of columns).

As also discussed above, a center projection artifact of the projection pattern is created at an intersection of a longitude line (e.g., center column) and a latitude line (e.g., center row) of the projection pattern.

In step 806, an angle at which at least one of the longitude line and the latitude line is projected may be rotated by a predefined amount to adjust a shape of the projection pattern, resulting in an adjusted projection pattern being projected onto the object. In one example, the shape of the projection pattern is adjusted to compensate for a shape of the object onto which the projection pattern is projected. For instance, if the object has a spherical or rounded surface, the projection pattern may appear distorted if not properly adjusted. This distortion may cause the trajectories of some projection artifacts to overlap. In one example, the longitude line may be rotated from its original position by a first predetermined angle, while the latitude line is rotated from its original position by a second predetermined angle. The first predetermined angle and the second predetermine dangle may be equal or unequal.

In step 808, at least one image of the object may be captured. At least a portion of the adjusted projection pattern may be visible on the surface of the object.

In step 810, the distance from the distance sensor to the object may be calculated using information from the image(s) captured in step 808. In one embodiment, a triangulation technique is used to calculate the distance. For example, the positional relationships between the plurality of projection artifacts that make up the projection pattern can be used as the basis for the calculation.

The method 800 ends in step 812. The method 800 may be repeated (either in parallel or sequentially) for additional projection points of the distance sensor.

It should be noted that although not explicitly specified, some of the blocks, functions, or operations of the method 800 described above may include storing, displaying and/or outputting for a particular application. In other words, any data, records, fields, and/or intermediate results discussed in the method 800 can be stored, displayed, and/or outputted to another device depending on the particular application. Furthermore, blocks, functions, or operations in FIG. 8 that recite a determining operation, or involve a decision, do not imply that both branches of the determining operation are practiced. In other words, one of the branches of the determining operation may not be performed, depending on the results of the determining operation.

As discussed above, examples of the present disclosure provide a distance sensor in which the positional relationship between the distance sensor's projection optical system and light receiving optical system is freely adjustable in at least one of in the planar (e.g., lateral) direction and the height direction (e.g., the direction perpendicular to the lateral direction).

Figure 9B:
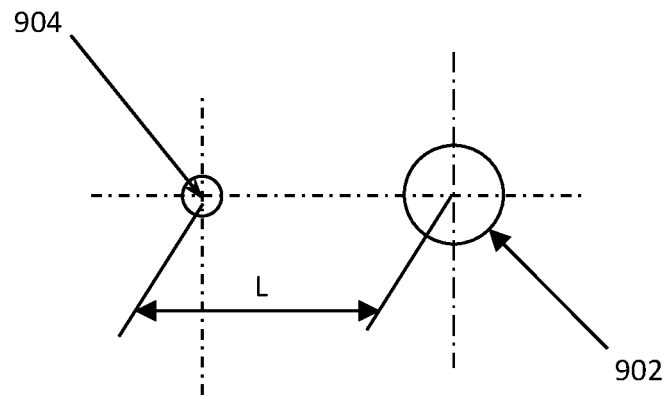
FIG. 9B is a schematic diagram illustrating a top view of elements of the distance sensor of FIG. 9A.
Figure 9A:
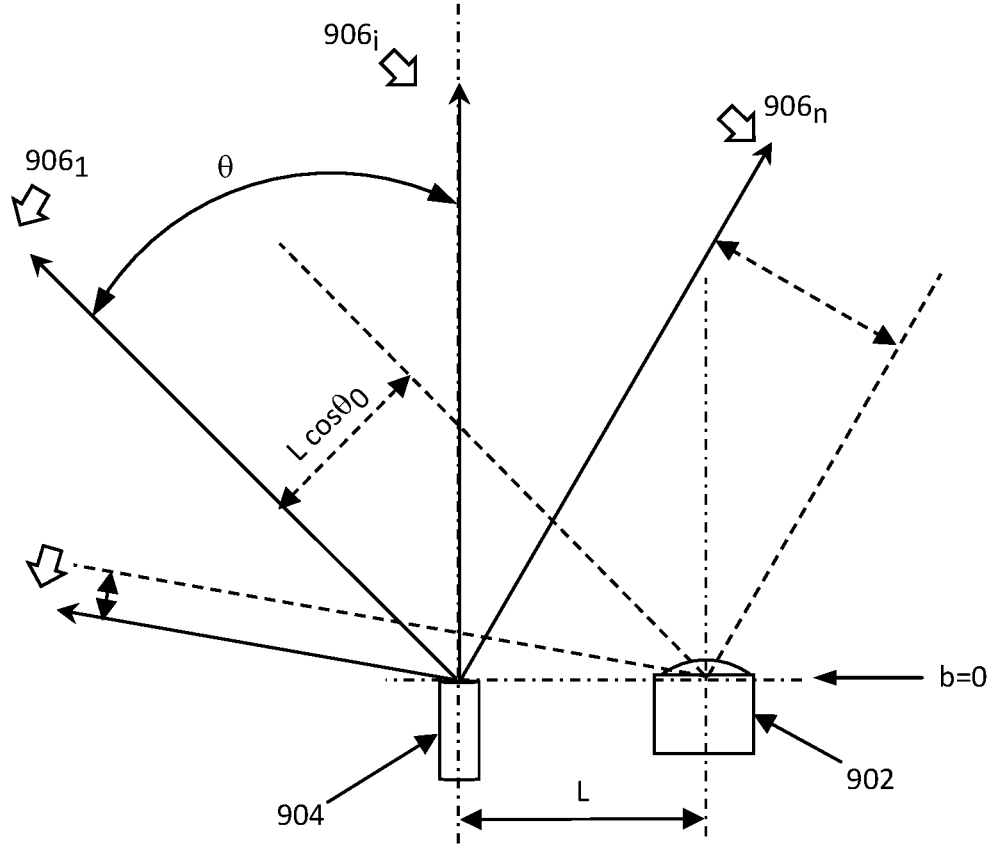
FIG. 9A is a schematic diagram illustrating a side view of elements of a distance sensor having projection points whose positions are adjusted to optimize a projection pattern.

FIG. 9A, for example, is a schematic diagram illustrating a side view of elements of a distance sensor 900 having projection points whose positions are adjusted to optimize a projection pattern. FIG. 9B is a schematic diagram illustrating a top view of elements of the distance sensor 900 of FIG. 9A. As illustrated, the sensor 900 may include a lens 902 of an image capturing device. The sensor 900 may also include a plurality of projection points (e.g., formed by a combination of light sources, diffractive optical elements, and/or other components) arranged around the perimeter of the lens 902; FIGS. 9A and 9B illustrate one such projection point 904, where other projection points may be similarly configured and placed at different positions around the lens 902. The lateral distance L (e.g., in a direction perpendicular to the optical axis of the image capturing device) from the front nodal point of the lens 902 to the central axis of the projection point 904 may also be referred to as a "baseline" of the sensor 900.

The projection point 904 projects a plurality of beams $906_1$-$906_n$ (hereinafter individually referred to as a "beam 906" or collectively referred to as "beams 906") of light, which fan out and form a pattern of projection artifacts (e.g., dots, dashes, or the like) when the beams 906 are incident upon a surface, as discussed above. The direction of the center of the pattern may be perpendicular to the baseline L of the sensor 900, while the projection pattern may be symmetrical about an axis with respect to the center of the projection pattern.

In one example, the projection point 904 may be adjusted to adjust a direction and/or angle at which the projection point 904 projects the plurality of beams 906. Adjustment of the projection point 904 in this manner also adjusts the positional relationship of the projection point 904 to the sensor's light receiving optical system (including the lens 902). In this case, the three-dimensional position of the projection point 904 may be determined by the length of the baseline L and also by the difference in height b between the projection point 904 and the front nodal point of the image capturing device in the direction of the image capturing device's optical axis. In the example illustrated in FIGS. 9A and 9B, b=0.

The direction of the center of the projection pattern with respect to the optical axis of the image capturing device may be determined by the angle θ in the radial direction with respect to the optical axis, where θ indicates an angle between the projection beam that creates the center of the projection pattern and the optical axis of the image capturing device. In addition, an angle α of rotation may be defined about an axis that is parallel to the image capturing device's optical axis.

Figure 10C:
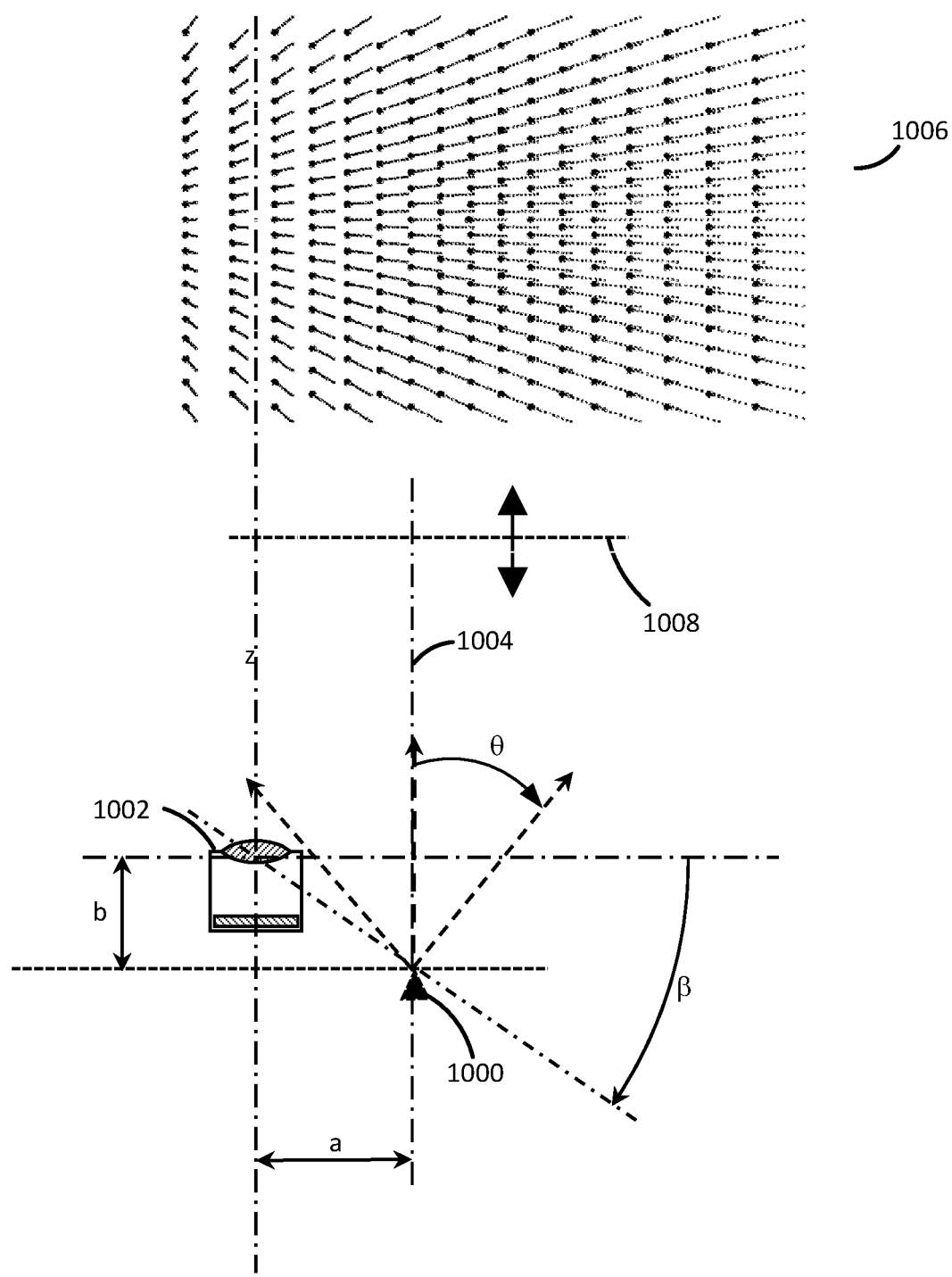
FIG. 10C illustrates the effect on projection point trajectories when the angle between the center of the projection pattern and the optical axis of the image capturing device of FIG. 10A is adjusted.

FIG. 10A, for instance, illustrates a side view of the positional relationship between an example projection point 1000 and an example image capturing device 1002 of a distance sensor. FIG. 10B further illustrates elements of the distance sensor of FIG. 10A. The center of a projection pattern 1006 projected onto a flat surface 1008 by the projection point 1000 is denoted by the reference numeral 1004.

As shown in FIG. 10A, the dimension "b" defines a difference between the height of the projection point 1000 and the height of the image capturing device's front nodal point (where height is defined in the direction of the image capturing device's optical axis). The dimension "a" defines the length of the distance sensor's baseline. Examples of the present disclosure allow the dimension b to be adjusted, which in turn will adjust the divergence angle of the projection points' trajectories 1012 to minimize trajectory overlap. In this manner, the inclination of the projection point trajectories 1012 and the lines 1010 (e.g., rows) of the projection points vary according to the positional relationship between the projection pattern 1006 and the projection plane. However, when the lines 1010 form straight lines as shown in FIG. 10B, the adjustment for minimizing trajectory overlap may be made more easily than when the lines 1010 become curved.

Figure 10D:
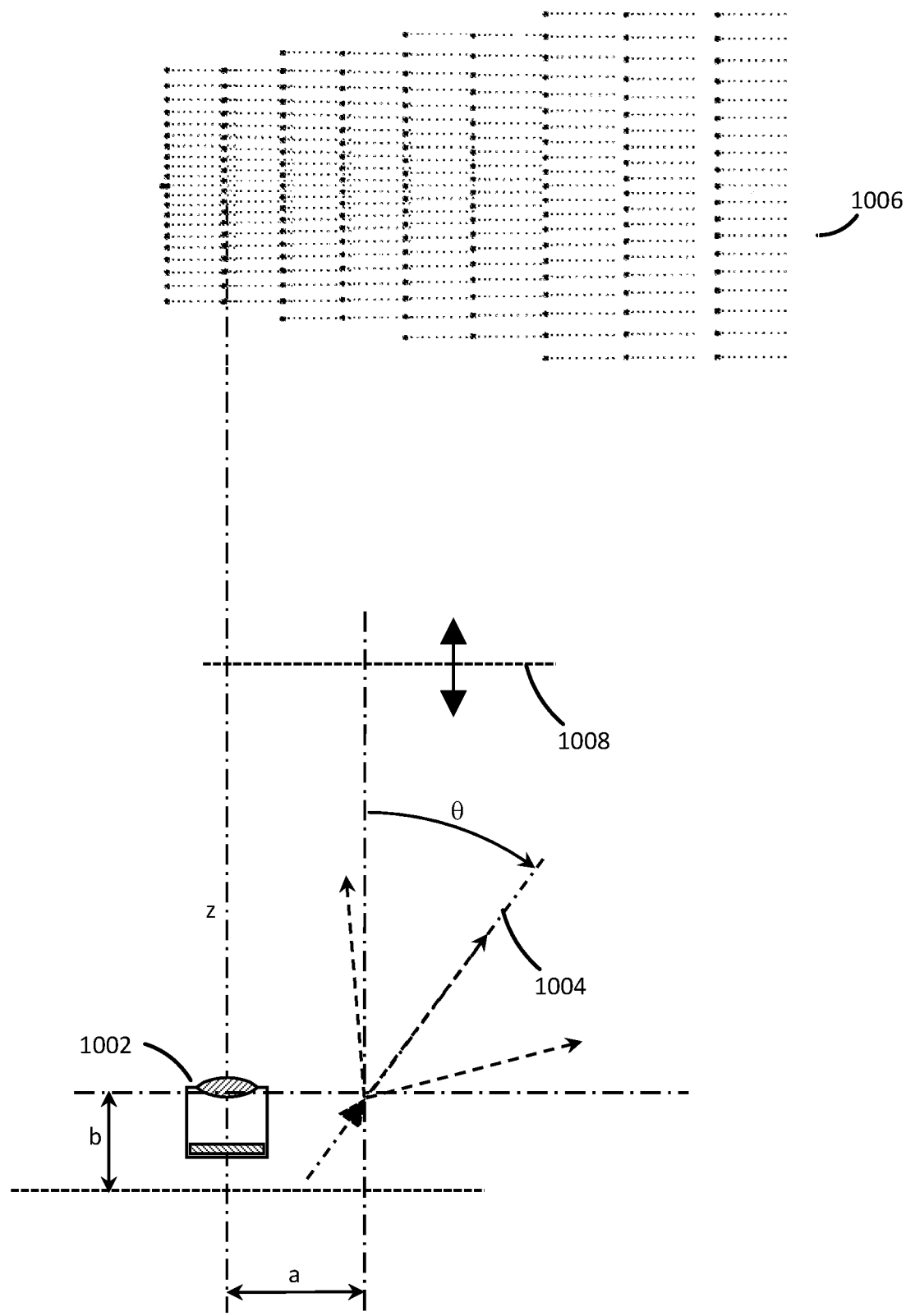
FIG. 10D illustrates the effect on projection point trajectories when the angle between the center of the projection pattern and the optical axis of the image capturing device of FIG. 10A is adjusted.

Further examples of the present disclosure also allow the angles θ and a to be adjusted with respect to the spread of the projection beams projected from the projection point 1000 and the size of the distance sensor. For instance, FIG. 100 and FIG. 10D illustrate the effects on projection point trajectories when the angle θ between the center of the projection pattern 1004 and the optical axis of the image capturing device 1002 of FIG. 10A is adjusted.

Figure 11B:
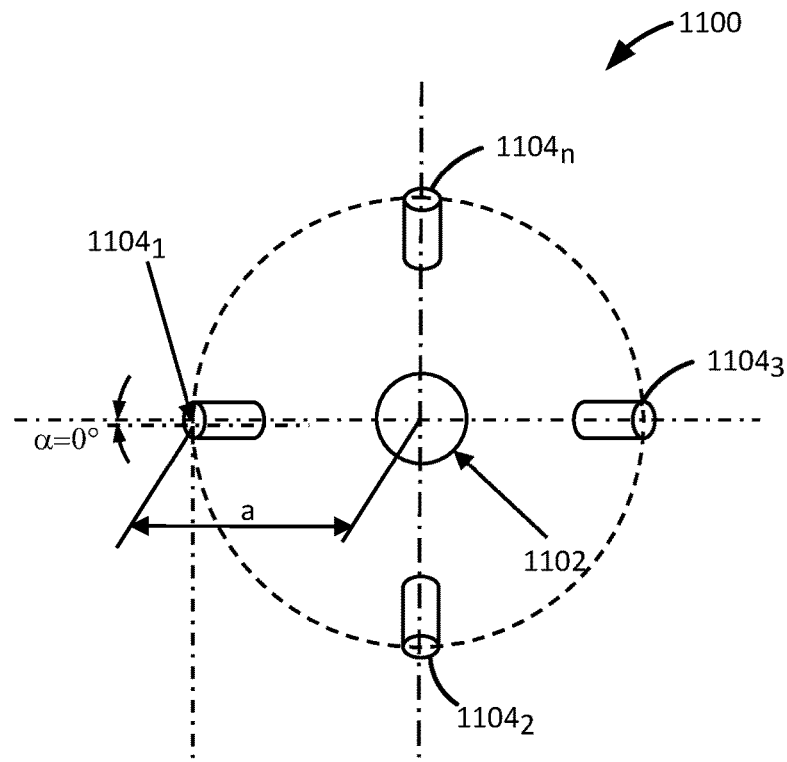
FIG. 11B illustrates a top view of the sensor components illustrated in FIG. 11A.
Figure 11A:
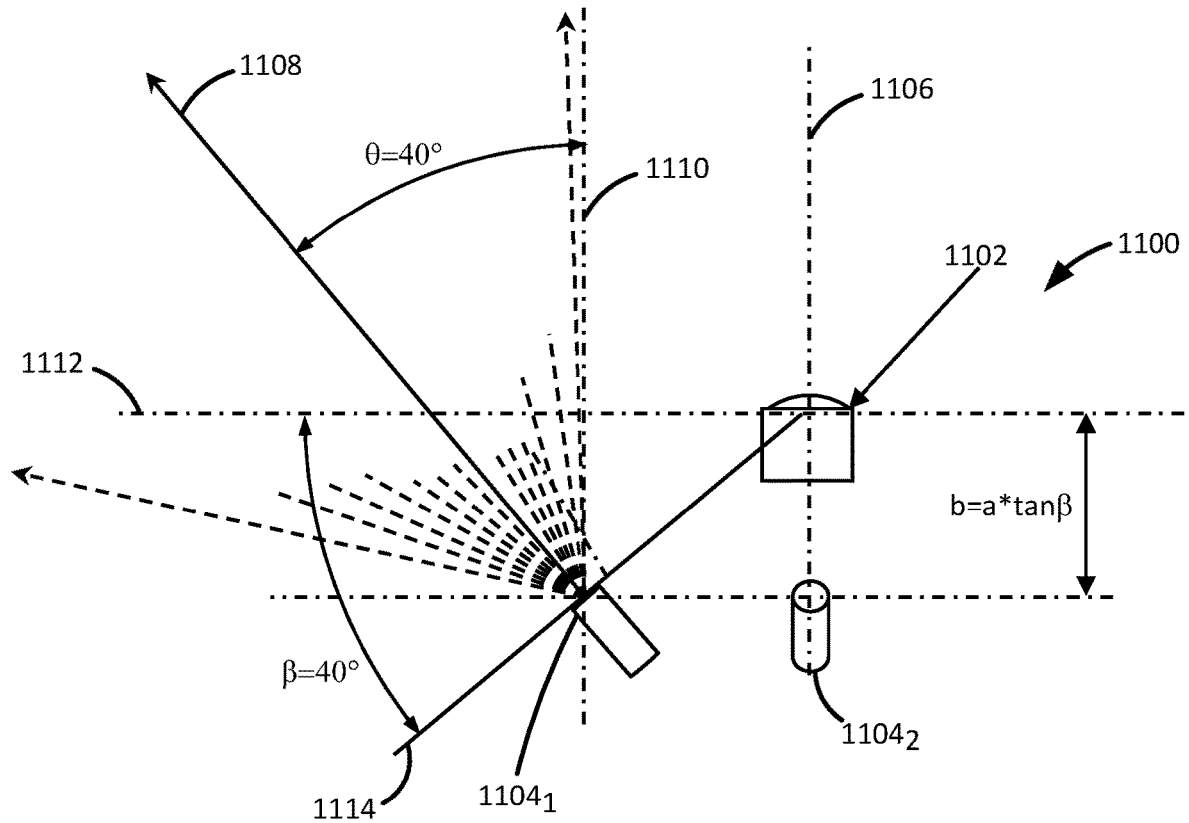
FIG. 11A illustrates a side view of components of an example configuration of a sensor having projection points whose positions are adjusted to optimize a projection pattern.

FIG. 11A illustrates a side view of components of an example configuration of a sensor 1100 having adjustable projection points. FIG. 11B illustrates a top view of the sensor components illustrated in FIG. 11A.

As shown in FIGS. 11A and 11B, the sensor 1100 includes an image capturing device 1102 including a lens, and a plurality of projection points $1104_1$-$1104_n$ (hereinafter individually referred to as a "projection point 1104" or collectively referred to as "projection points 1104"). In one example, the sensor 1100 includes four projection points 1104 per every one image capturing device 1102, although more or fewer projection points could be included in other examples.

The direction of the center of the projection pattern emitted by a projection point 1104 (e.g., projection point $1104_1$) with respect to the optical axis 1106 of the image capturing device 1102 may be determined by the angle θ in the radial direction with respect to the optical axis 1106, where θ indicates an angle between the center projection beam 1108 projected by a projection point 1104 (i.e., the beam that creates the center of the projection pattern) and the optical axis 1106 of the image capturing device 1102. In the example illustrated in FIGS. 11A and 11B, the value of θ is forty degrees.

In addition, an angle α of rotation may be defined about an axis that is parallel to the image capturing device's optical axis 1106. In the example illustrated in FIGS. 11A and 11B, the value of α is zero degrees.

The baseline a defines the lateral distance (e.g., in a direction perpendicular to the optical axis 1106 of the image capturing device 1102) from the front nodal point of the image capturing device's lens to the central axis 1110 of a projection point 1104.

The difference in height b between a projection point 1104 and the front nodal point of the image capturing device 1102 in the direction of the image capturing device's optical axis 1106 may be defined as b. In the example illustrated in FIGS. 11A and 11B, the value of b is non-zero.

The angle between a line 1112 that is perpendicular to the image capturing device's optical axis 1106 and a line 1114 that is perpendicular to the center beam 1108 may be defined as β. In the example illustrated in FIGS. 11A and 11B, the value of β is forty degrees.

With these definitions, the positional relationship between the image capturing device 1102 and a projection point 1104 that provides the optimum projection pattern for minimizing overlap of projection point trajectories may thus be defined as:

$$\tan\beta = \frac{b}{a} = \frac{\sin\theta\cos\alpha}{\cos\theta} = \tan\theta\,\cos\alpha \qquad \text{(EQN. 1)}$$

FIGS. 110-11G are charts plotting the trajectories of projection points emitted by the distance sensor 1100 of FIGS. 11A and 11B. In the examples illustrated in FIGS. 110-11G, the optimal value for β is 40°, however, the actual values may be greater or less than −40°. Thus, FIGS. 110-11G show how the overlap of projection point trajectories may vary with variations in Δβ (i.e., the difference between the optimal and actual values for β). In the example of FIG. 11C, α=0°, θ=40°, β=40°, and Δβ=0. Thus, FIG. 110 illustrates one example of an optimal value for β with respect to θ. As shown, the overlap of projection point trajectories in FIG. 11C is minimal.

In the example of FIG. 11D, α=0°, θ=40°, β=−46.7°, and Δβ=−6.7. Compare this to the example of FIG. 11E, where α=0°, θ=40°, β=−53.7°, and Δβ=−13.7. Compared to the example of FIG. 11D, the trajectory intervals in the example of FIG. 11E are more uniform. However, the value of β deviates from the optimal value of 40°.

In the example of FIG. 11F, α=0°, θ=40°, β=−31.2°, and Δβ=7.8. Compare this to the example of FIG. 11G, where α=0°, θ=40°, β=15.6°, and Δβ=13.1. Again, the value of β deviates from the optimal value of 40°.

Figures 12A, 12B:
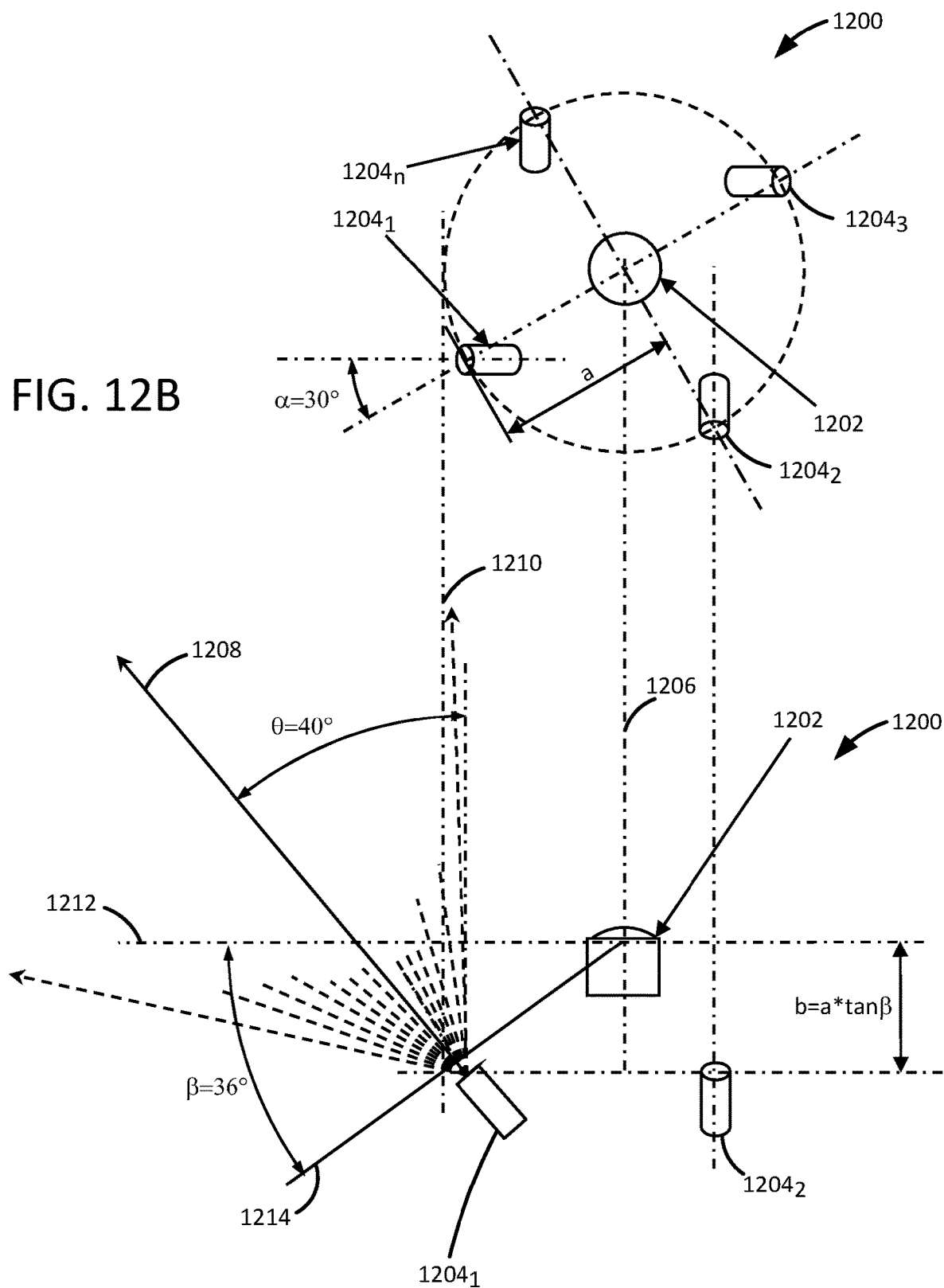
FIG. 12A illustrates a side view of components of an example configuration of a sensor having projection points whose positions are adjusted to optimize a projection pattern.
FIG. 12B illustrates a top view of the sensor components illustrated in FIG. 12A.

FIG. 12A illustrates a side view of components of an example configuration of a sensor 1200 having projection points whose positions are adjusted to optimize a projection pattern. FIG. 12B illustrates a top view of the sensor components illustrated in FIG. 12A.

As shown in FIGS. 12A and 12B, the sensor 1200 includes an image capturing device 1202 including a lens, and a plurality of projection points $1204_1$-$1204_n$ (hereinafter individually referred to as a "projection point 1204" or collectively referred to as "projection points 1204"). In one example, the sensor 1200 includes four projection points 1204 per every one image capturing device 1202, although more or fewer projection points could be included in other examples.

As above, the direction of the center of the projection pattern emitted by a projection point 1204 (e.g., projection point $1204_1$) with respect to the optical axis 1206 of the image capturing device 1202 may be determined by the angle θ in the radial direction with respect to the optical axis 1206, where θ indicates an angle between the center projection beam 1208 projected by a projection point 1204 (i.e., the beam that creates the center of the projection pattern) and the optical axis 1206 of the image capturing device 1202. In the example illustrated in FIGS. 12A and 12B, the value of θ is forty degrees.

In addition, an angle α of rotation may be defined about an axis that is parallel to the image capturing device's optical axis 1206. In the example illustrated in FIGS. 12A and 12B, the value of α is thirty degrees.

The baseline a defines the lateral distance (e.g., in a direction perpendicular to the optical axis 1206 of the image capturing device 1202) from the front nodal point of the image capturing device's lens to the central axis 1210 of a projection point 1204.

The difference in height b between a projection point 1204 and the front nodal point of the image capturing device 1202 in the direction of the image capturing device's optical axis 1206 may be defined as b. In the example illustrated in FIGS. 12A and 12B, the value of b is non-zero.

The angle between a line 1212 that is perpendicular to the image capturing device's optical axis 1206 and a line 1214 that is perpendicular to the center beam 1208 may be defined as β. In the example illustrated in FIGS. 12A and 12B, the value of β is thirty-six degrees.

Figure 12C:
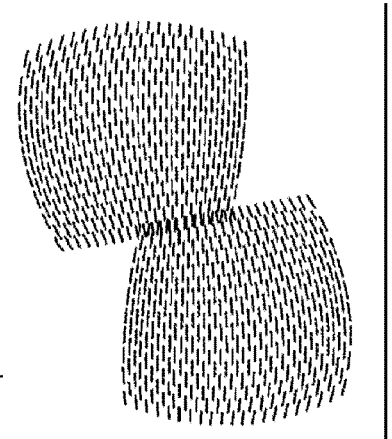
FIGS. 12C-12G are charts plotting the trajectories of projection points emitted by the distance sensor of FIGS. 12A and 12B.

FIGS. 12C-12G are charts plotting the trajectories of projection points emitted by the distance sensor 1200 of FIGS. 12A and 12B. In the examples illustrated in FIGS. 12C-12G, the optimal value for β is −36°; however, actual values may be greater or less than −36°. Thus, FIGS. 12C-12G show how the overlap of projection point trajectories may vary with variations in Δβ (i.e., the difference between the optimal and actual values for β). In the example of FIG. 12C, α=30°, θ=40°, β=−36°, and Δβ=0. Thus, FIG. 12C illustrates one example of an optimal value for β with respect to θ. As shown, the overlap of projection point trajectories in FIG. 12C is minimal.

Figure 12D:
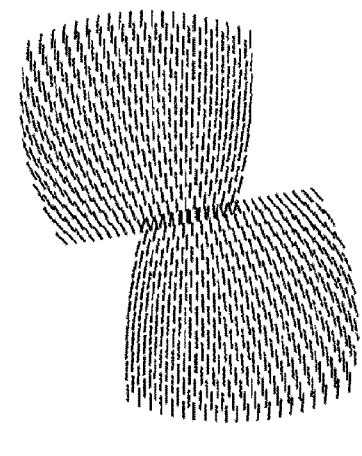
Figure 12E:
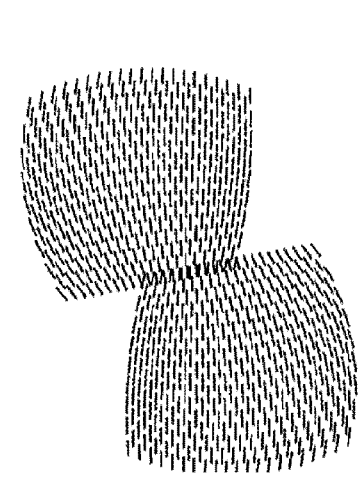
Figure 12F:
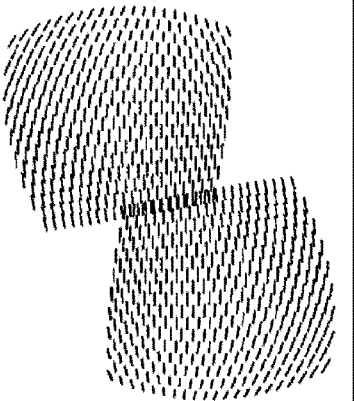
Figure 12G:
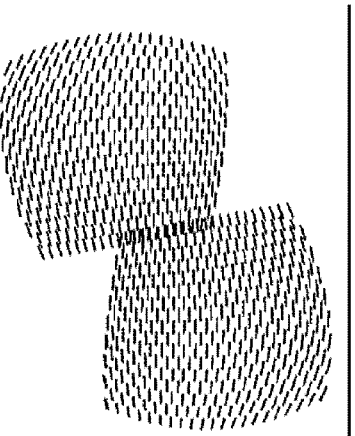

In the example of FIG. 12D, α=30°, θ=40°, β=−42.3°, and Δβ=−6.3. Compare this to the example of FIG. 12E, where α=30°, θ=40°, 13=−46.7°, and Δβ=−10.7. In the example of FIG. 12F, α=30°, θ=40°, β=−24.4°, and Δβ=11.6. Compare this to the example of FIG. 12G, where α=30°, θ=40°, β=16.9°, and Δβ=19.1.

Figures 13A, 13B:
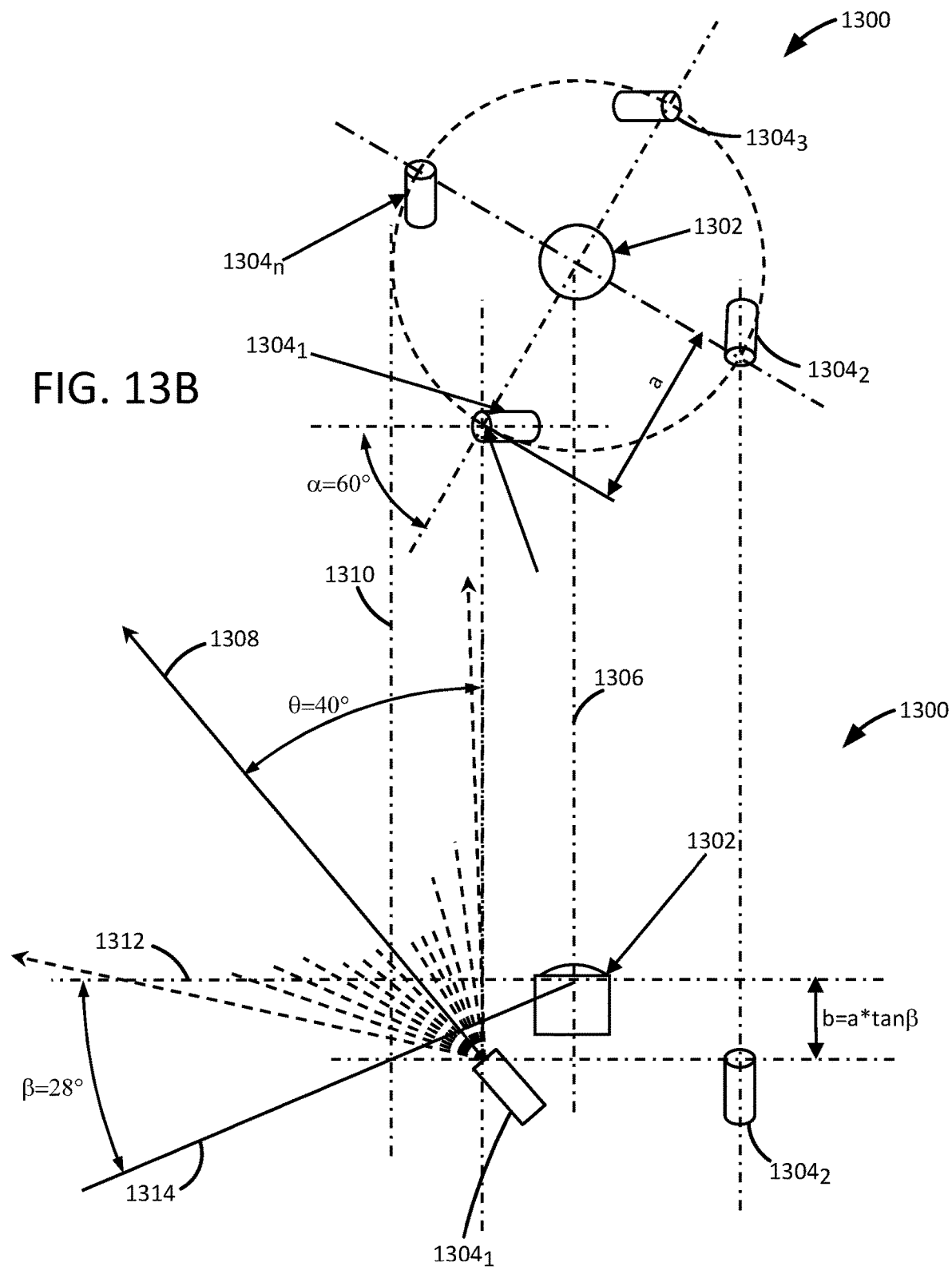
FIG. 13A illustrates a side view of components of an example configuration of a sensor having projection points whose positions are adjusted to optimize a projection pattern.
FIG. 13B illustrates a top view of the sensor components illustrated in FIG. 13A.

FIG. 13A illustrates a side view of components of an example configuration of a sensor 1300 having projection points whose positions are adjusted to optimize a projection pattern. FIG. 13B illustrates a top view of the sensor components illustrated in FIG. 13A.

As shown in FIGS. 13A and 13B, the sensor 1300 includes an image capturing device 1302 including a lens, and a plurality of projection points $1304_1$-$1304_n$ (hereinafter individually referred to as a "projection point 1304" or collectively referred to as "projection points 1304"). In one example, the sensor 1300 includes four projection points 1304 per every one image capturing device 1302, although more or fewer projection points could be included in other examples.

As above, the direction of the center of the projection pattern emitted by a projection point 1304 (e.g., projection point $1304_1$) with respect to the optical axis 1306 of the image capturing device 1302 may be determined by the angle θ in the radial direction with respect to the optical axis 1306, where θ indicates an angle between the center projection beam 1308 projected by a projection point 1304 (i.e., the beam that creates the center of the projection pattern) and the optical axis 1306 of the image capturing device 1302. In the example illustrated in FIGS. 13A and 13B, the value of θ is forty degrees.

In addition, an angle α of rotation may be defined about an axis that is parallel to the image capturing device's optical axis 1306. In the example illustrated in FIGS. 13A and 13B, the value of α is sixty degrees.

The baseline a defines the lateral distance (e.g., in a direction perpendicular to the optical axis 1306 of the image capturing device 1302) from the front nodal point of the image capturing device's lens to the central axis 1310 of a projection point 1304.

The difference in height b between a projection point 1304 and the front nodal point of the image capturing device 1302 in the direction of the image capturing device's optical axis 1306 may be defined as b. In the example illustrated in FIGS. 13A and 13B, the value of b is non-zero.

The angle between a line 1312 that is perpendicular to the image capturing device's optical axis 1306 and a line 1314 that is perpendicular to the center beam 1308 may be defined as β. In the example illustrated in FIGS. 13A and 13B, the value of β is twenty-three degrees.

Figure 13C:
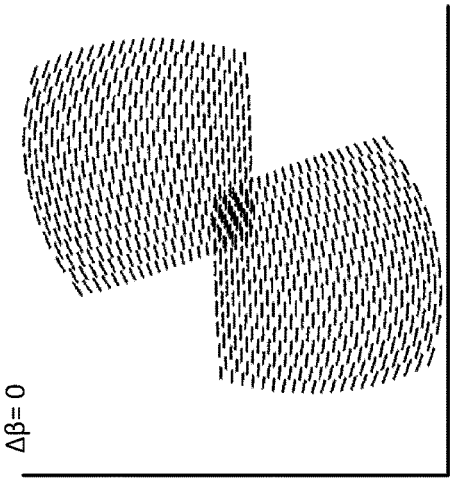
FIGS. 13C-13G are charts plotting the trajectories of projection points emitted by the distance sensor of FIGS. 13A and 13B.
Figure 13E:
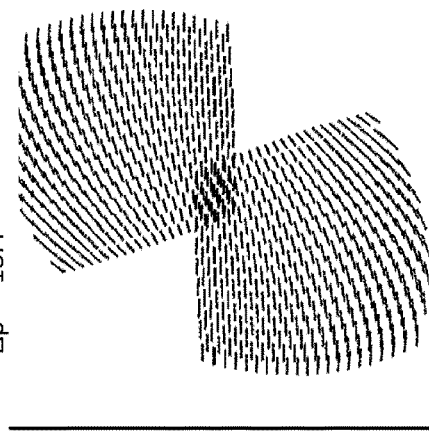
Figure 13G:
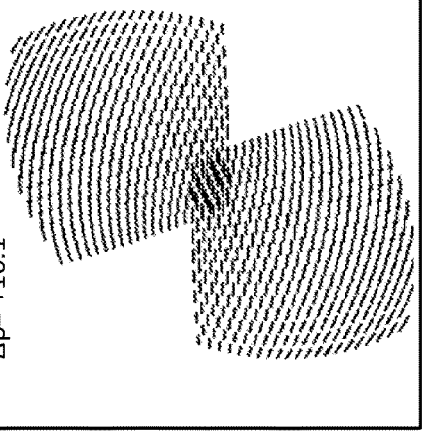

FIGS. 13C-13G are charts plotting the trajectories of projection points emitted by the distance sensor 1300 of FIGS. 13A and 13B. In the examples illustrated in FIGS. 13C-13G, the optimal value for β is −22.8°; however, the actual values may be greater or less than −22.8°. Thus, FIGS. 13C-13G show how the overlap of projection point trajectories may vary with variations in Δβ (i.e., the difference between the optimal and actual values for β). In the example of FIG. 13C, α=60°, θ=40°, β=22.8°, and Δβ=0. Thus, FIG. 13C illustrates one example of an optimal value for β with respect to θ. As shown, the overlap of projection point trajectories in FIG. 13C is minimal.

Figure 13D:
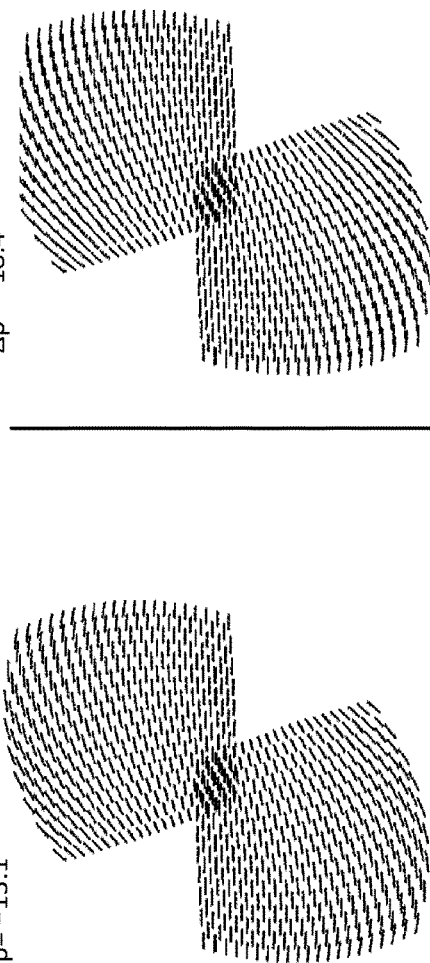
Figure 13F:
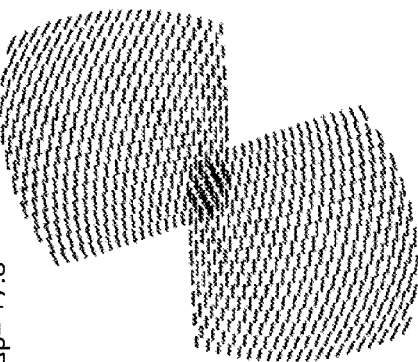

In the example of FIG. 13D, α=60°, θ=40°, β=−35.9°, and Δ3=−13.1. Compare this to the example of FIG. 13E, where α=60°, θ=40°, β=−41.2°, and Δβ=−18.4. In the example of FIG. 13F, α=60°, θ=40°, β=−15.0°, and Δβ=7.8. Compare this to the example of FIG. 13G, where α=60°, θ=40°, β=6.65°, and Δβ=16.1.

Figure 14B:
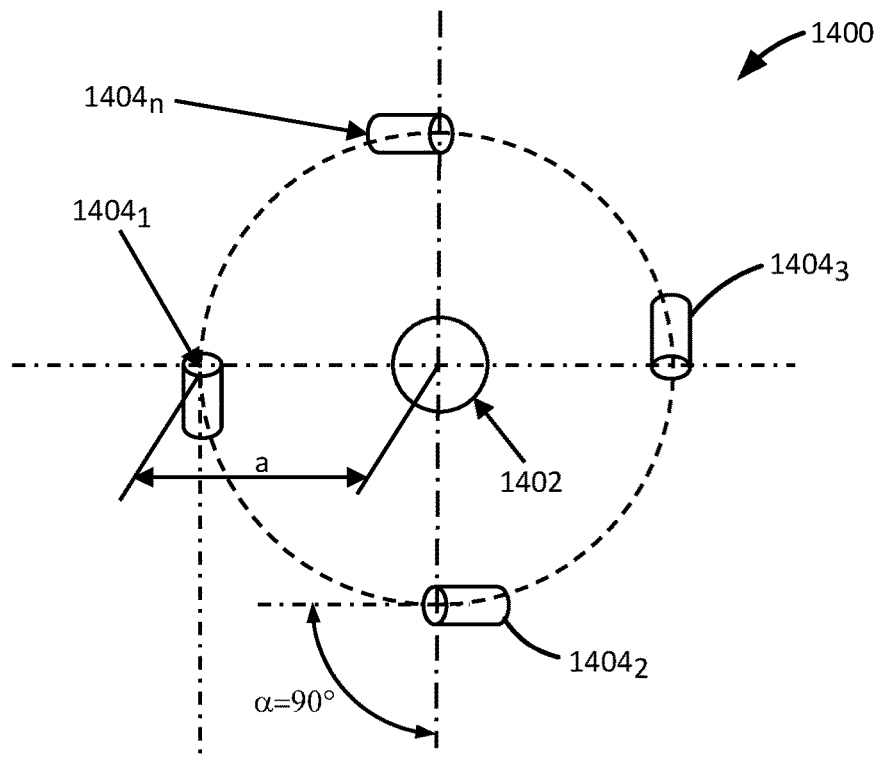
FIG. 14B illustrates a top view of the sensor components illustrated in FIG. 14A.
Figure 14A:
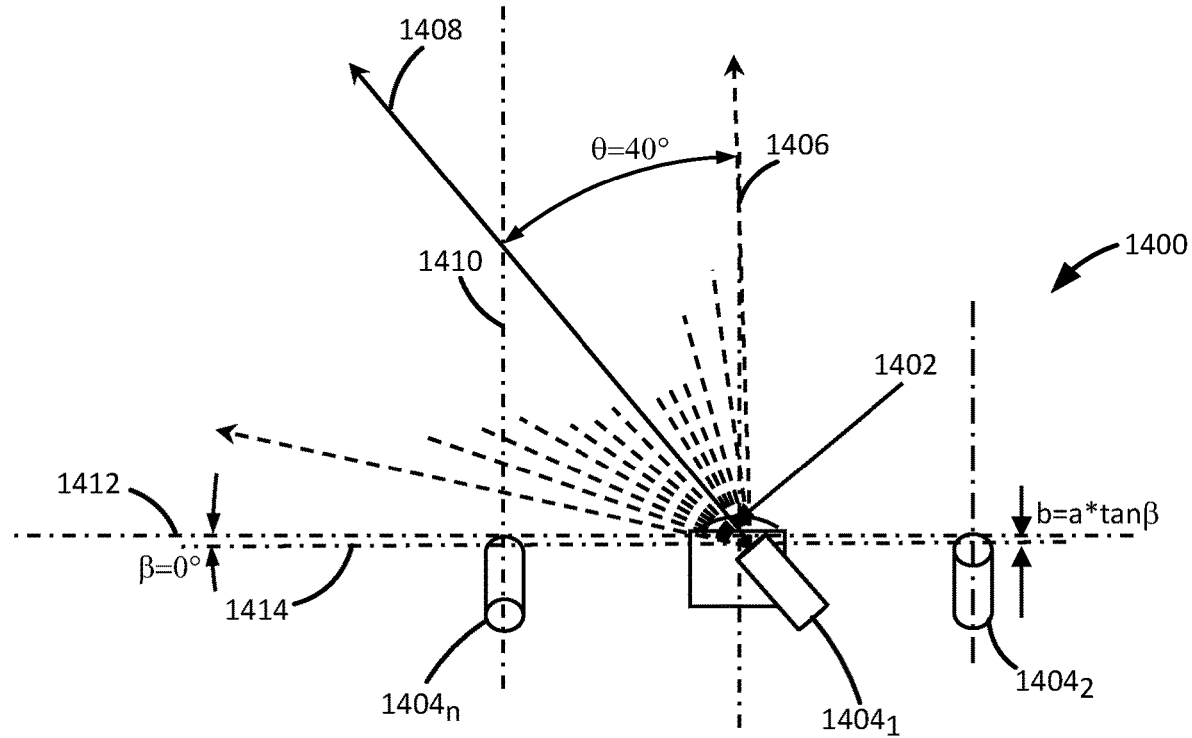
FIG. 14A illustrates a side view of components of an example configuration of a sensor having projection points whose positions are adjusted to optimize a projection pattern.

FIG. 14A illustrates a side view of components of an example configuration of a sensor 1400 having projection points whose positions are adjusted to optimize a projection pattern. FIG. 14B illustrates a top view of the sensor components illustrated in FIG. 14A.

As shown in FIGS. 14A and 14B, the sensor 1400 includes an image capturing device 1402 including a lens, and a plurality of projection points $1404_1$-$1404_n$ (hereinafter individually referred to as a "projection point 1404" or collectively referred to as "projection points 1404"). In one example, the sensor 1400 includes four projection points 1404 per every one image capturing device 1402, although more or fewer projection points could be included in other examples.

As above, the direction of the center of the projection pattern emitted by a projection point 1404 (e.g., projection point $1404_1$) with respect to the optical axis 1406 of the image capturing device 1402 may be determined by the angle θ in the radial direction with respect to the optical axis 1406, where θ indicates an angle between the center projection beam 1408 projected by a projection point 1404 (i.e., the beam that creates the center of the projection pattern) and the optical axis 1406 of the image capturing device 1402. In the example illustrated in FIGS. 14A and 14B, the value of θ is forty degrees.

In addition, an angle α of rotation may be defined about an axis that is parallel to the image capturing device's optical axis 1406. In the example illustrated in FIGS. 14A and 14B, the value of α is ninety degrees.

The baseline a defines the lateral distance (e.g., in a direction perpendicular to the optical axis 1406 of the image capturing device 1402) from the front nodal point of the image capturing device's lens to the central axis 1410 of a projection point 1404.

The difference in height b between a projection point 1404 and the front nodal point of the image capturing device 1402 in the direction of the image capturing device's optical axis 1406 may be defined as b. In the example illustrated in FIGS. 14A and 14B, the value of b is zero.

The angle between a line 1412 that is perpendicular to the image capturing device's optical axis 1406 and a line 1414 that is perpendicular to the center beam 1408 may be defined as β. In the example illustrated in FIGS. 14A and 14B, the value of β is zero degrees.

Figure 14C:
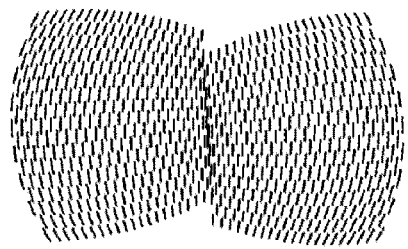
FIGS. 14C-14G are charts plotting the trajectories of projection points emitted by the distance sensor of FIGS. 14A and 14B.
Figure 14E:
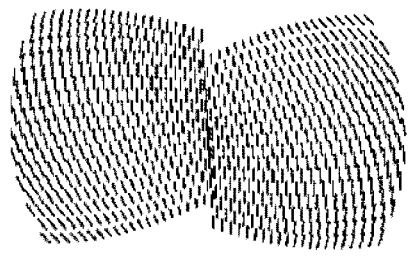
Figure 14G:
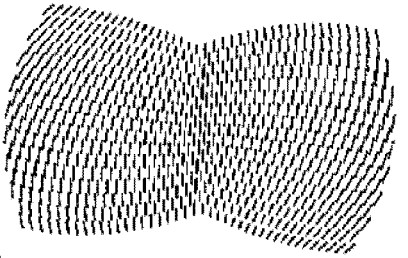

FIGS. 14C-14G are charts plotting the trajectories of projection points emitted by the distance sensor 1400 of FIGS. 14A and 14B. In the examples illustrated in FIGS. 14C-14G, the optimal value for β is 0°; however, the actual values may be greater or less than 0°. Thus, FIGS. 14C-14G show how the overlap of projection point trajectories may vary with variations in Δβ (i.e., the difference between the optimal and actual values form. In the example of FIG. 14C, α=90°, θ=40°, β=0°, and Δβ=0. Thus, FIG. 14C illustrates one example of an optimal value for β with respect to θ. As shown, the overlap of projection point trajectories in FIG. 14C is minimal. Thus, the projection pattern can be optimized (i.e., trajectory overlap minimized) by setting b=0 and β=0, without making any modifications to the components of the sensor 1400.

Figure 14D:
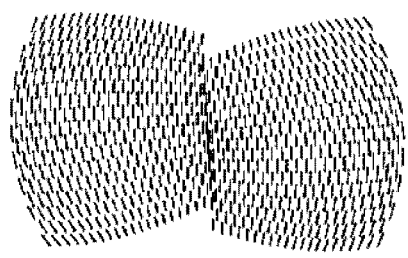
Figure 14F:
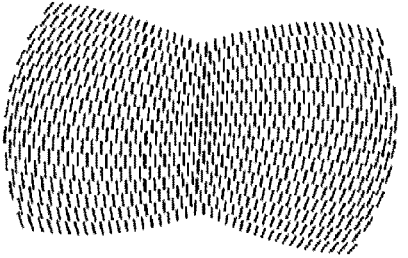

In the example of FIG. 14D, α=90°, θ=40°, β=−8.6°, and Δβ=−8.6. Compare this to the example of FIG. 14E, where α=90°, θ=40°, 13=−16.9°, and Δβ=−16.9. In the example of FIG. 14F, α=90°, θ=40°, β=8.6°, and Δβ=8.6. Compare this to the example of FIG. 14G, where α=90°, θ=40°, β=16.9°, and Δβ=16.9.

Figures 15A, 15B:
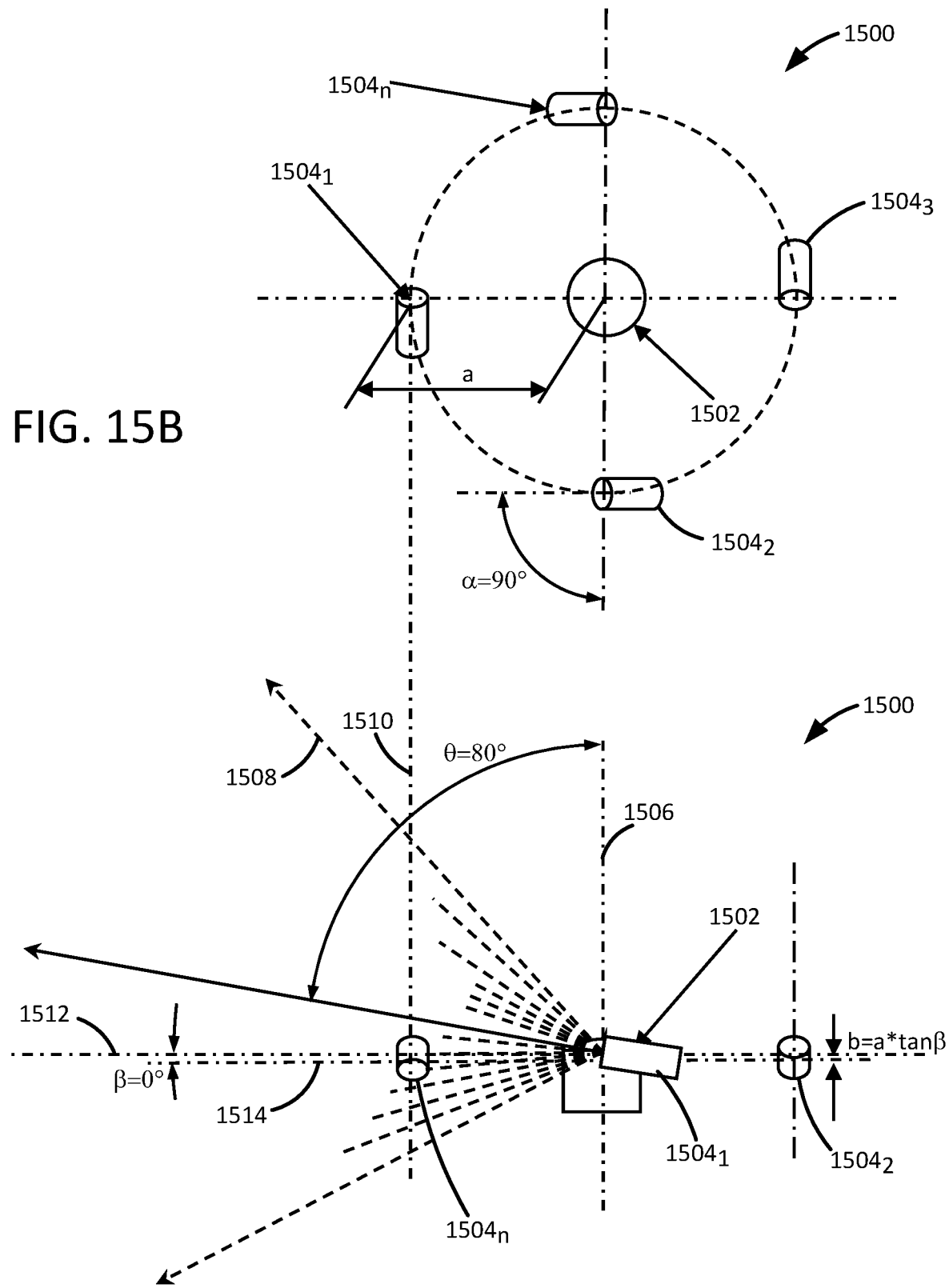
FIG. 15A illustrates a side view of components of an example configuration of a sensor having projection points whose positions are adjusted to optimize a projection pattern.
FIG. 15B illustrates a top view of the sensor components illustrated in FIG. 15A.

FIG. 15A illustrates a side view of components of an example configuration of a sensor 1500 having projection points whose positions are adjusted to optimize a projection pattern. FIG. 15B illustrates a top view of the sensor components illustrated in FIG. 15A.

As shown in FIGS. 15A and 15B, the sensor 1500 includes an image capturing device 1502 including a lens, and a plurality of projection points $1504_1$-$1504_n$ (hereinafter individually referred to as a "projection point 1504" or collectively referred to as "projection points 1504"). In one example, the sensor 1500 includes four projection points 1504 per every one image capturing device 1502, although more or fewer projection points could be included in other examples.

As above, the direction of the center of the projection pattern emitted by a projection point 1504 (e.g., projection point $1504_1$) with respect to the optical axis 1506 of the image capturing device 1502 may be determined by the angle θ in the radial direction with respect to the optical axis 1506, where θ indicates an angle between the center projection beam 1508 projected by a projection point 1504 (i.e., the beam that creates the center of the projection pattern) and the optical axis 1506 of the image capturing device 1502. In the example illustrated in FIGS. 15A and 15B, the value of θ is eighty degrees.

In addition, an angle α of rotation may be defined about an axis that is parallel to the image capturing device's optical axis 1506. In the example illustrated in FIGS. 15A and 15B, the value of α is ninety degrees.

The baseline a defines the lateral distance (e.g., in a direction perpendicular to the optical axis 1506 of the image capturing device 1502) from the front nodal point of the image capturing device's lens to the central axis 1510 of a projection point 1504.

The difference in height b between a projection point 1504 and the front nodal point of the image capturing device 1502 in the direction of the image capturing device's optical axis 1506 may be defined as b. In the example illustrated in FIGS. 15A and 15B, the value of b is zero.

The angle between a line 1512 that is perpendicular to the image capturing device's optical axis 1506 and a line 1514 that is perpendicular to the center beam 1508 may be defined as β. In the example illustrated in FIGS. 15A and 15B, the value of β is zero degrees.

Figure 15E:
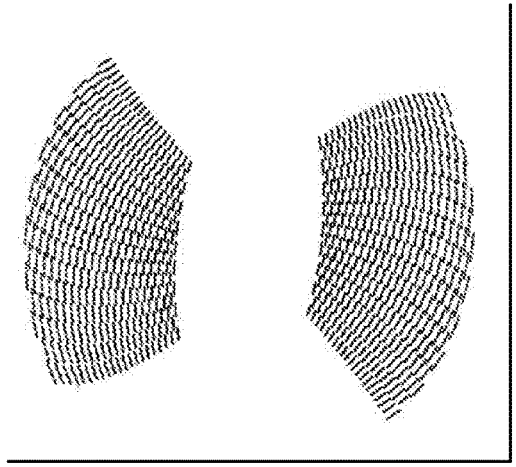
FIGS. 15C-15E are charts plotting the trajectories of projection points emitted by the distance sensor of FIGS. 15A and 15B.
Figure 15D:
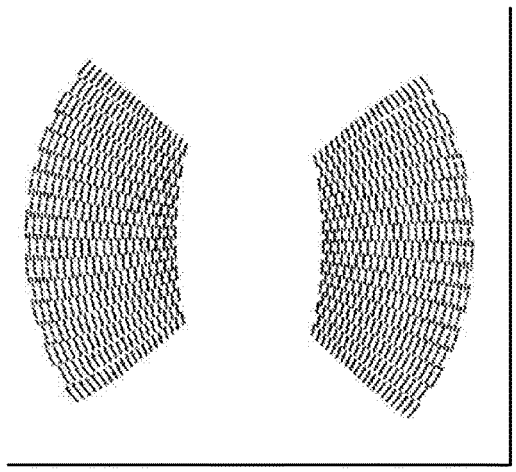
Figure 15C:
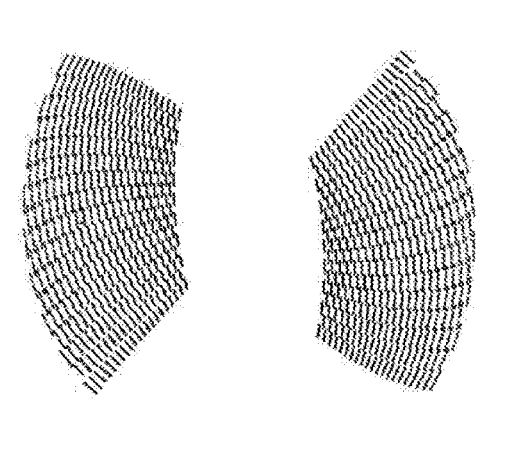

FIGS. 15C-15E are charts plotting the trajectories of projection points emitted by the distance sensor 1500 of FIGS. 15A and 15B. In the examples illustrated in FIGS. 15C-15E, the optimal value for β is 0°; however, the actual values may be greater or less than 0°. Thus, FIGS. 15C-15E show how the overlap of projection point trajectories may vary with variations in Δβ (i.e., the difference between the optimal and actual values form. In the example of FIG. 15D, α=90°, θ=80°, β=0°, and Δβ=0. Thus, FIG. 15D illustrates one example of an optimal value for β with respect to θ. As shown, the overlap of projection point trajectories in FIG. 15D is minimal. Thus, the projection pattern can be optimized (i.e., trajectory overlap minimized) by setting b=0 and β=0, without making any modifications to the components of the sensor 1500.

In the example of FIG. 15C, α=90°, θ=80°, β=−16.9°, and Δβ=−16.9. Compare this to the example of FIG. 15E, where α=90°, θ=80°, β=−16.9°, and Δβ=16.9.

Figures 16A, 16B:
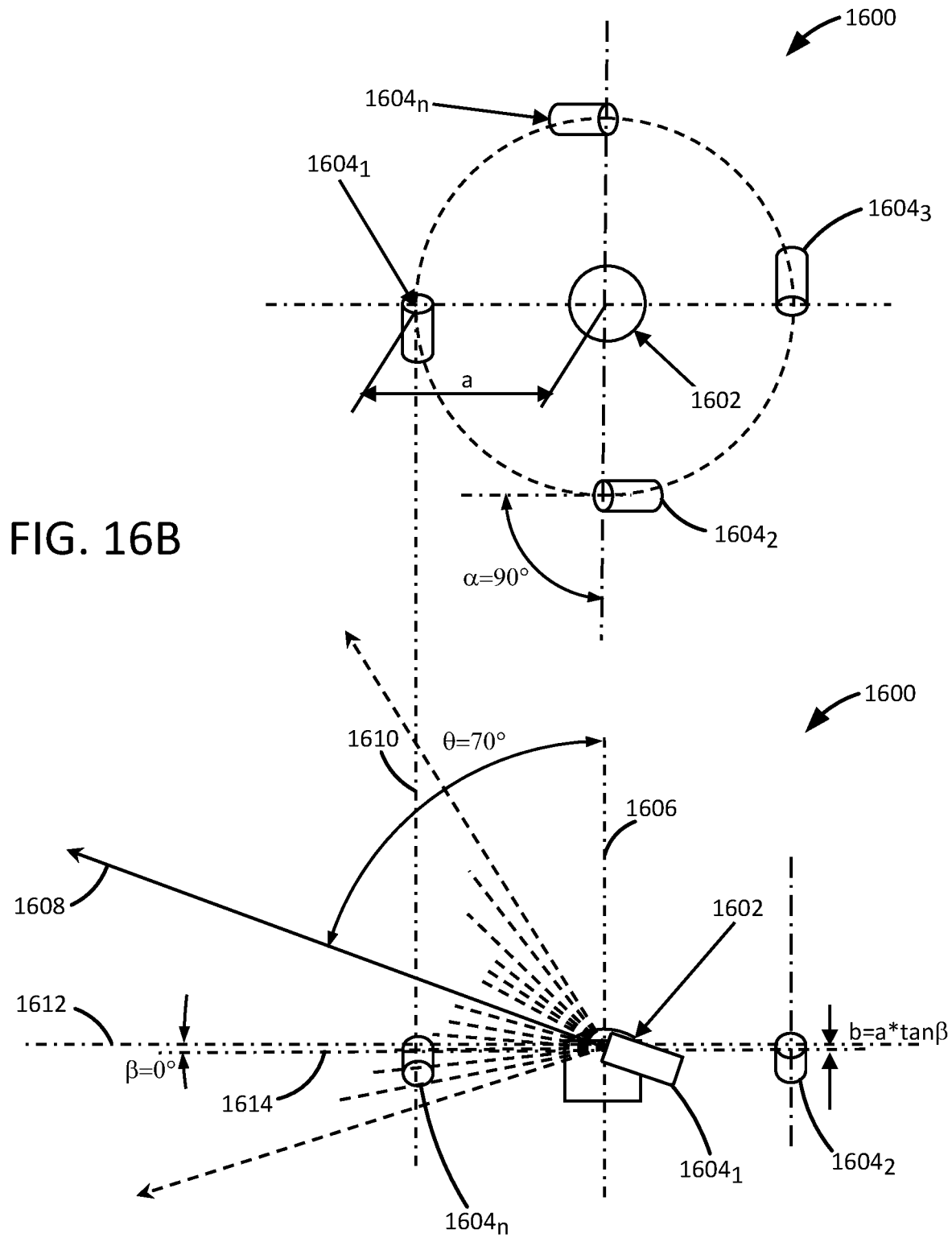
FIG. 16A illustrates a side view of components of an example configuration of a sensor having projection points whose positions are adjusted to optimize a projection pattern.
FIG. 16B illustrates a top view of the sensor components illustrated in FIG. 16A.

FIG. 16A illustrates a side view of components of an example configuration of a sensor 1600 having projection points whose positions are adjusted to optimize a projection pattern. FIG. 16B illustrates a top view of the sensor components illustrated in FIG. 16A.

As shown in FIGS. 16A and 16B, the sensor 1600 includes an image capturing device 1602 including a lens, and a plurality of projection points $1604_1$-$1604_n$ (hereinafter individually referred to as a "projection point 1604" or collectively referred to as "projection points 1604"). In one example, the sensor 1600 includes four projection points 1604 per every one image capturing device 1602, although more or fewer projection points could be included in other examples.

As above, the direction of the center of the projection pattern emitted by a projection point 1604 (e.g., projection point $1604_1$) with respect to the optical axis 1606 of the image capturing device 1602 may be determined by the angle θ in the radial direction with respect to the optical axis 1606, where θ indicates an angle between the center projection beam 1608 projected by a projection point 1604 (i.e., the beam that creates the center of the projection pattern) and the optical axis 1606 of the image capturing device 1602. In the example illustrated in FIGS. 16A and 16B, the value of θ is seventy degrees.

In addition, an angle α of rotation may be defined about an axis that is parallel to the image capturing device's optical axis 1606. In the example illustrated in FIGS. 16A and 16B, the value of α is ninety degrees.

The baseline a defines the lateral distance (e.g., in a direction perpendicular to the optical axis 1606 of the image capturing device 1602) from the front nodal point of the image capturing device's lens to the central axis 1610 of a projection point 1604.

The difference in height b between a projection point 1604 and the front nodal point of the image capturing device 1602 in the direction of the image capturing device's optical axis 1606 may be defined as b. In the example illustrated in FIGS. 16A and 16B, the value of b is zero.

The angle between a line 1612 that is perpendicular to the image capturing device's optical axis 1606 and a line 1614 that is perpendicular to the center beam 1608 may be defined as β. In the example illustrated in FIGS. 16A and 16B, the value of β is zero degrees.

Figure 16E:
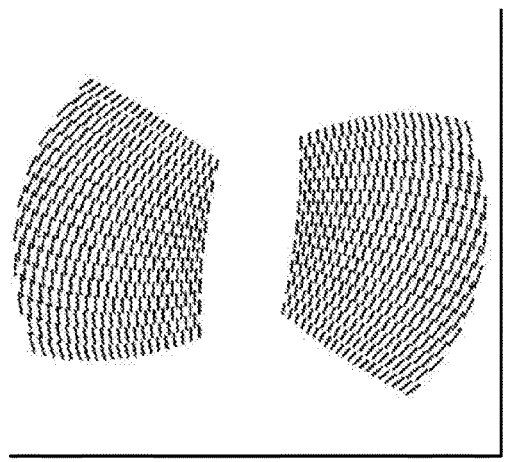
FIGS. 16C-16E are charts plotting the trajectories of projection points emitted by the distance sensor of FIGS. 16A and 16B.
Figure 16D:
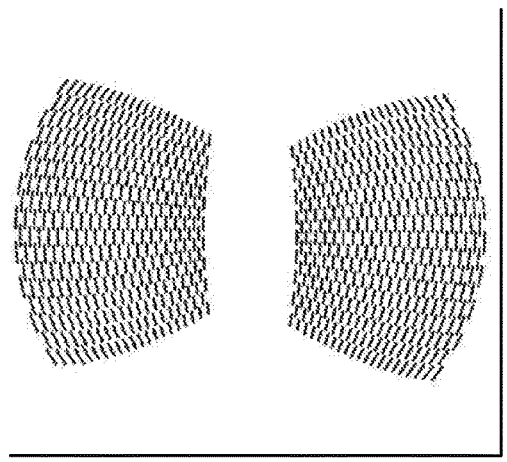
Figure 16C:
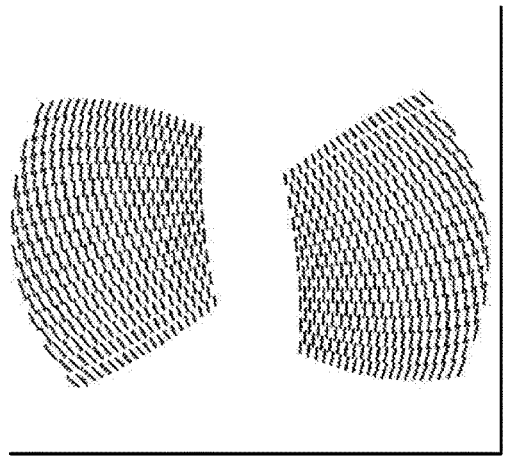

FIGS. 16C-16E are charts plotting the trajectories of projection points emitted by the distance sensor 1600 of FIGS. 16A and 16B. In the examples illustrated in FIGS. 16C-16E, the optimal value for β is 0°; however, the actual values may be greater or less than 0°. Thus, FIGS. 16C-16E show how the overlap of projection point trajectories may vary with variations in Δβ (i.e., the difference between the optimal and actual values for β). In the example of FIG. 16D, α=90°, θ=60°, β=0°, and Δβ=0. Thus, FIG. 16D illustrates one example of an optimal value for β with respect to θ. As shown, the overlap of projection point trajectories in FIG. 16D is minimal. Thus, the projection pattern can be optimized (i.e., trajectory overlap minimized) by setting b=0 and β=0, without making any modifications to the components of the sensor 1600.

In the example of FIG. 16C, α=90°, θ=60°, β=−16.9°, and Δβ=−16.9. Compare this to the example of FIG. 16E, where α=90°, θ=60°, 13=−16.9°, and Δβ=16.9.

Other examples of the disclosure consider the fact that the base length of triangulation is given by $\sqrt{a^2+b^2}$. Thus, the longer the length of the sensor's baseline ("a"), the higher the distance resolution (i.e., the amount of movement of the image of the projection pattern with respect to a change in distance from the sensor) in triangulation will be. As such, when the size of the sensor is restricted in the direction of the baseline, it may be possible to "increase" the baseline length by increasing the difference ("b") in height between a projection point and the front nodal point of the image capturing device in the direction of the image capturing device's optical axis. In this case, it may be possible to optimize the difference in height b by adjusting the values of the angles θ and α.

Figure 17B:
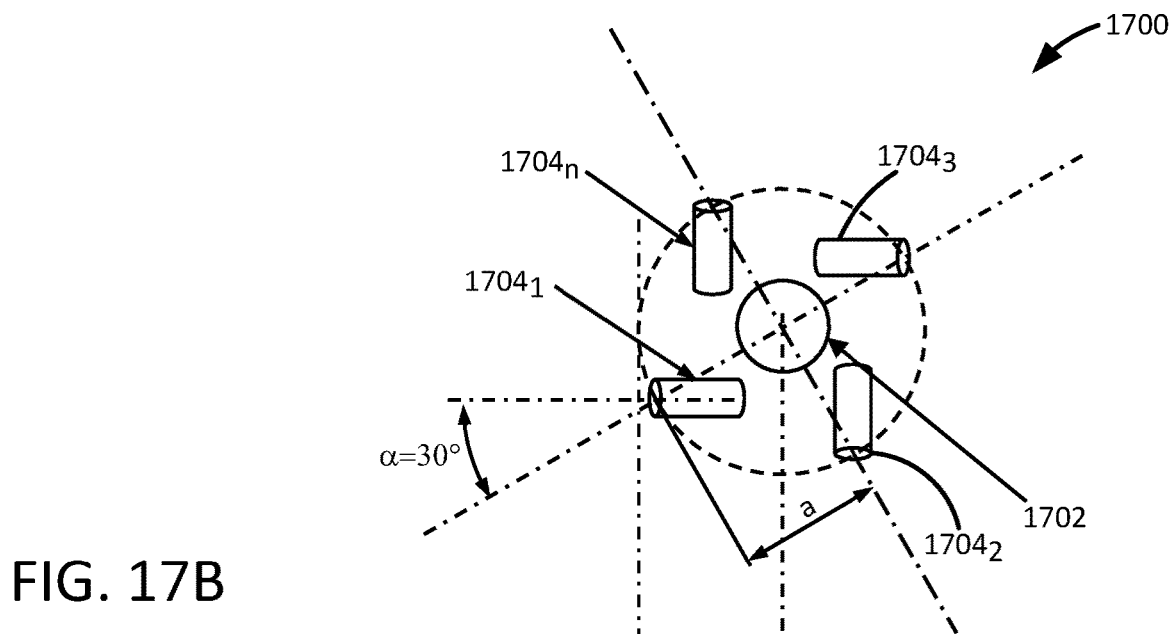
FIG. 17B illustrates a top view of the sensor components illustrated in FIG. 17A.
Figure 17A:
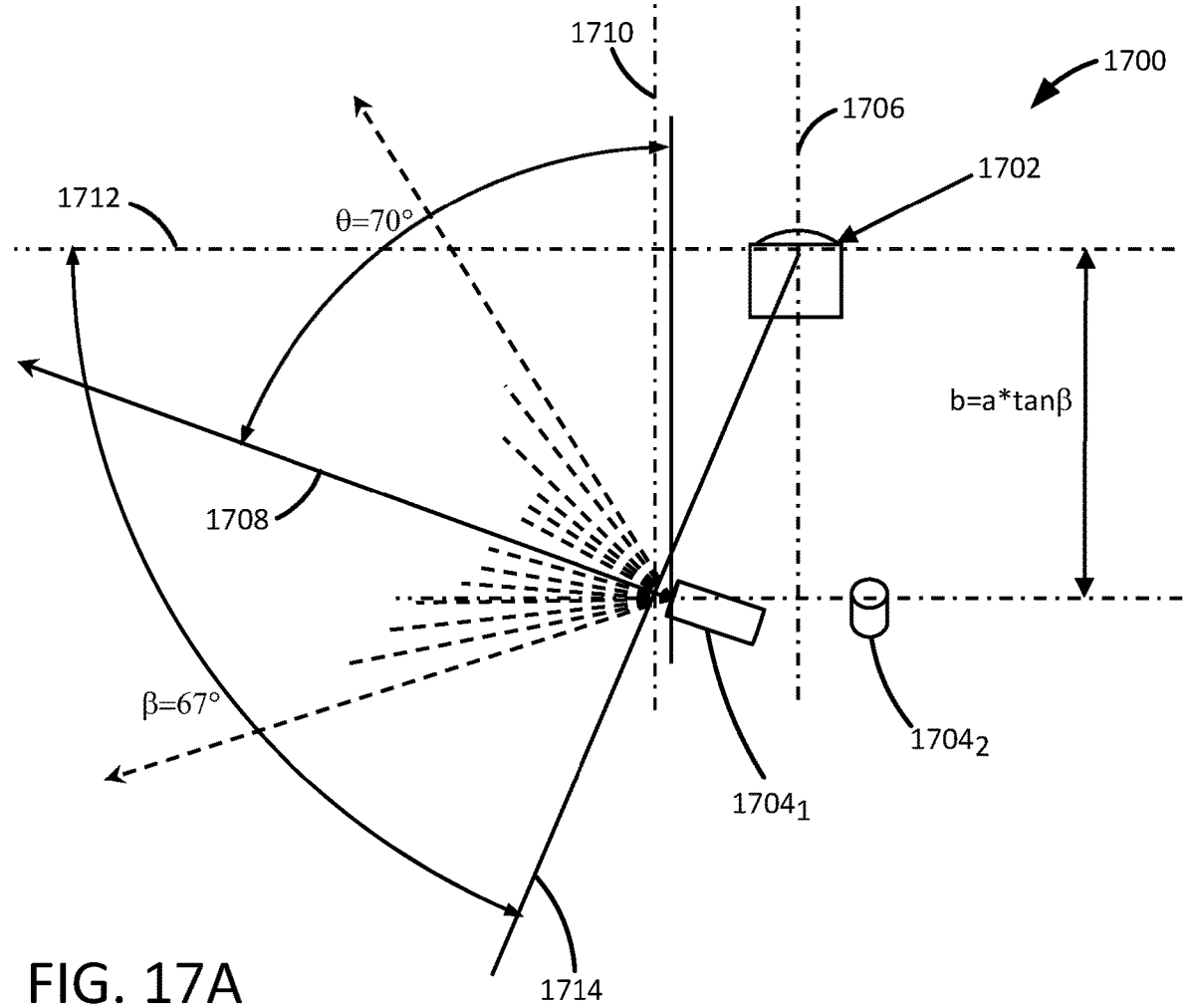
FIG. 17A illustrates a side view of components of an example configuration of a sensor having projection points whose positions are adjusted to optimize a projection pattern.

FIG. 17A illustrates a side view of components of an example configuration of a sensor 1700 having projection points whose positions are adjusted to optimize a projection pattern. FIG. 17B illustrates a top view of the sensor components illustrated in FIG. 17A.

As shown in FIGS. 17A and 17B, the sensor 1700 includes an image capturing device 1702 including a lens, and a plurality of projection points $1704_1$-$1704_n$ (hereinafter individually referred to as a "projection point 1704" or collectively referred to as "projection points 1704"). In one example, the sensor 1700 includes four projection points 1704 per every one image capturing device 1702, although more or fewer projection points could be included in other examples.

As above, the direction of the center of the projection pattern emitted by a projection point 1704 (e.g., projection point $1704_1$) with respect to the optical axis 1706 of the image capturing device 1702 may be determined by the angle θ in the radial direction with respect to the optical axis 1706, where θ indicates an angle between the center projection beam 1708 projected by a projection point 1704 (i.e., the beam that creates the center of the projection pattern) and the optical axis 1706 of the image capturing device 1702. In the example illustrated in FIGS. 17A and 17B, the value of θ is seventy degrees.

In addition, an angle α of rotation may be defined about an axis that is parallel to the image capturing device's optical axis 1706. In the example illustrated in FIGS. 17A and 17B, the value of α is thirty degrees.

The baseline a defines the lateral distance (e.g., in a direction perpendicular to the optical axis 1706 of the image capturing device 1702) from the front nodal point of the image capturing device's lens to the central axis 1710 of a projection point 1704.

The difference in height b between a projection point 1704 and the front nodal point of the image capturing device 1702 in the direction of the image capturing device's optical axis 1706 may be defined as b. In the example illustrated in FIGS. 17A and 17B, the value of b is non-zero.

The angle between a line 1712 that is perpendicular to the image capturing device's optical axis 1706 and a line 1714 that is perpendicular to the center beam 1708 may be defined as β. In the example illustrated in FIGS. 17A and 17B, the value of β is sixty-seven degrees.

FIG. 17C is a chart plotting the trajectories of projection points emitted by the distance sensor 1700 of FIGS. 17A and 17B. In the example illustrated in FIG. 17C, the optimal value for β is 67.2°. In the example of FIG. 17C, α=30°, θ=70°, β=−66.8°, and Δβ=0.4. As shown, the overlap of projection point trajectories in FIG. 17C is minimal.

In the example of FIGS. 17A-17C, the value for the angle of rotation α is relatively large (e.g. closer to ninety degrees than to forty-five degrees). As such, the projection pattern direction (e.g., the direction of projection of the center beam 1708) approaches the tangential direction of the circumference of the image capturing device 1702. This may cause the projection pattern to interfere with the projection points. Furthermore, depending of the layout of the components, there may be additional restrictions on the directions for the angle of rotation α. Examples of the present disclosure therefore minimize the interference by selecting the values for α, θ, and b appropriately.

Figure 18B:
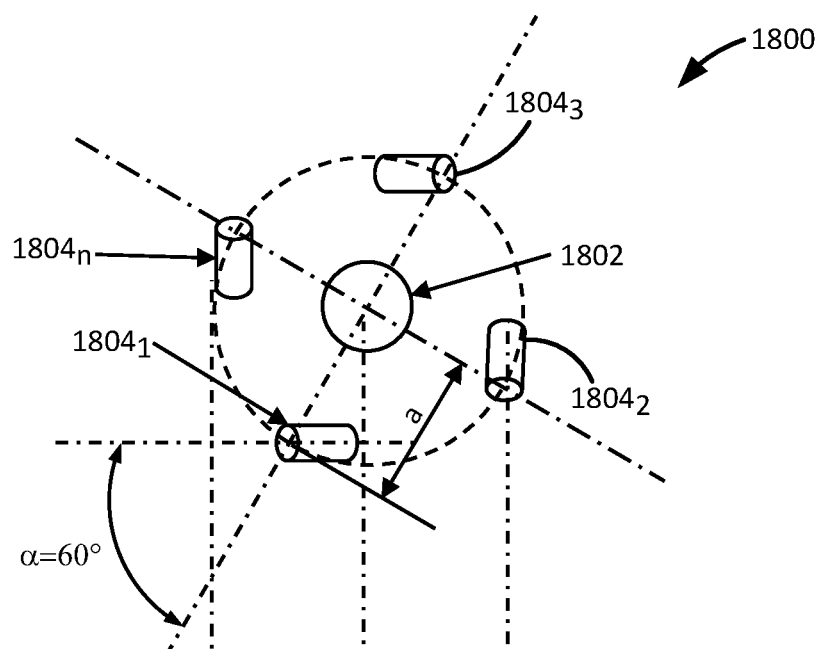
FIG. 18B illustrates a top view of the sensor components illustrated in FIG. 18A.
Figure 18A:
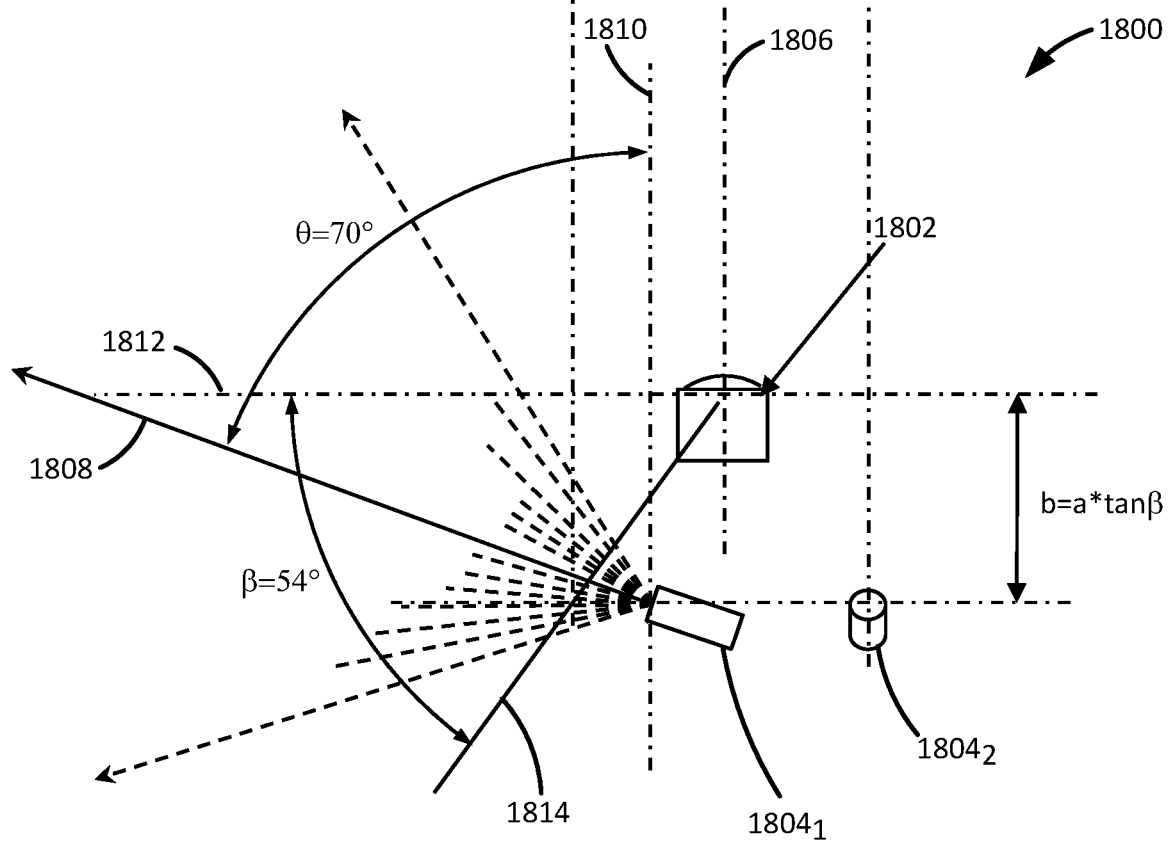
FIG. 18A illustrates a side view of components of an example configuration of a sensor having projection points whose positions are adjusted to optimize a projection pattern.

FIG. 18A illustrates a side view of components of an example configuration of a sensor 1800 having projection points whose positions are adjusted to optimize a projection pattern. FIG. 18B illustrates a top view of the sensor components illustrated in FIG. 18A.

As shown in FIGS. 18A and 18B, the sensor 1800 includes an image capturing device 1802 including a lens, and a plurality of projection points $1804_1$-$1804_n$ (hereinafter individually referred to as a "projection point 1804" or collectively referred to as "projection points 1804"). In one example, the sensor 1800 includes four projection points 1804 per every one image capturing device 1802, although more or fewer projection points could be included in other examples.

As above, the direction of the center of the projection pattern emitted by a projection point 1804 (e.g., projection point $1804_1$) with respect to the optical axis 1806 of the image capturing device 1802 may be determined by the angle θ in the radial direction with respect to the optical axis 1806, where θ indicates an angle between the center projection beam 1808 projected by a projection point 1804 (i.e., the beam that creates the center of the projection pattern) and the optical axis 1806 of the image capturing device 1802. In the example illustrated in FIGS. 18A and 18B, the value of θ is seventy degrees.

In addition, an angle α of rotation may be defined about an axis that is parallel to the image capturing device's optical axis 1806. In the example illustrated in FIGS. 18A and 18B, the value of α is sixty degrees.

The baseline a defines the lateral distance (e.g., in a direction perpendicular to the optical axis 1806 of the image capturing device 1802) from the front nodal point of the image capturing device's lens to the central axis 1810 of a projection point 1804.

The difference in height b between a projection point 1804 and the front nodal point of the image capturing device 1802 in the direction of the image capturing device's optical axis 1806 may be defined as b. In the example illustrated in FIGS. 18A and 18B, the value of b is non-zero.

The angle between a line 1812 that is perpendicular to the image capturing device's optical axis 1806 and a line 1814 that is perpendicular to the center beam 1808 may be defined as β. In the example illustrated in FIGS. 18A and 18B, the value of β is fifty-four degrees.

Figure 18C:
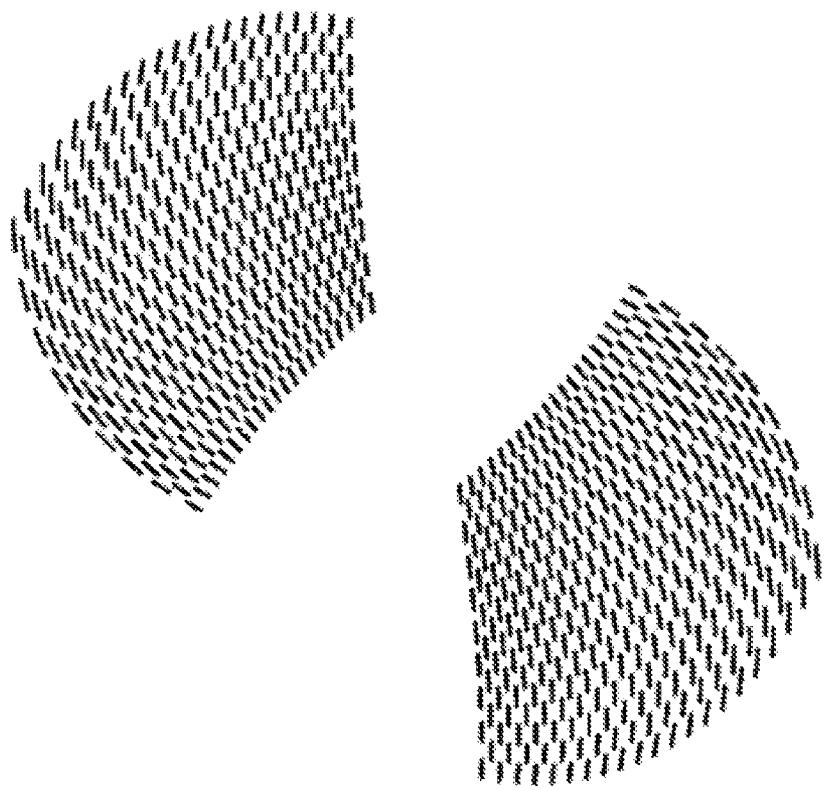
FIG. 18C is a chart plotting the trajectories of projection points emitted by the distance sensor of FIGS. 18A and 18B.

FIG. 18C is a chart plotting the trajectories of projection points emitted by the distance sensor 1800 of FIGS. 18A and 18B. In the example illustrated in FIG. 18C, the optimal value for β is −53.9°. In the example of FIG. 18C, α=60°, θ=70°, β=−53.5°, and Δβ=0.4. As shown, the overlap of projection point trajectories in FIG. 18C is minimal.

Figure 19B:
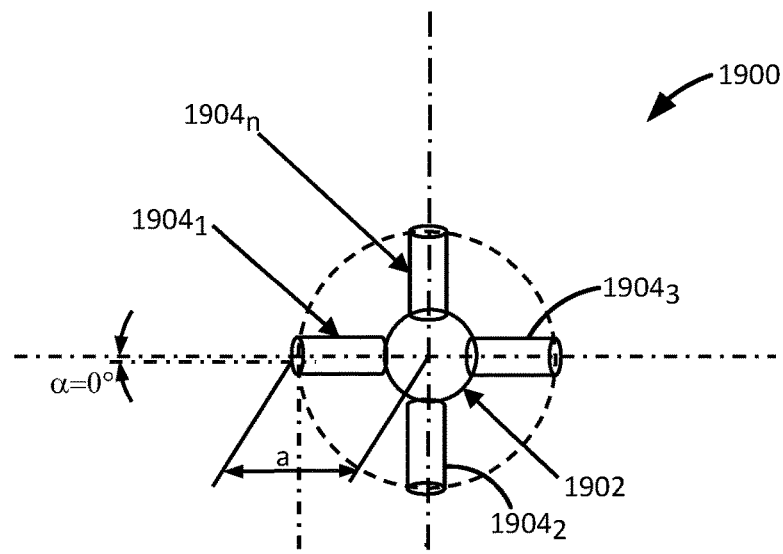
FIG. 19B illustrates a top view of the sensor components illustrated in FIG. 19A.
Figure 19A:
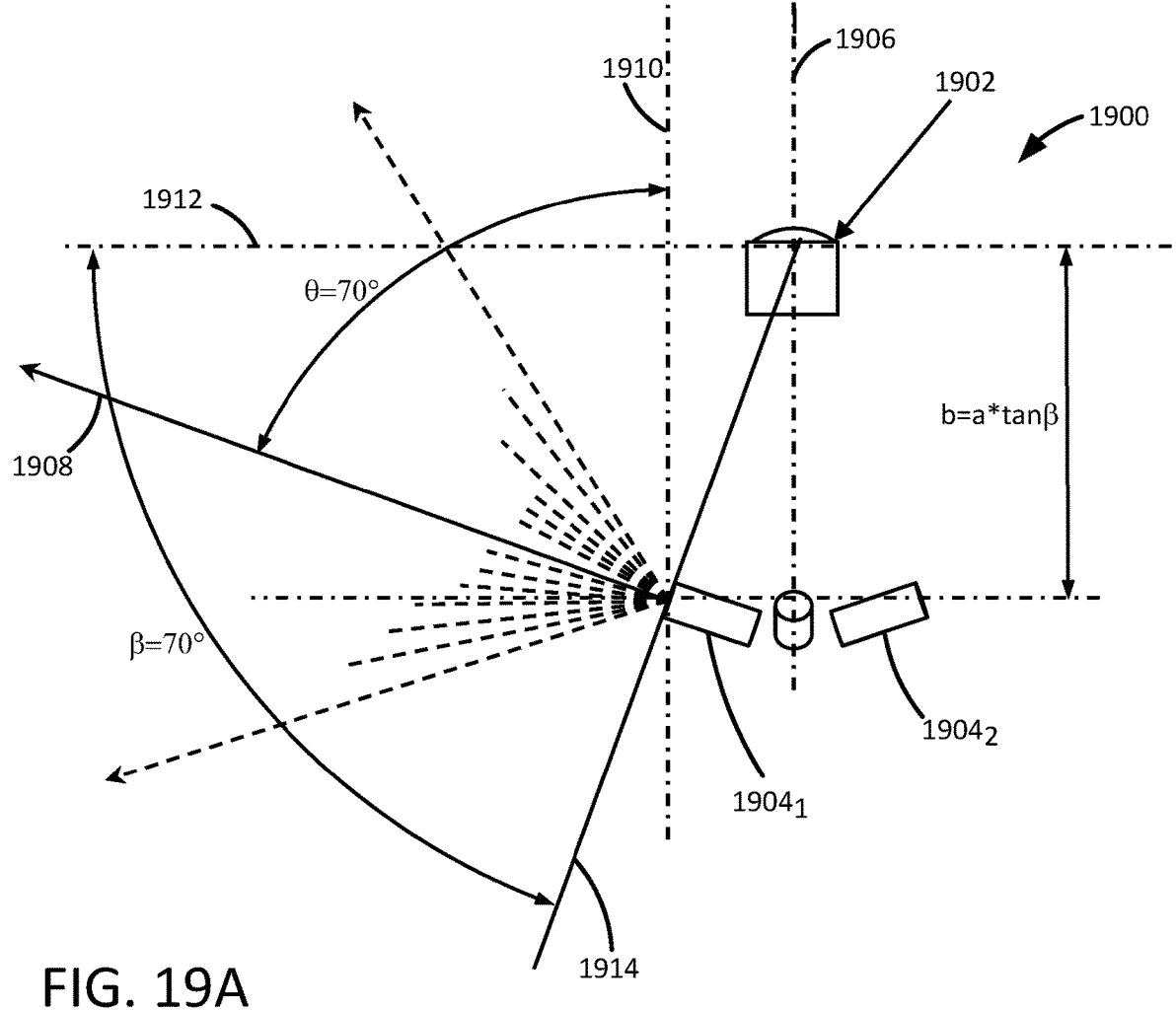
FIG. 19A illustrates a side view of components of an example configuration of a sensor having projection points whose positions are adjusted to optimize a projection pattern.

FIG. 19A illustrates a side view of components of an example configuration of a sensor 1900 having projection points whose positions are adjusted to optimize a projection pattern. FIG. 19B illustrates a top view of the sensor components illustrated in FIG. 19A.

As shown in FIGS. 19A and 19B, the sensor 1900 includes an image capturing device 1902 including a lens, and a plurality of projection points $1904_1$-$1904_n$ (hereinafter individually referred to as a "projection point 1904" or collectively referred to as "projection points 1904"). In one example, the sensor 1900 includes four projection points 1904 per every one image capturing device 1902, although more or fewer projection points could be included in other examples.

As above, the direction of the center of the projection pattern emitted by a projection point 1904 (e.g., projection point $1904_1$) with respect to the optical axis 1906 of the image capturing device 1902 may be determined by the angle θ in the radial direction with respect to the optical axis 1906, where θ indicates an angle between the center projection beam 1908 projected by a projection point 1904 (i.e., the beam that creates the center of the projection pattern) and the optical axis 1906 of the image capturing device 1902. In the example illustrated in FIGS. 19A and 19B, the value of θ is seventy degrees.

In addition, an angle α of rotation may be defined about an axis that is parallel to the image capturing device's optical axis 1906. In the example illustrated in FIGS. 19A and 19B, the value of α is zero degrees.

The baseline a defines the lateral distance (e.g., in a direction perpendicular to the optical axis 1906 of the image capturing device 1902) from the front nodal point of the image capturing device's lens to the central axis 1910 of a projection point 1904.

The difference in height b between a projection point 1904 and the front nodal point of the image capturing device 1902 in the direction of the image capturing device's optical axis 1906 may be defined as b. In the example illustrated in FIGS. 19A and 19B, the value of b is non-zero.

The angle between a line 1912 that is perpendicular to the image capturing device's optical axis 1906 and a line 1914 that is perpendicular to the center beam 1908 may be defined as β. In the example illustrated in FIGS. 19A and 19B, the value of β is seventy degrees.

Figure 19C:
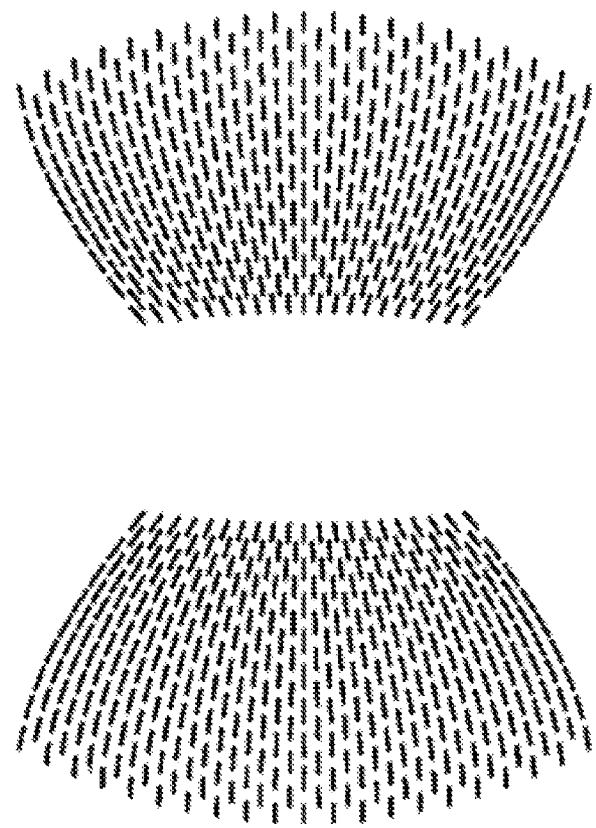
FIG. 19C is a chart plotting the trajectories of projection points emitted by the distance sensor of FIGS. 19A and 19B.

FIG. 19C is a chart plotting the trajectories of projection points emitted by the distance sensor 1900 of FIGS. 19A and 19B. In the example illustrated in FIG. 19C, the optimal value for β is −70°. In the example of FIG. 19C, α=0°, θ=70°, β=−69.9°, and Δβ=0.1. As shown, the overlap of projection point trajectories in FIG. 19C is minimal.

Although the values for a, b, α, β, and θ may be uniquely determined by EQN. 1, some errors in setting the values may occur. In some cases, it may be desirable, for the sake of convenience, to adopt a value that deviates slightly (e.g., within some predefined tolerance) from the optimal value. For instance, in the examples illustrated in FIGS. 11A-190, good results (i.e., minimal overlap of projection point trajectories) are still achieved when the value of β is within +/−10° from the optimal value.

Figure 20:
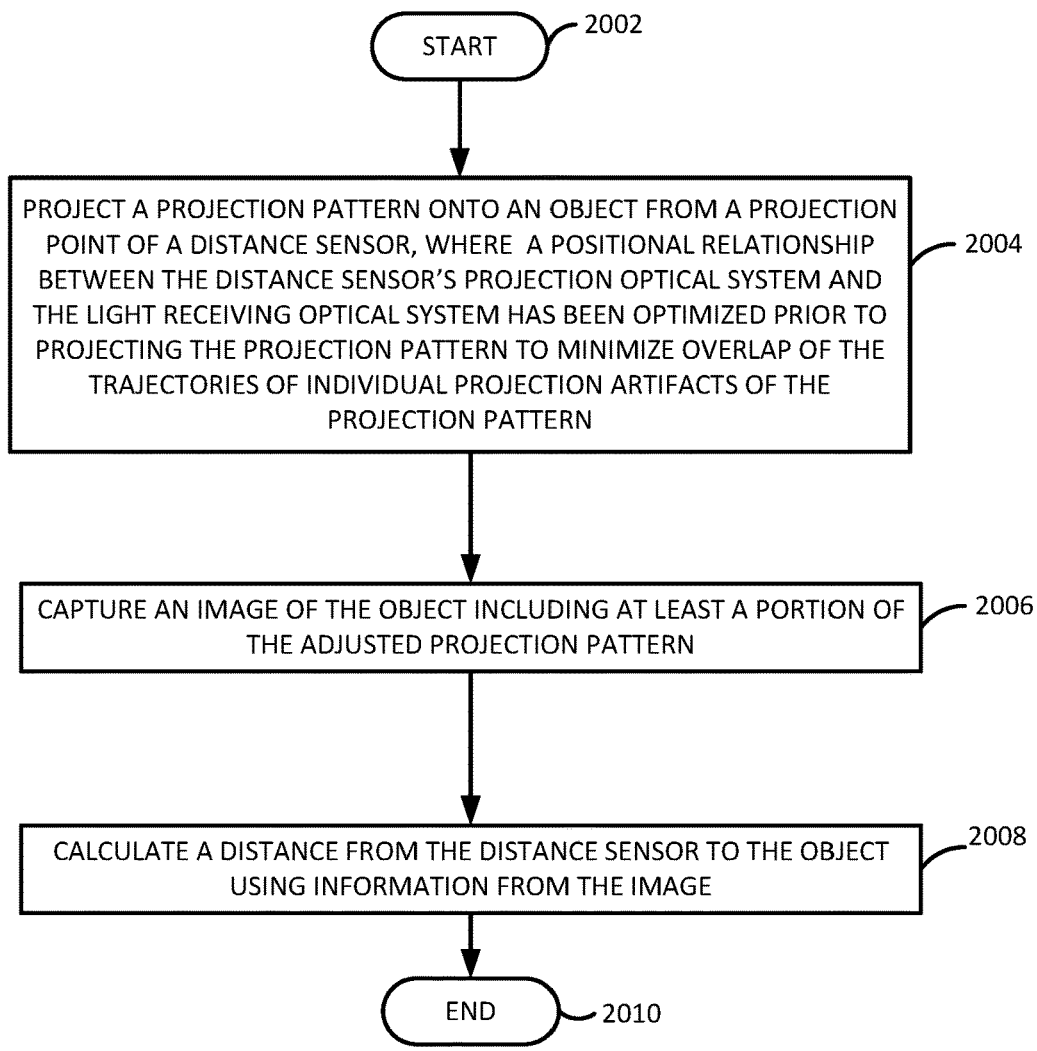
FIG. 20 illustrates a flow diagram of an example method for calculating the distance from a sensor to an object.
Figure 21:
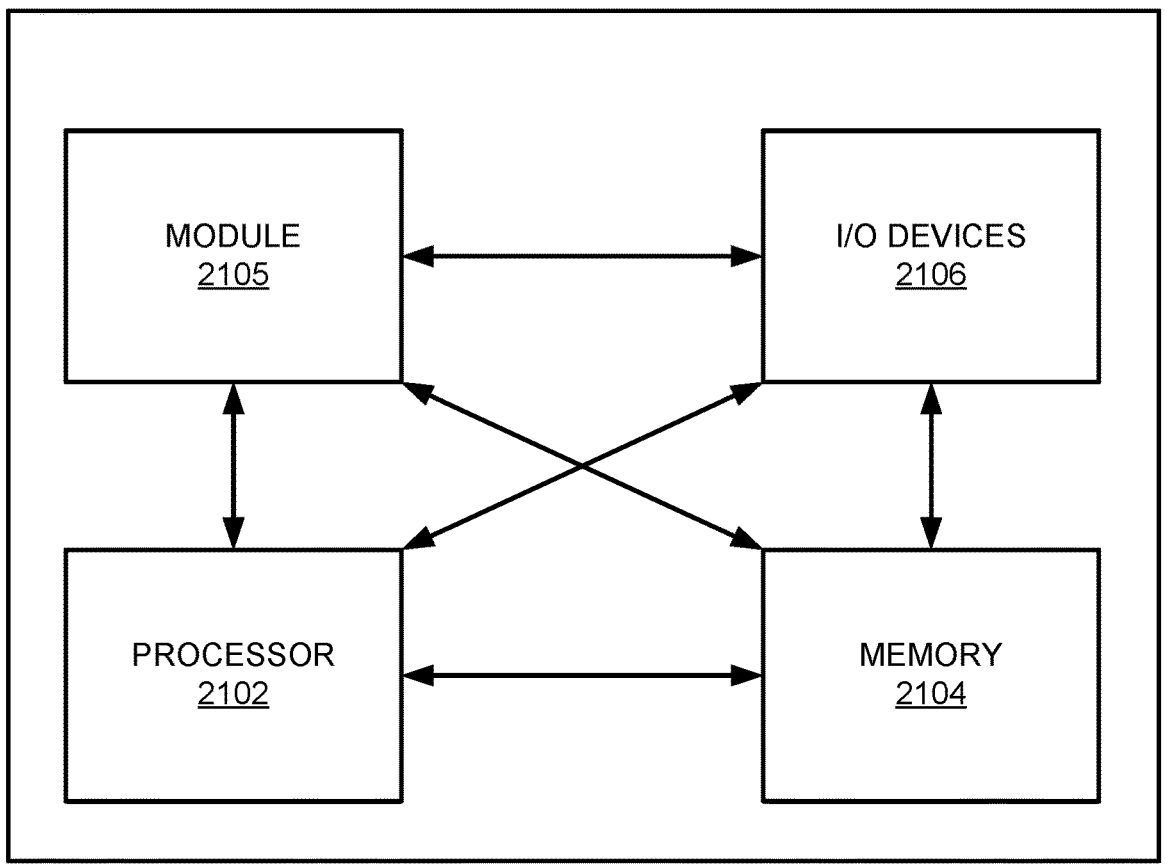
FIG. 21 depicts a high-level block diagram of an example electronic device for calculating the distance from a sensor to an object.

FIG. 20 illustrates a flow diagram of an example method 2000 for calculating the distance from a sensor to an object. In one embodiment, the method 2000 may be performed by a processor integrated in an imaging sensor (such as any an imaging sensor of a distance sensor) or a special purpose computing device as illustrated in FIG. 21 and discussed below.

The method 2000 begins in step 2002. In step 2004, a projection pattern may be projected onto an object from a projection point of a distance sensor. In one example, the positional relationship between the distance sensor's projection optical system (e.g., the set of optics comprising the projection points, including light sources, diffractive optical elements, and other components) and the light receiving optical system (e.g., the set of optics comprising the image capturing device, including the lens and other components) may be adjusted or optimized (e.g., by adjusting at least one parameter that defines the positional relationship) prior to projecting the projection pattern. For instance, the positional relationship may be adjusted during selection and design of the distance sensor's components and/or assembly of the distance sensor's components. In one example, the positional relationship is adjusted by adjusting at least one of the following parameters: the angle θ between the center projection beam projected by a projection point of the projection optical system and the optical axis of the light receiving optical system, an angle α of rotation about an axis that is parallel to the optical axis of the light receiving optical system, the baseline a (i.e., the lateral distance, in a direction perpendicular to the optical axis of the light receiving optical system, from the front nodal point of the light receiving optical system's lens to the central axis of a projection point), the difference in height b between a projection point and the front nodal point in the direction of the optical axis of the light receiving optical system, and the angle β between a line that is perpendicular to the optical axis of the light receiving optical system and a line that is perpendicular to the center beam projected from a projection point. The relationship between a, b, α, β, and θ may be defined according to FIG. 1, above.

As discussed above, the projection pattern projected in step 2004 may be created by projecting a plurality of beams from the projection point such that, when the plurality of beams is incident upon the object, a pattern of projection artifacts (e.g., dots, dashes, x's or the like) is visible at least by an imaging sensor. As also discussed above, the layout of the projection artifacts may depend on the positional relationship between the distance sensor's projection optical system and the light receiving optical system in the planar (e.g., lateral) direction and the height direction (e.g., the direction perpendicular to the lateral direction).

In step 2006, at least one image of the object may be captured. At least a portion of the projection pattern may be visible on the surface of the object.

In step 2008, the distance from the distance sensor to the object may be calculated using information from the image(s) captured in step 2006. In one embodiment, a triangulation technique is used to calculate the distance. For example, the positional relationships between the plurality of projection artifacts that make up the projection pattern can be used as the basis for the calculation.

The method 2000 ends in step 2010. The method 2000 may be repeated (either in parallel or sequentially) for additional projection points of the distance sensor.

It should be noted that although not explicitly specified, some of the blocks, functions, or operations of the method 2000 described above may include storing, displaying and/or outputting for a particular application. In other words, any data, records, fields, and/or intermediate results discussed in the method 2000 can be stored, displayed, and/or outputted to another device depending on the particular application. Furthermore, blocks, functions, or operations in FIG. 20 that recite a determining operation, or involve a decision, do not imply that both branches of the determining operation are practiced. In other words, one of the branches of the determining operation may not be performed, depending on the results of the determining operation.

FIG. 21 depicts a high-level block diagram of an example electronic device 2100 for calculating the distance from a sensor to an object. As such, the electronic device 2100 may be implemented as a processor of an electronic device or system, such as a distance sensor.

As depicted in FIG. 21, the electronic device 2100 comprises a hardware processor element 2102, e.g., a central processing unit (CPU), a microprocessor, or a multi-core processor, a memory 2104, e.g., random access memory (RAM) and/or read only memory (ROM), a module 2105 for calculating the distance from a sensor to an object, and various input/output devices 2106, e.g., storage devices, including but not limited to, a tape drive, a floppy drive, a hard disk drive or a compact disk drive, a receiver, a transmitter, a display, an output port, an input port, and a user input device, such as a keyboard, a keypad, a mouse, a microphone, and the like.

Although one processor element is shown, it should be noted that the electronic device 2100 may employ a plurality of processor elements. Furthermore, although one electronic device 2100 is shown in the figure, if the method(s) as discussed above is implemented in a distributed or parallel manner for a particular illustrative example, i.e., the blocks of the above method(s) or the entire method(s) are implemented across multiple or parallel electronic devices, then the electronic device 2100 of this figure is intended to represent each of those multiple electronic devices.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 2105 for calculating the distance from a sensor to an object, e.g., machine readable instructions can be loaded into memory 2104 and executed by hardware processor element 2102 to implement the blocks, functions or operations as discussed above in connection with the method 800 or the method 2000. Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 2105 for calculating the distance from a sensor to an object of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or an electronic device such as a computer or a controller of a safety sensor system.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A method, comprising:
projecting a projection pattern onto a surface of an object from a projection point of a distance sensor, wherein the projection pattern is created by a plurality of beams of light projected from the projection point, wherein the plurality of beams of light creates a plurality of projection artifacts that is arranged on the surface of the object, wherein a layout of the plurality of projection artifacts depends on a positional relationship between the projection point and an image capturing device of the distance sensor, wherein at least one parameter that defines the positional relationship between the projection point and an image capturing device of the distance sensor has been optimized, prior to the projecting, to minimize overlap of a plurality of trajectories associated with the plurality of projection artifacts, and wherein the positional relationship is defined according to:

$$\tan\beta = \frac{b}{a} = \frac{\sin\theta\cos\alpha}{\cos\theta} = \tan\theta\,\cos\alpha,$$

wherein $\beta$ is an angle between a first line that is perpendicular to an optical axis of the image capturing device and a second line that is perpendicular to a center beam of the plurality of beams of light, b is a difference in height between the projection point and a front nodal point of the image capturing device in a direction of the optical axis of the image capturing device, a is a lateral distance from the front nodal point of the image capturing device to a central axis of the projection point, $\theta$ is an angle between the center beam and the optical axis of the image capturing device, and $\alpha$ is an angle of rotation defined about an axis that is parallel to the optical axis of the image capturing device;
capturing an image of the object, including at least a portion of the projection pattern; and
calculating a distance from the distance sensor to the object using information from the image.

2. A non-transitory machine-readable storage medium encoded with instructions executable by a processor, wherein, when executed, the instructions cause the processor to perform operations comprising:
projecting a projection pattern onto a surface of an object from a projection point of a distance sensor, wherein the projection pattern is created by a plurality of beams of light projected from the projection point, wherein the plurality of beams of light creates a plurality of projection artifacts that is arranged on the surface of the object, wherein a layout of the plurality of projection artifacts depends on a positional relationship between the projection point and an image capturing device of the distance sensor, wherein at least one parameter that defines the positional relationship between the projection point and an image capturing device of the distance sensor has been optimized, prior to the projecting, to minimize overlap of a plurality of trajectories associated with the plurality of projection artifacts, and wherein the positional relationship is defined according to:

$$\tan\beta = \frac{b}{a} = \frac{\sin\theta\cos\alpha}{\cos\theta} = \tan\theta\cos\alpha,$$

wherein β is an angle between a first line that is perpendicular to an optical axis of the image capturing device and a second line that is perpendicular to a center beam of the plurality of beams of light, b is a difference in height between the projection point and a front nodal point of the image capturing device in a direction of the optical axis of the image capturing device, a is a lateral distance from the front nodal point of the image capturing device to a central axis of the projection point, θ is an angle between the center beam and the optical axis of the image capturing device, and a is an angle of rotation defined about an axis that is parallel to the optical axis of the image capturing device;

capturing an image of the object, including at least a portion of the projection pattern; and calculating a distance from the distance sensor to the object using information from the image.

3. An apparatus, comprising:

an image capturing device positioned to capture an image of a field of view; and a projection point positioned outside a periphery of a lens of the image capturing device, the projection point being configured to project a plurality of projection beams into the field of view, wherein at least one parameter that defines a positional relationship between the image capturing device and the projection point is adjusted to minimize overlap of a plurality of trajectories associated with a plurality of projection artifacts created by the plurality of projection beams, and wherein the positional relationship is defined according to:

$$\tan\beta = \frac{b}{a} = \frac{\sin\theta\cos\alpha}{\cos\theta} = \tan\theta\cos\alpha,$$

wherein β is an angle between a first line that is perpendicular to an optical axis of the image capturing device and a second line that is perpendicular to a center beam of the plurality of projection beams, b is a difference in height between the projection point and a front nodal point of the image capturing device in a direction of the optical axis of the image capturing device, a is a lateral distance from the front nodal point of the image capturing device to a central axis of the projection point, θ is an angle between the center beam and the optical axis of the image capturing device, and a is an angle of rotation defined about an axis that is parallel to the optical axis of the image capturing device.

4. The apparatus of claim 3, wherein the positional relationship is adjusted in a direction that is perpendicular to an optical axis of the image capturing device.

5. The apparatus of claim 3, wherein the positional relationship is adjusted in a direction that is parallel to an optical axis of the image capturing device.

6. The apparatus of claim 3, wherein the at least one parameter comprises an angle between a center projection beam of the plurality of projection beams and an optical axis of the image capturing device.

7. The apparatus of claim 3, wherein the at least one parameter comprises an angle of rotation about an axis that is parallel to an optical axis of the image capturing device.

8. The apparatus of claim 3, wherein the at least one parameter comprises a lateral distance, in a direction perpendicular to an optical axis of the image capturing device, from a front nodal point of the lens of the image capturing device to a central axis of the projection point.

9. The apparatus of claim 3, wherein the at least one parameter comprises a difference in height between the projection point and a front nodal point of the lens of the image capturing device, in a direction of an optical axis of the image capturing device.

10. The apparatus of claim 3, wherein the at least one parameter comprises an angle between a first line that is perpendicular to an optical axis of the image capturing device and a second line that is perpendicular to a center beam of the plurality of projection beams.

11. The apparatus of claim 3, wherein b≠0, α=0°, θ=40°, and β=40°.

12. The apparatus of claim 3, wherein b≠0, α=30°, θ=40°, and β=36°.

13. The apparatus of claim 3, wherein b≠0, α=60°, θ=40°, and β=23°.

14. The apparatus of claim 3, wherein b≠0, α=30°, θ=70°, and β=67°.

15. The apparatus of claim 3, wherein b≠0, α=60°, θ=70°, and β=54°.

16. The apparatus of claim 3, wherein b≠0, α=0°, θ=70°, and β=70°.

17. The apparatus of claim 3, wherein b=0, α=90°, θ=40°, and β=0°.

18. The apparatus of claim 3, wherein b=0, α=90°, θ=80°, and β=0°.

19. The apparatus of claim 3, wherein b=0, α=90°, θ=60°, and β=0°.

* * * * *

UNITED STATES PATENT AND TRADEMARK OFFICE
CERTIFICATE OF CORRECTION

| | |
|---|---|
| PATENT NO. | : 10,679,076 B2 |
| APPLICATION NO. | : 16/164113 |
| DATED | : June 9, 2020 |
| INVENTOR(S) | : Akiteru Kimura |

Page 1 of 1

It is certified that error appears in the above-identified patent and that said Letters Patent is hereby corrected as shown below:

In the Specification

Column 3, Line 17, delete "100" and insert -- 10C --.
Column 8, Line 46, delete "n." and insert -- $\eta$. --.
Column 8, Line 62, delete "(8, 0);" and insert -- ($\theta$, 0); --.
Column 8, Line 63, delete "($\theta$, $\eta$)." and insert -- (0, $\eta$). --.
Column 11, Line 12, delete "$\eta$=0)" and -- $\theta$=0) --.
Column 11, Line 18, delete "($\theta$, $\eta$)," and insert -- (0, $\eta$), --.
Column 12, Line 30, delete "w" insert -- $\omega$ --.
Column 15, Line 2, delete "a" and insert -- $\alpha$ --.
Column 15, Line 5, delete "100" and insert -- 10C --.
Column 15, Line 63, delete "110-11G" and insert -- 11C-11G --.
Column 15, Line 66, delete "110-11G," and insert -- 11C-11G, --.
Column 15, Line 66, delete "40°," and insert -- -40°, --.
Column 16, Line 1, delete "110-11G" and insert -- 11C-11G --.
Column 16, Line 4, delete "$\beta$=40°," and insert -- $\beta$=-40°, --.
Column 16, Line 4, delete "110" and insert -- 11C --.
Column 17, Line 9, delete "13=" and insert -- $\beta$= --.
Column 18, Line 4, delete "$\Delta$3=" and insert -- $\Delta\beta$= --.
Column 19, Line 3, delete "13=" and insert -- $\beta$= --.
Column 20, Line 67, delete "13=" and insert -- $\beta$= --.
Column 21, Line 66, delete "17A-170," and insert -- 17A-17C, --.
Column 23, Line 49, delete "11A-190," and insert -- 11A-19C, --.

In the Claims

Column 26, Line 41, in Claim 1, delete "a" and insert -- $\alpha$ --.
Column 27, Line 16, in Claim 2, delete "a" and insert -- $\alpha$ --.
Column 28, Line 2, in Claim 3, delete "a" and insert -- $\alpha$ --.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*